US010986785B2

(12) United States Patent
Denis et al.

(10) Patent No.: US 10,986,785 B2
(45) Date of Patent: Apr. 27, 2021

(54) CONTINUOUS ROUND BALER AND METHODS OF USING THE SAME

(71) Applicant: CNH Industrial Canada, Ltd., Saskatoon (CA)

(72) Inventors: Joël Denis, Saskatoon (CA); Martin J. Roberge, Saskatoon (CA)

(73) Assignee: CNH Industrial America LLC, New Holland, PA (US)

( * ) Notice: Subject to any disclaimer, the term of this patent is extended or adjusted under 35 U.S.C. 154(b) by 183 days.

(21) Appl. No.: 16/019,226

(22) Filed: Jun. 26, 2018

(65) Prior Publication Data
US 2019/0387684 A1    Dec. 26, 2019

(51) Int. Cl.
| A01F 15/07 | (2006.01) |
|---|---|
| A01F 15/18 | (2006.01) |
| A01F 15/08 | (2006.01) |
| A01F 15/10 | (2006.01) |

(52) U.S. Cl.
CPC .......... *A01F 15/18* (2013.01); *A01F 15/0705* (2013.01); *A01F 15/0883* (2013.01); *A01F 15/106* (2013.01); *A01F 2015/077* (2013.01); *A01F 2015/183* (2013.01)

(58) Field of Classification Search
CPC .. A01F 15/18; A01F 15/0705; A01F 15/0883; A01F 15/106; A01F 2015/077; A01F 2015/183; A01F 15/07; A01F 2015/0775
See application file for complete search history.

(56) References Cited

U.S. PATENT DOCUMENTS

| 4,035,999 A |   | 7/1977  | Crane et al. |
|---|---|---|---|
| 4,062,172 A | * | 12/1977 | Rice ..................... A01F 15/0705 56/343 |
| 4,510,861 A |   | 4/1985  | Campbell et al. |

(Continued)

FOREIGN PATENT DOCUMENTS

| DE | 102005020777 A1 | 11/2006 |
|---|---|---|
| DE | 10243295 B4     | 11/2010 |

(Continued)

OTHER PUBLICATIONS

Extended European Search Report for EP Application No. 19182713.8 dated Nov. 25, 2019 (seven pages).

*Primary Examiner* — Adam J Behrens
(74) *Attorney, Agent, or Firm* — Patrick M. Sheldrake; Peter K. Zacharias

(57) ABSTRACT

A crop harvesting system for continuous round baling is described that comprises a first and second bale chamber and a conveyor system in operable communication with the first and second bale chambers. The crop harvesting system can comprise a first bale chamber comprising a variable shape, defined by a first serpentine system comprising one or a plurality of endless belts in operable contact with one or a plurality of movable rollers to facilitate movement of the bale out of the first and into the second bale chamber. The second bale chamber comprises a fixed shape defined by a plurality of stationary rolls operably attached to a second set belt or belts. The crop harvesting system can be integrated into an agricultural harvester such as a baler or combine.

22 Claims, 29 Drawing Sheets

(56) References Cited

U.S. PATENT DOCUMENTS

| | | | |
|---|---|---|---|
| 4,517,891 A * | 5/1985 | Henry | A01F 15/0705 100/88 |
| 4,534,285 A * | 8/1985 | Underhill | A01F 15/0705 100/88 |
| 4,667,592 A * | 5/1987 | Pentith | A01F 15/0705 100/77 |
| 4,914,900 A * | 4/1990 | Viaud | A01F 15/0705 100/88 |
| 6,295,797 B1 | 10/2001 | Naaktgeboren et al. | |
| 6,467,237 B2 * | 10/2002 | Viaud | A01F 15/0705 100/89 |
| 6,644,006 B1 | 11/2003 | Merritt et al. | |
| 6,651,418 B1 | 11/2003 | McClure et al. | |
| 6,688,092 B2 | 2/2004 | Anstey et al. | |
| 6,729,118 B2 * | 5/2004 | Viaud | A01F 15/0705 100/88 |
| 6,877,304 B1 | 4/2005 | Smith et al. | |
| 7,043,892 B1 | 5/2006 | Kessler | |
| 7,467,507 B2 | 12/2008 | Viaud | |
| 7,640,721 B2 | 1/2010 | Viaud et al. | |
| 8,733,241 B2 * | 5/2014 | Roberge | A01D 43/006 100/88 |
| 8,991,308 B2 * | 3/2015 | Roberge | A01F 15/0883 100/88 |
| 9,055,716 B2 * | 6/2015 | Roberge | A01D 43/006 |
| 9,420,747 B2 | 8/2016 | Roberge | |
| 9,603,308 B2 * | 3/2017 | Roberge | A01F 15/0705 |
| 9,918,433 B2 * | 3/2018 | Roberge | A01F 15/0715 |
| 2013/0133530 A1 * | 5/2013 | Roberge | A01F 15/0883 100/88 |
| 2014/0165856 A1 * | 6/2014 | Varley | A01F 15/0833 100/40 |
| 2015/0373914 A1 * | 12/2015 | Roberge | A01F 15/08 53/588 |
| 2015/0373916 A1 * | 12/2015 | Roberge | A01F 15/0715 56/341 |
| 2016/0082683 A1 | 3/2016 | Lanning et al. | |
| 2016/0183474 A1 * | 6/2016 | Thoreson | B65B 11/58 53/399 |

FOREIGN PATENT DOCUMENTS

| | | | |
|---|---|---|---|
| EP | 350514 A1 | 1/1990 | |
| FR | 2591849 A1 * | 6/1987 | A01F 15/0705 |
| WO | WO 9908505 A1 | 2/1999 | |
| WO | 2013/014291 A1 | 1/2013 | |

\* cited by examiner

Time: 0 s

Time: 5 s

Time: 15 s

Time: 20s

Time: 23s

Time: 25s

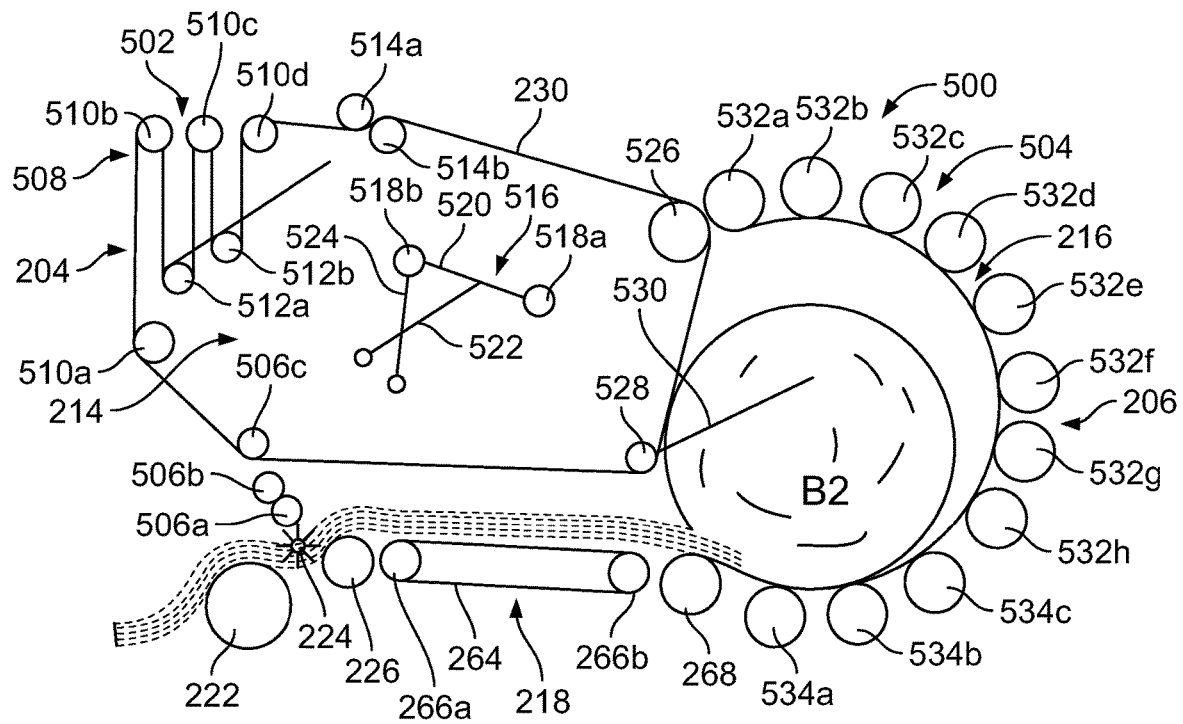
Time: 28s  FIG. 11G
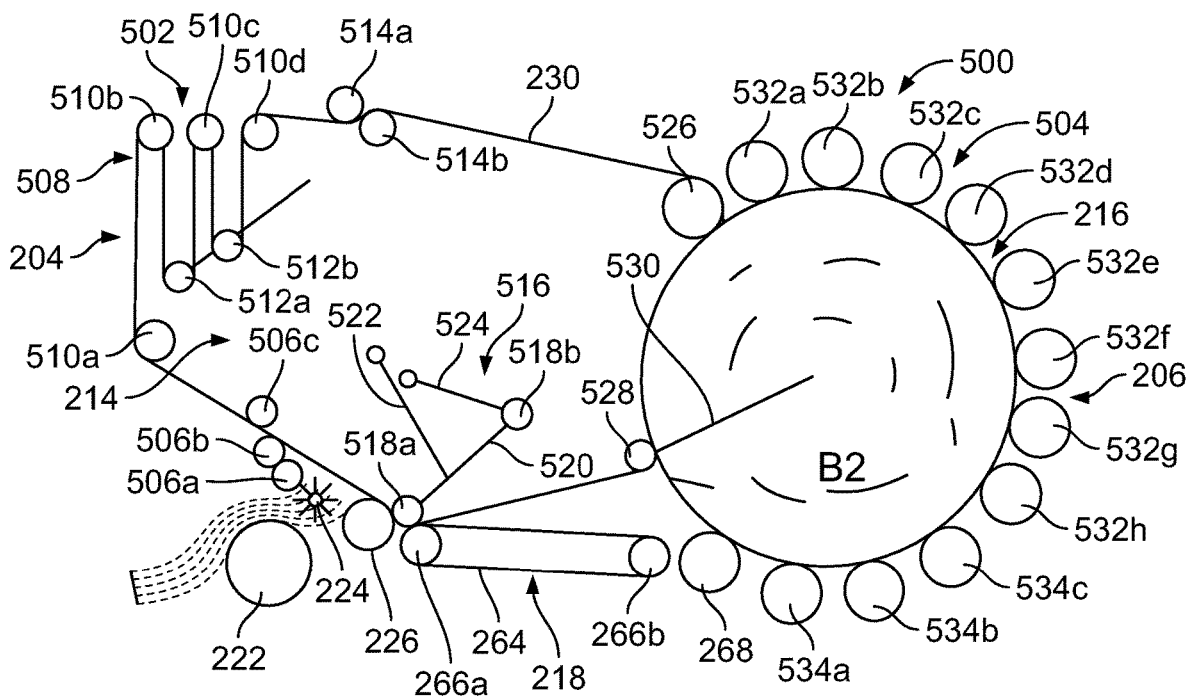
Time: 40s  FIG. 11H

CONTINUOUS ROUND BALER AND METHODS OF USING THE SAME

TECHNOLOGY FIELD

The present invention relates to an agricultural harvester and a system for the continuous baling of crop. The agricultural harvester and system comprise a crop harvesting assembly, a first and second bale chambers, and a conveyor system that transfers harvested crop from a crop harvesting assembly to one of two bale chambers and then transfers a bale still in formation from a first bale chamber to a second bale chamber. The present invention relates to an agricultural harvester capable of simultaneous harvesting, bale growth, and bale ejection.

BACKGROUND

For many years agricultural balers have been used to consolidate and package crop material so as to facilitate the storage and handling of the crop material for later use. A mower-conditioner typically cuts and conditions the crop material for windrow drying in the sun. When the cut crop material is properly dried, an agricultural harvester, such as a round baler, operates over the windrows to pick up the crop material and form the crop material into cylindrically-shaped round bales. Other agricultural harvesters, such as those harvesters used for biomass collection, use direct feed mechanisms that cut, collect, and bale material into a round bale in sequential steps.

The pickup of the baler gathers the cut and windrowed crop material from the ground then convey the cut crop material into a bale-forming chamber within the baler. A drive mechanism operates to activate the pickup, auger, and a rotor of the feed mechanism. A conventional baling chamber may consist of a pair of opposing sidewalls with a series of belts that rotate and compress the crop material into a cylindrical shape.

When the bale has achieved a desired size and density, a wrapping system may wrap the bale to ensure that the bale maintains its shape and density. For example, a net may be used to wrap the bale of crop material. A cutting or severing mechanism may be used to cut the net once the bale has been wrapped. The wrapped bale may be ejected from the baler and onto the ground by, for example, raising a tailgate of the baler. The tailgate is then closed and the cycle repeated as necessary and desired to manage the field of cut crop material.

The tailgate of the baler typically houses a simple door or panel that is affixed to the tailgate by hinges. In one position, the door or panel remains closed to prevent escape of the harvested bale. In another position, the door or panel can be placed in an open position to facilitate the exit of the harvested bale. Conventional balers require a relatively long period of downtime, typically in the range of between 10 and 15 seconds, to open the door or panel during operation and evacuation of the bale. The downtime required to operate the door reduces the overall efficiency of the harvesting system and interrupts continuous harvesting. The simple door or panel mechanism typically operates very slowly in a manual or automatic fashion. Once fully open the weight of the door or panel is typically very heavy, which affects the center of gravity of the equipment, puts additive stress on the tension points, and may cause instability problems if the agricultural harvester is on a hill or slope.

Modified balers have been designed to address delays caused by ejection. EP 2 220 929 discloses a round baler with a bale chamber and a storage chamber. Bales are condensed and wrapped in the bale chamber, and a fully-formed bale may be stored in and eventually ejected from the storage chamber while harvesting continues to take place in the bale chamber. A harvesting assembly centrally located on the bottom of the harvester routes harvested crop to one of the two chambers. The harvesting assembly in conjunction with an internal series of rollers between the two chambers routes harvested crop through a curved passage that back-feeds the bale chamber on a single moveable roller. A limitation of this design is the multiple directions toward which the harvested crop must be fed from the harvesting assembly causing a greater likelihood of clogging the entry point of the bale chamber. The likelihood of clogging the passage with crop also increases with the work of the back-feed mechanism being completed by a single roller. Another problem is the conventional means to eject the bale from the harvester.

U.S. Pat. No. 8,733,241 discloses another modified baler for harvesting in which a partially formed bale is transferred from one bale chamber to a second bale chamber with assistance of a conveyor belt. This design allows for continuous baling in the interior of the harvester but requires gravity assistance during transfer and two variably shaped bale chambers, each chamber defined by a respective serpentine system coordinated to grow and eject a bale from the bale chambers in a synchronous fashion.

FIG. 1 depicts a cross-sectional side view of a baler 100 as disclosed in U.S. Pat. No. 8,733,241. The baler 100 includes first and second bale chambers 102, 104 disposed near the front 106 and rear 108 of the baler 100, respectively. Crop 110 is conveyed into the first bale chamber 102 through an inlet point 112 fed by the transverse pickup 114 and rolled into a cylindrical shape. The first bale chamber 102 includes a first serpentine system 116 of rollers and belts surrounding the bale as it forms in the first bale chamber 102. A floor roller 118 is disposed below the bale and rotates the bale during formation. A conveyor belt 120 wrapped around two conveyor belt rollers 122, 124 is disposed between the first bale chamber 102 and the second bale chamber 104. The conveyor belt 120 rotates clockwise at a fixed position and shuttles the partially formed bale from the first bale chamber 102 to the second bale chamber 104. The second bale chamber 104 includes a second serpentine system 126 of rollers and belts surrounding the bale as it forms in the second bale chamber 104. A floor roller 128 is disposed below the bale and rotates the bale during formation.

The number of rolls, both stationary and movable rolls, required for the design of U.S. Pat. No. 8,733,241 causes the baler to be substantially longer than a typical baler and considerably heavier, causing manufacturing and delivery challenges. Another challenge with the design is the requirement of several movable rolls and actuators that, if damaged or dysfunctional could cause catastrophic loss of functionality of the baler.

SUMMARY OF THE EMBODIMENTS

In accordance with embodiments of the present disclosure, an exemplary crop harvesting system is provided. The system comprises a first bale chamber and a second bale chamber operably coupled by a conveyor system. The first bale chamber is positioned at a front of the baler and the second bale chamber is positioned at a rear of the baler. Each of the first and second bale chambers comprise a first sidewall and a second sidewall, an entry point at the front of the first and second bale chambers, an outlet at a rear of the first and second bale chambers, and at least one floor roller positioned at a bottom of each of the bale chambers transverse to the first and second sidewalls. The conveyor system is positioned between the first and second bale chambers. The first bale chamber comprises a variable shape, defined by a first serpentine system comprising one or a plurality of endless belts in operable contact with one or a plurality of movable rollers to facilitate movement of the bale in the first bale chamber, and out of the first bale chamber and into the second bale chamber. The second bale chamber comprises a fixed shape, defined by a second serpentine system comprising one or a plurality of endless belts in operable contact with one or a plurality of stationary rollers to facilitate movement of the bale in the second bale chamber and from the second bale chamber through the outlet of the second bale chamber.

In some embodiments, the second serpentine system comprises the plurality of stationary (e.g., fixed) rollers coupled to a tailgate and configured to pivot with the tailgate in an open position of the tailgate. In some embodiments, the second serpentine system comprises a first group of stationary rollers coupled to a tailgate and configured to pivot with the tailgate in an open position of the tailgate, and comprises a second group of stationary rollers coupled to a main frame and configured to remain stationary during pivoting of the tailgate.

In some embodiments, the first serpentine system comprises a bale carrier, in a first operable condition, the bale carrier is positioned in a downwardmost position closing the outlet at the rear of the first bale chamber, and in a second operable condition, the bale carrier is positioned in an upwardmost position exposing the outlet at the rear of the first bale chamber. In some embodiments, the system comprises a take-up assembly comprising two or a plurality of stationary rollers and two or a plurality of movable rollers, the one or plurality of endless belts of the first serpentine system extending between the stationary and movable rollers of the take-up assembly at non-parallel and non-perpendicular angles relative to horizontal.

In some embodiments, the second serpentine system comprises a movable portion of rollers, in a first operable condition, the movable portion is positioned in a downwardmost position closing the entry point at the front of the second bale chamber, and in a second operable condition, the movable portion is positioned in an upwardmost position exposing the entry point at the front of the second bale chamber. The movable portion of rollers is configured to slide along a track formed in one or both of the first and second sidewalls between the downwardmost and upwardmost positions.

In some embodiments, the second serpentine system comprises the plurality of stationary rollers defining a substantially continuous, semi-circular configuration at the rear of the second bale chamber. In some embodiments, the second serpentine system comprises spaced stationary rollers and a chain or belt extending over the spaced stationary rollers to define a substantially continuous, semi-circular configuration at the rear of the second bale chamber.

In some embodiments, the first serpentine system comprises a movable roller, in a first operable condition, the movable roller is positioned in a downwardmost position closing the entry point at the front of the second bale chamber with the one or plurality of endless belts, and in a second operable condition, the movable roller is positioned in an upwardmost position exposing the entry point at the front of the second bale chamber by retracting the one or plurality of endless belts. The movable roller is configured to slide along a track formed in one or both of the first and second sidewalls between the downwardmost and upwardmost positions.

In accordance with embodiments of the present disclosure, an exemplary continuous round baler is provided. The baler comprises a main frame defining a front and rear of the continuous round baler, a pickup assembly disposed at or near the front of the main frame, and a first bale chamber and a second bale chamber operably coupled by a conveyor system. The first bale chamber is positioned at a front of the baler and the second bale chamber is positioned at a rear of the baler, each of the first and second bale chambers comprise a first sidewall and a second sidewall, an entry point at the front of the first and second bale chambers, an outlet at a rear of the first and second bale chambers, and at least one floor roller positioned at a bottom of each of the bale chambers transverse to the first and second sidewalls. The conveyor system is positioned between the first and second bale chambers. The first bale chamber comprises a variable shape, defined by a serpentine system comprising one or a plurality of endless belts in operable contact with one or a plurality of movable rollers to facilitate movement of the bale in the first bale chamber, and out of the first bale chamber and into the second bale chamber. The second bale chamber comprises a fixed shape, defined by a second serpentine system comprising one or a plurality of endless belts in operable contact with one or a plurality of stationary rollers to facilitate movement of the bale in the second bale chamber and from the second bale chamber through the outlet of the second bale chamber.

In some embodiments, the conveyor system is positioned between the first and second bale chambers at a downward angle from the front of the baler to the rear of the baler. In some embodiments, the conveyor system comprises at least two rollers and a conveyor belt positioned over the at least two rollers, rotation of the at least two rollers causes the conveyor belt to move harvested crop from the first bale chamber to the second bale chamber.

In some embodiments, the first serpentine system comprises a movable portion toward the rear of the first outlet of the first bale chamber such that, in a first operable condition, the one or plurality of endless belts and at least two rollers positioned toward the rear of the first bale chamber are positioned in their downwardmost position sufficiently preventing movement of crop material from the first bale chamber to the second bale chamber; and, in a second operable condition, the one or plurality of endless belts and at least two rollers positioned toward the rear of the first bale chamber are positioned in their upwardmost position sufficiently high to accommodate movement of a full formed bale in the first bale chamber to exit through the outlet of the first bale chamber.

In some embodiments, the one or plurality of endless belts and at least two rollers are integrated into a bale carrier. In some embodiments, the first serpentine system comprises at least one take-up assembly positioned in the front of the baler comprising an arm capable of radial movement around a stationary pivot point and at least two movable rolls operably attached to the arm and the one or endless belts, in the first operable condition, the arm is positioned in a rearmost position thereby decreasing the length in the one or plurality of endless belts and, in the second operable condition, the arm is positioned in a frontmost position thereby increasing the length in the one or plurality of endless belts and moving the one or plurality of endless belts and at least two rollers from their downwardmost position in the rear of the first bale chamber to the upwardmost position thereby accommodating the movement of crop material from the first to the second bale chamber. Decreasing and increasing the length of the endless belts accommodates the bale growth and transfer.

In some embodiments, the first and second bale chambers are defined in a space between the first sidewall, the second sidewall, the outlet of the first bale chamber, and a plurality of rollers positioned between and attached to the first and second sidewalls; the plurality of rollers support one or more baling belts and comprise at least one floor roller. In some embodiments, the baler comprises a first sensor positioned in the first bale chamber and a second sensor positioned in the second bale chamber, the first and second sensors are in operable communication with a controller system and detect the diameter and/or density of a bale in the first and second bale chambers.

In some embodiments, the baler comprises a rotocutter and a crop harvesting assembly in the front of the continuous round baler and a movable tailgate in the rearmost position of the baler, the tailgate movable at least at one pivot point in an operable condition in which crop material from the second bale chamber exits the continuous round baler. In some embodiments, the baler further comprises a motor and at least one tensioning actuator operatively coupled to a first pair of arms and/or a second pair of arms of the bale carrier for facilitating the upward or downward movement of the at least one bale carrier.

In some embodiments, the baler comprises a net wrapping mechanism in the second bale chamber, the net wrapping mechanism is optionally movable to avoid contact with or obstruction of the bale within the second bale chamber. In some embodiments, the conveyor system comprises at least four rollers around which one or more conveyor belts rotate, the rollers exact tension on the conveyor belt and convey crop between the first and the second bale chambers.

In accordance with embodiments of the present disclosure, an exemplary method of operating a crop harvesting system is provided. The method comprises introducing crop into a first bale chamber to form a core of a bale in the first bale chamber, transferring the first bale from the first bale chamber to a second bale chamber via a conveyor system positioned between the first and second bale chambers, and completing formation of the bale in the second bale chamber. The first bale chamber is positioned at a front of the baler and the second bale chamber is positioned at a rear of the baler, each of the first and second bale chambers comprise a first sidewall and a second sidewall, an entry point at the front of the first and second bale chambers, an outlet at a rear of the first and second bale chambers, and at least one floor roller positioned at a bottom of each of the bale chambers transverse to the first and second sidewalls. The first bale chamber comprises a variable shape, defined by a first serpentine system comprising one or a plurality of endless belts in operable contact with one or a plurality of movable rollers to facilitate movement of the bale out of the first and into the second bale chamber. The second bale chamber comprises a fixed shape, defined by a second serpentine system comprising one or a plurality of endless belts in operable contact with one or a plurality of stationary rollers to facilitate movement of the bale in the second chamber and from the second chamber through the outlet of the second chamber.

In accordance with embodiments of the present disclosure, an exemplary crop harvesting system is provided. The system comprises a first bale chamber and a second bale chamber operably coupled by a conveyor system. The first bale chamber is positioned at a front of the baler and the second bale chamber is positioned at a rear of the baler. Each of the first and second bale chambers comprise a first sidewall and a second sidewall, an entry point at the front of the first and second bale chambers, an outlet at a rear of the first and second bale chambers, and at least one floor roller positioned at a bottom of each of the bale chambers transverse to the first and second sidewalls. The conveyor system is positioned between the first and second bale chambers. The first bale chamber comprises a variable shape, defined by a first serpentine system comprising one or a plurality of endless belts in operable contact with one or a plurality of movable rollers to facilitate movement of the bale in the first bale chamber, and out of the first bale chamber and into the second bale chamber. The second bale chamber comprises a fixed shape, defined by a second serpentine system comprising a plurality of stationary rollers to facilitate movement of the bale in the second bale chamber and from the second bale chamber through the outlet of the second bale chamber.

BRIEF DESCRIPTION OF DRAWINGS

FIGS. 11A-H are cross-sectional, diagrammatic side views of an exemplary continuous round baler of the present disclosure including a split configuration of a second bale chamber.

DETAILED DESCRIPTION

Figure 1:
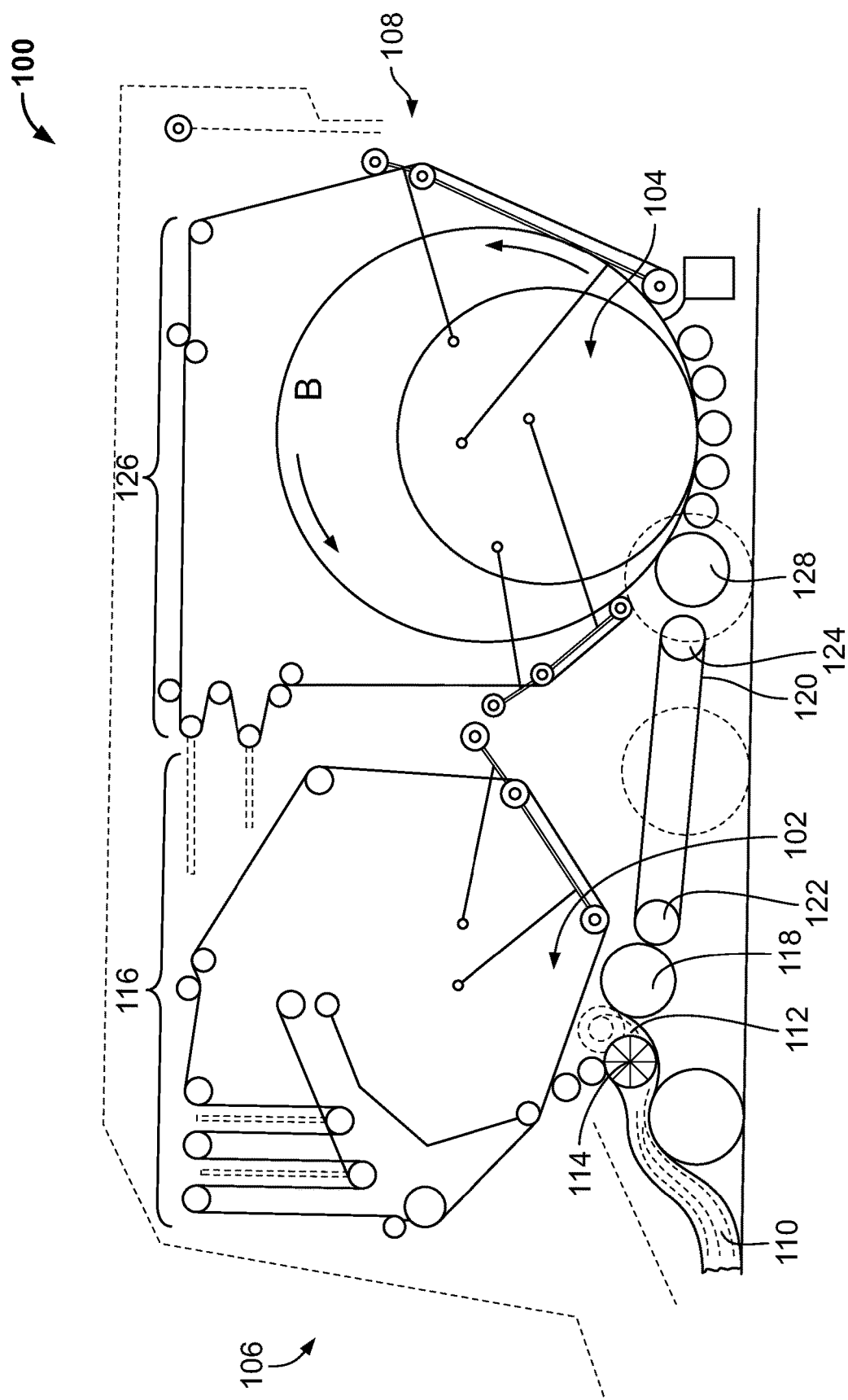
FIG. 1 is a cross-sectional side view of a baler of the prior art.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g., 3, 4, or 5.

The term "plurality" as used herein is defined as any amount or number greater or more than 1. In some embodiments, the term "plurality" means 2, 3, 4, 5, 6 or more.

The terms "left" or "right" are used herein as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes.

The term "about" or "approximately" as used herein when referring to a measurable value such as an amount, a temporal duration, and the like, is meant to encompass variations of ±20%, ±10%, ±5%, ±1%, ±0.5%, ±0.4%, ±0.3%, ±0.2%, ±0.1%, ±0.09%, ±0.08%, ±0.07%, ±0.06%, ±0.05%, ±0.04%, ±0.03%, ±0.02% or ±0.01% from the specified value, as such variations are appropriate to perform the disclosed methods.

The term "substantially equal" as used herein when referring to a measureable and/or adjustable value is meant to encompass a value equal to or approximately equal to a set value or range. For example, the value can be equal to or within ±5%, ±1%, ±0.5%, ±0.4%, ±0.3%, ±0.2%, ±0.1%, ±0.09%, ±0.08%, ±0.07%, ±0.06%, ±0.05%, ±0.04%, ±0.03%, ±0.02% or ±0.01% of a set desired value or an expected value.

The term "bale chamber" as used herein is defined as any space within the agricultural harvester that forms a bale of harvested crop. In some embodiments, the sides of the bale chamber are defined by opposite side walls and the bottom of the bale chamber is defined by at least one floor roller that spans transverse to the sidewalls and that partially supports the weight of the bale in the bale chamber. In some embodiments, the bale chamber is also defined in its front region by an entry point through which harvested material or crop enters. In some embodiments, the front region of a first bale chamber is defined by an inlet or entry point which is in operable connection to a throat of a crop harvesting assembly, such as a pickup or rotary cutter, and which is defined in a space between the first sidewall, the second sidewall, the bale carrier, and a plurality of rollers positioned between and attached to the first and second sidewalls; the plurality of rollers support one or more baling belts. In some embodiments, at least one, at least two, at least three, or at least four floor rollers extend transverse to the opposite sidewalls along the bottom and front of the bale chamber adjacent to the top and bottom of the entry point. In some embodiments a bale carrier is positioned in and defines the back of the bale chamber by obstructing an outlet in its fully closed position. In some embodiments, the rollers extending beyond the side walls allow the width of the bale chamber to be selectively increased. In some embodiments, side walls which can be moved laterally, i.e., in the direction of the width of the round baler, enable making bales of different widths or the friction between the walls and bale to be reduced when ejecting the bale.

The term "bale carrier" is defined as a retractable mechanism that obstructs an entry or outlet of a bale chamber when the bale carrier is in its fully closed position. In some embodiments, the bale carrier is controlled by an operator, who through a controller, uncovers the entry or outlet points of the bale chamber when the bale is of a desired width, height and/or density. Bale carriers are described in U.S. Pat. No. 8,991,308, which is incorporated herein by reference in its entirety. Controllers are generally known in the art and any controller for the agricultural harvester can be used independent of or in conjunction with a tractor controller. Examples of controllers are described in U.S. Pat. No. 7,640,721, which is incorporated herein by reference in its entirety. In some embodiments, the bale carrier movable among a closed position and one or more open positions, comprising: a first pair of arms extending transversely from and affixed to a first pair of pivot points on the first and second sidewalls; a second pair of arms extending transversely from and affixed to a second pair of pivot points on the first and second sidewalls; one or more fixed members positioned at a distance defined by the length of the first and second pair of arms; and a pair of parallel affixed to the one or more fixed members; the bale carrier uncovers the outlet at one end of the bale chamber through which the bale becomes ejected from the bale chamber when the bale carrier is raised upward from its closed position. In some embodiments, at least one bale carrier comprises a fourth roller contained within at least a first or second serpentine system and positioned above the first, second, and third rollers, the fourth roller imparts tension in one or more baling belts when the at least one bale carrier is in its fully closed position. It is understood that a first or second serpentine system comprises the bale carrier and the rollers that are contained within each bale carrier.

The term "information" as used herein is defined as data values attributed to parameters. In some embodiments, information is digital and/or analog information. In some embodiments, information is the current operable mode of the baler. In some embodiments, warning information can be audio and/or visual information. In some embodiments, warning information is information that is capable of alerting an operator that an action may need to be taken.

Discussions herein utilizing terms such as, for example, "processing," "computing," "calculating," "determining," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which comprises but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may comprise any apparatus that can contain, store, communicate, propagate, or transport the program for use by or in connection with the instruction execution system, or harvester. In some embodiments, the harvester comprises a software system with executable code that executes different hydraulic states based on operator settings. In some embodiments, the disclosure also relates to a computer software product with executable code that automatically toggles between or through different hydraulic states based on operator settings of the harvester. The software program product may be on any medium or a component of a system optionally configured for update or install into the software of an existing baler.

In some embodiments, the medium may be or may comprise an electronic, magnetic, optical, electromagnetic, InfraRed (IR), or semiconductor system (or apparatus or device) or a propagation medium. Some demonstrative examples of a computer-readable medium may comprise a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks comprise Compact Disk-Read-Only Memory (CD-ROM), Compact Disk-Read/Write (CD-R/W), DVD, or the like.

In some embodiments, the disclosure relates to a processing system including a processing device suitable for storing and/or executing program code and may comprise at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution. In some embodiments, the memory is capable of storing preferred settings or information about the speed of the crop merger belt.

In some embodiments, input/output or I/O devices (including but not limited to keyboards, displays, pointing devices, etc.) may be coupled to the system either directly or through intervening I/O controllers. In some embodiments, I/O devices may be coupled to the system directly or to I/O controller by an I/O bus (cables and or wires which connect the devices and enable the information to pass therebetween). In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used. Any sensor disclosed herein may function on any disclosed harvester by integration into one or more data processing systems of the baler. For example, in some embodiments, the disclosure relates to a data processing system including executable software program product configured for sending and receiving information about the settings of the baler.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Furthermore, the various components shown or described herein for any specific application of this invention can be varied and the practice of a specific application of any element may already be widely known or used in the art by persons skilled in the art and each will likewise not therefore be discussed in significant detail.

Agricultural balers, such as round balers, are well known in the agricultural industry, and the instant invention can be used with substantially any of such machines. Reference is made, for example, to U.S. Pat. Nos. 6,877,304; 6,688,092; 6,644,006 and 6,295,797 that illustrate such balers, the disclosures of which are incorporated herein by reference in their entirety. Embodiments of the present invention are particularly well suited, but in no way limited to, use with agricultural balers. The present invention may also find utility in agricultural harvesters including, for example, a waste baler, a cotton harvester, or a combine.

In some embodiments, the exemplary crop harvesting system includes a first bale chamber having a variable shape defined by a first serpentine system of belts and rollers, and a second bale chamber having a fixed shape defined by a second serpentine system of belts and rollers. Crop collected at an entry point at the front of the baler enters the first bale chamber where an initial bale is formed. After the bale has reached a predetermined size, a conveyor system positioned between the first and second bale chambers transfers the bale from the first bale chamber to the second bale chamber. The bale continues to be formed in the second bale chamber until a predetermined size is reached, at which point a net wrapping mechanism wraps the bale and the bale is ejected from the rear of the baler. During formation of the bale in the second bale chamber, another bale can be simultaneously formed in the first bale chamber, thereby defining a continuous baling operation in the first and second bale chambers. The combination of variable and fixed bale chambers provides for a shorter overall length of the baler and a reduced number of movable components, lowering the overall cost and maintenance of the baler.

Figure 2:
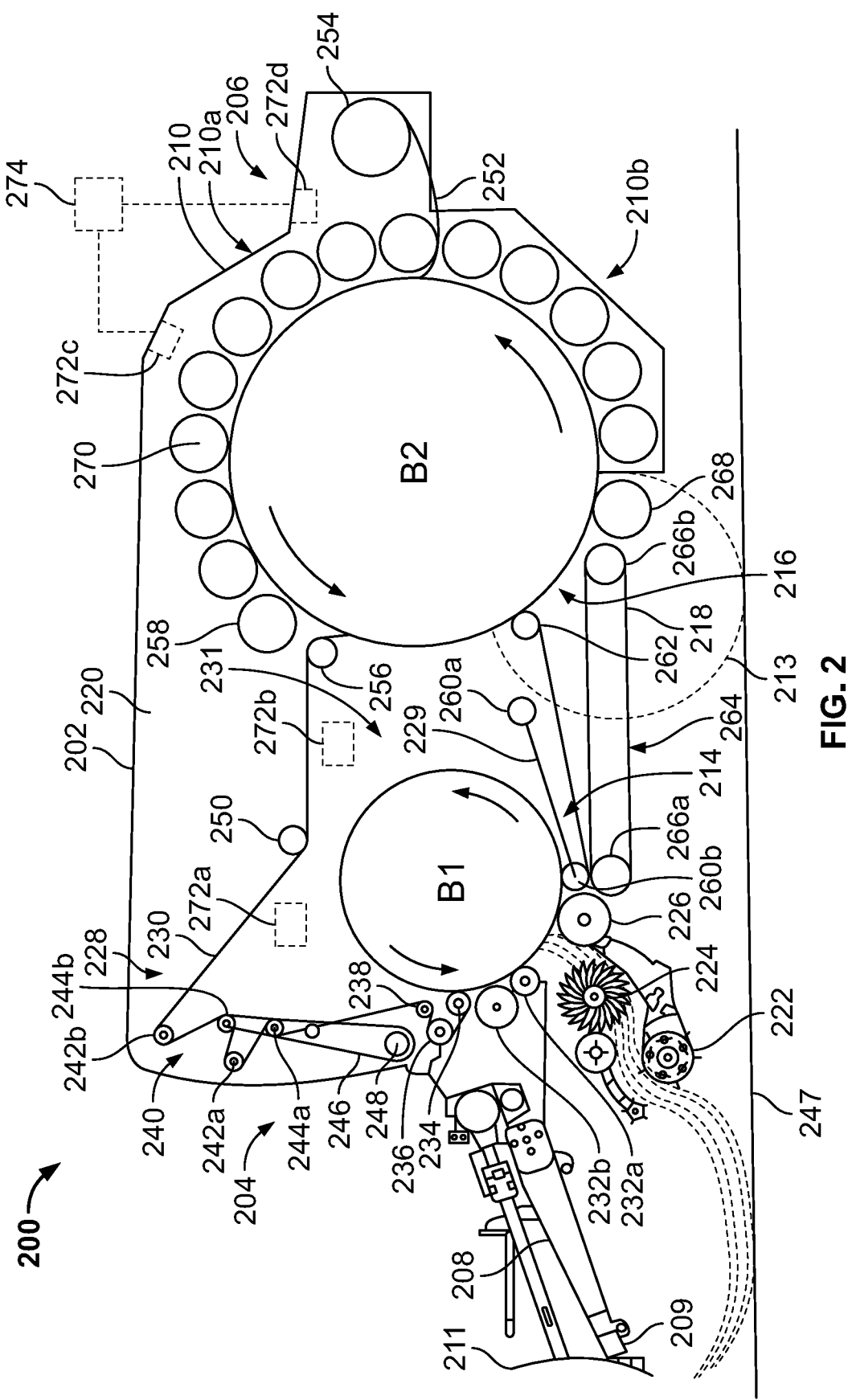
FIG. 2 is a cross-sectional side view of an exemplary continuous round baler of the present disclosure.

FIG. 2 is a cross-sectional side view of an exemplary continuous round baler 200 of the present disclosure. The baler 200 includes a main frame 202 extending between and defining the front 204 and rear 206 of the baler 200. The baler 200 includes a tongue 208 extending from the front 204 of the main frame 202 with a hitch 209 for connecting the tongue 208 to a tractor 211 (or any other driving means for pulling the baler 200 along the field). The baler 200 includes a pair of wheels 213 mounted to the main frame 202 at one or more transverse axles for transporting the baler 200 along the field. The baler 200 includes a tailgate 210 at the rear 206 of the main frame 202 for ejection of the formed bale B2. In some embodiments, the baler 200 can include a support or platform used for bale ejection extending from the bottom of the main frame 202 at the rear 206 and pivotably connected to the main frame 202 at a pivot point. The platform can assist in ejecting the bale B2 from the baler 200.

The baler 200 includes a first bale chamber 214 near the front 204 of the baler 200, and a second bale chamber 216 near the rear 206 of the baler 200. The first and second bale chambers 214, 216 are operably coupled by a conveyor system 218 disposed between the first and second bale chambers 214, 216. In some embodiments, the conveyor system 218 can be angled downwardly from the front 204 to the rear 206 of the baler 200. The baler 200 includes first and second sidewalls 220 (only first sidewall shown in cross-sectional view) for the first and second bale chambers 214, 216. Cut crop is picked up by a transverse pickup assembly 222 at an entry point of the baler 200, a rotocutter 224 cuts the crop into smaller lengths, and a floor roller 226 feeds the crop into the first bale chamber 214. The floor roller 226 is positioned at the bottom of the first bale chamber 214 and extends transverse to the sidewalls 220. The crop is rolled into a cylindrical shape in the first bale chamber 214 to form an initial bale B1 (e.g., a bale core).

The first bale chamber 214 has a variable shape defined by a first serpentine system 228 including one or a plurality of endless belts 230 in operable contact with one or a plurality of movable and fixed rollers. As discussed herein, movable rollers are capable of being actuated to shift the position of the transverse axis about which the roller rotates, and fixed rollers have a transverse axis of rotation that is fixed or stationary in one position. The baler 200 includes a bale ejector 229 (e.g., bale carrier) that obstructs the outlet 231 of the first bale chamber 214 in its fully closed position. The bale B1 can rotate between the first and second sidewalls 220 such that the top material moves frontward and downward with respect to the baler 200 in the first bale chamber 214.

The system 228 includes two fixed rollers 232a, 232b that rotate in combination with the floor roller 226, defining the front and downward region of the first bale chamber 214. In some embodiments, the rollers 232a, 232b can be replaced with three or more forming rollers. The system 228 includes a fixed roller 234 that holds the belt 230 downward, a driving roller 236 and an assist roller 238. A take-up assembly 240 includes two stationary rollers 242a, 242b and two movable rollers 244a, 244b for taking up the slack in the belt 230 from the stationary rollers 242a, 242b. The take-up assembly 240 maintains the belt 230 at an angled orientation relative to horizontal 247 (e.g., in a non-parallel and non-perpendicular orientation relative to horizontal). The movable rollers 244a, 244b can be operably coupled to a pivot arm 246 pivotably coupled at a stationary pivot point 248. The arm 246 is capable of radial movement based on actuation of a hydraulic cylinder. The belt 230 extends underneath a fixed roll 250 to maintain tension in the belt 230, and further extends around a fixed roller 256, and a movable roller 262.

The belt 230 can be held downward by one of the rollers 260a of the bale ejector 229 (e.g., carrier), with the bale ejector 229 pivotably coupled at an opposing roller 260b. The dual pivoting of the bale ejector 229 at the rollers 260a-b allows for efficiently clearing the bottom space within the baler 200, and minimizes the overall length of the baler 200. The belt 230 extends to the roller 260b before extending around the bale B1 to spin the bale B1 during formation. The second bale chamber 216 includes a movable roller 262 capable of moving downward to close the front section of the second bale chamber 216 with the curtain after the bale B1 is transferred to the second bale chamber 216 via the conveyor system 218. The conveyor system 218 includes a conveyor belt 264 actuated to spin on two fixed rollers 266a, 266b. The bale ejector 229 can move upwardly when the bale B1 has reached a predetermined size, allowing the bale B1 to rest on the conveyor 264 of the conveyor system 218 to transfer the bale B1 from the first bale chamber 214 to the second bale chamber 216. After transfer to the second bale chamber 216, the bale B2 is spun on a fixed floor roller 268.

One or more fixed rollers 270 (e.g., a second serpentine system 271) define the fixed shape of the second bale chamber 216, forming a substantially semi-circular configuration, and assist in rolling the bale B2 until the desired size, shape and/or density is reached. Fixed roller 258 can define the top, front-most roller of the rollers 270. In some embodiments, the first bale chamber 214 and/or the second bale chamber 216 can include one or more sensors 272a-d in operable communication with a controller 274. Although shown diagrammatically, it should be understood that the controller 274 can be located within the baler 200, within the tractor 211, or the like. The sensors 272a-d can detect the diameter and/or density of the respective bales B1, B2 to determine when the bale B1 is ready to be transferred to the second bale chamber 216, and when the bale B2 is ready to be wrapped and ejected from the baler 200.

After the bale B2 has reached the desired size and/or density, the net wrap assembly 254 can be used to wrap the bale B2 with netting 252, and the tailgate 210 can be opened to eject the bale B2 from the baler 200. In some embodiments, the net wrap assembly 254 can be disposed at the rear, central portion of the tailgate 210, with the net wrap assembly 254 pivoting upwards with the tailgate 210 during ejection of the bale B2. In such embodiments, the tailgate 210 can be split into two doors or sections 210a-b, with netting 252 introduced into the second bale chamber 216 between the adjacently disposed rollers 270 of the two sections 210a-b. During ejection of the bale B2, the two sections 210a-b can pivot away from each other to expose the outlet of the baler 200. Although shown at the rear of the baler 200, it should be understood that the net wrap assembly 254 could be disposed at any location around the second bale chamber 216. The location of the net wrap assembly 254 can be selected such that it can be easily accessed by the operator for loading of the netting 252. The conveyor system 264 can run substantially continuously at a constant speed, while the first and second serpentine systems 228, 271 can be driven independently to provide for continuous baling.

Figure 3:
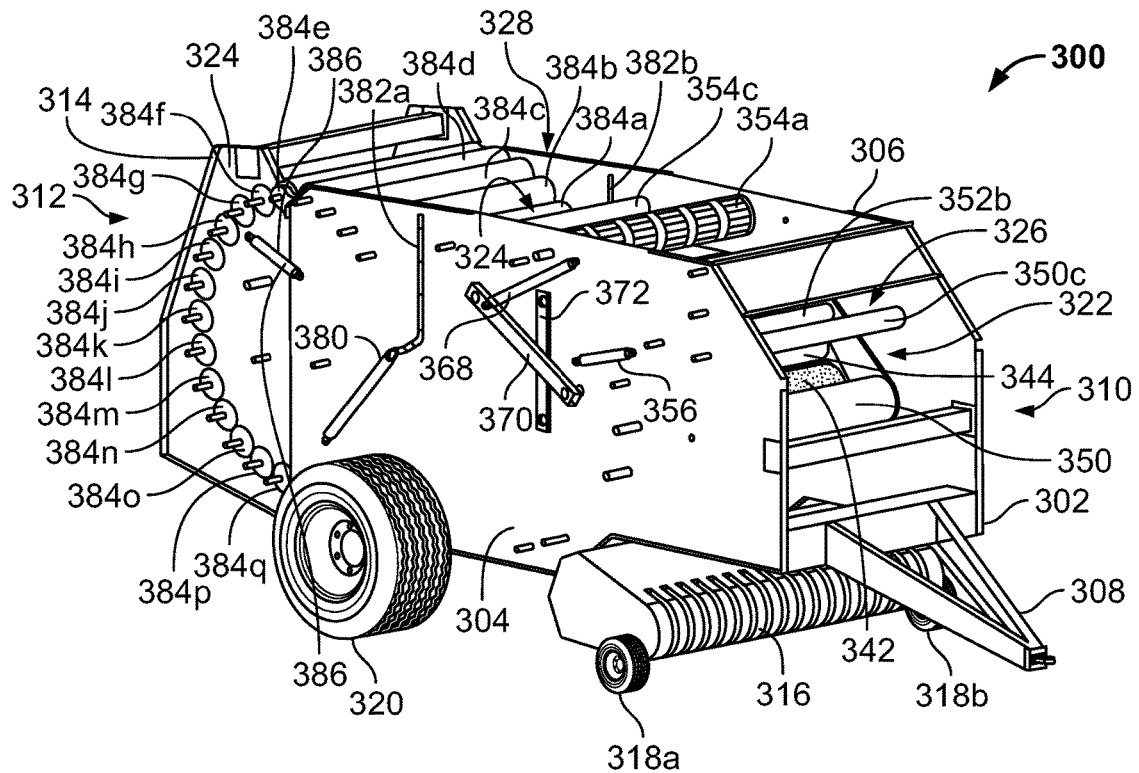
FIG. 3 is a front perspective view of an exemplary continuous round baler of the present disclosure with a tailgate in a closed position.
Figure 4:
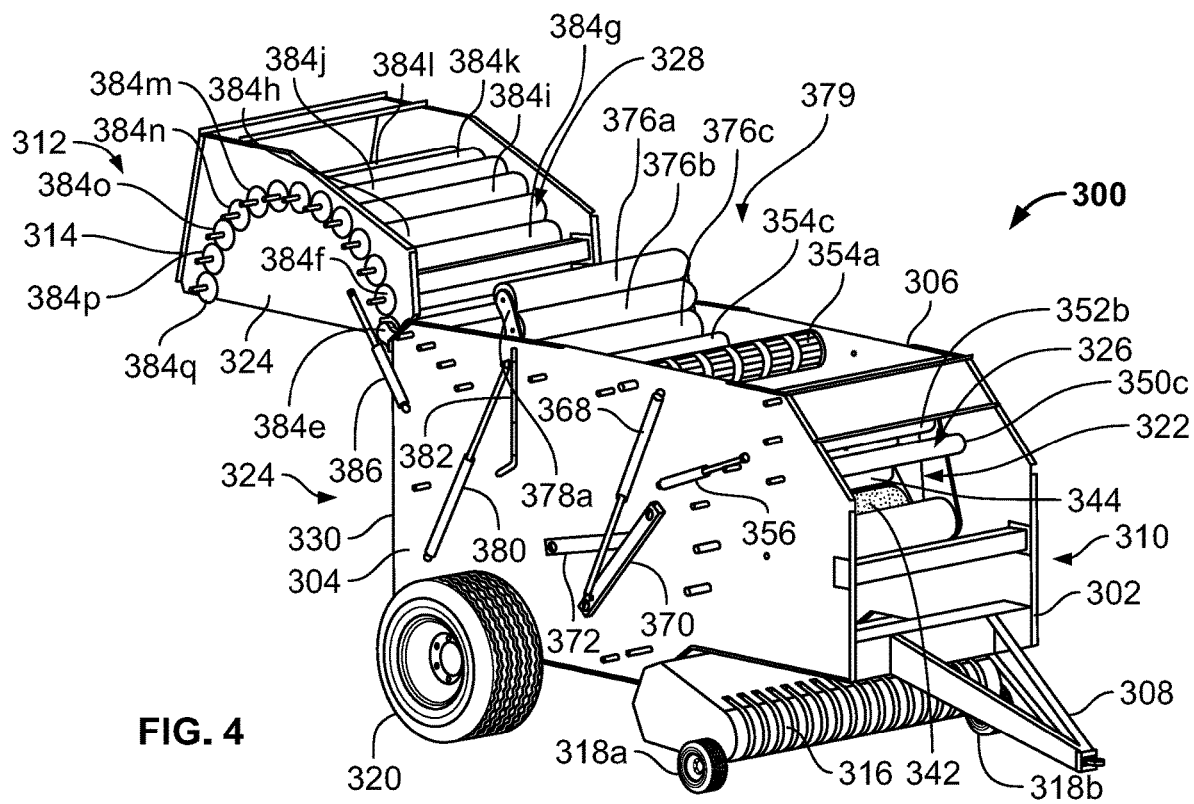
FIG. 4 is a front perspective view of an exemplary continuous round baler of FIG. 3 with a tailgate in an open position.
Figure 5:
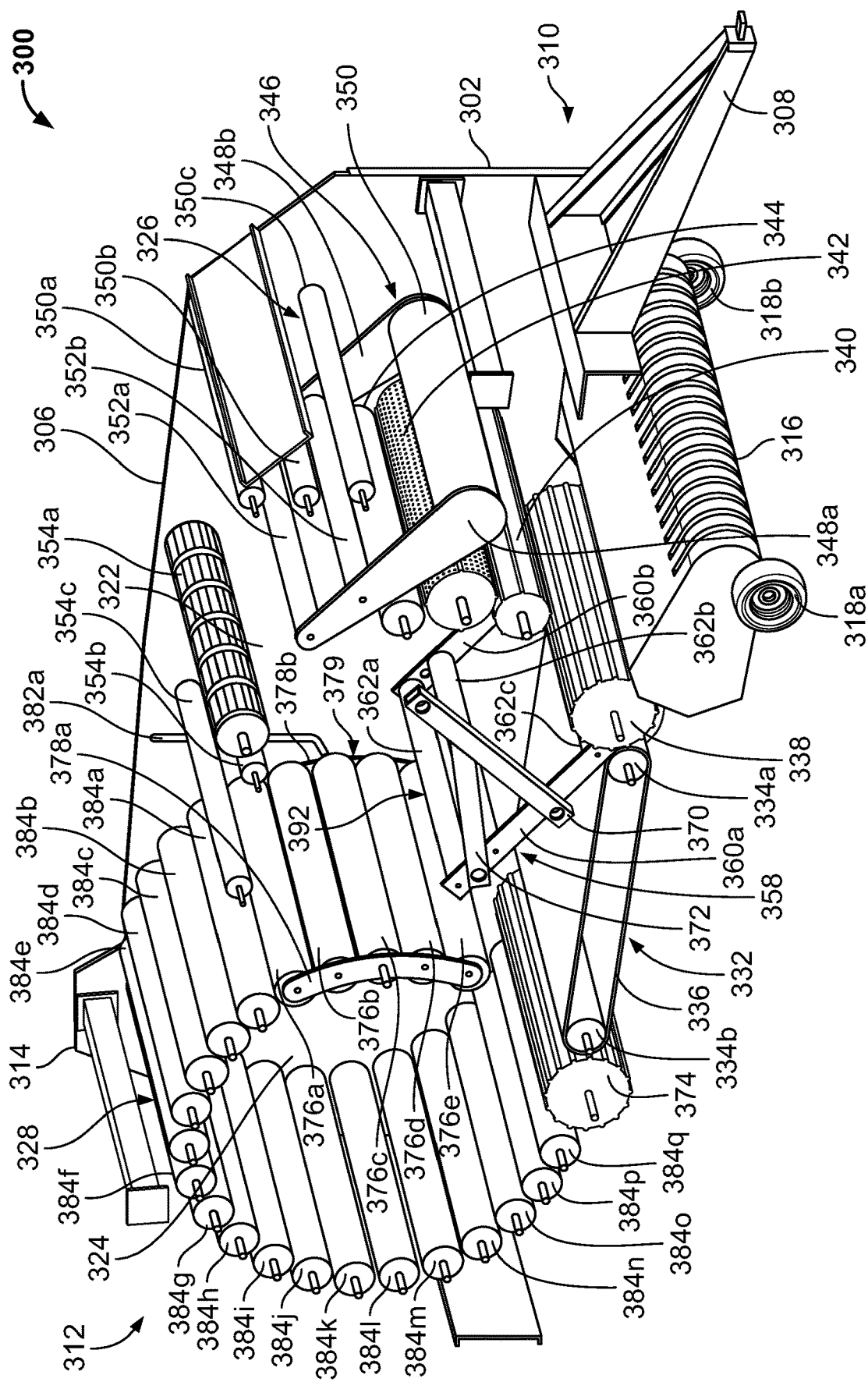
FIG. 5 is a cross-sectional side view of an exemplary continuous round baler of FIG. 3.

FIGS. 3-5 show perspective and cross-sectional views of an exemplary continuous round baler 300 of the present disclosure. The baler 300 can be substantially similar in structure and function to the baler 200, except for the features discussed herein. The baler 300 includes a main frame 302 with first and second sidewalls 304, 306. A tongue 308 extends from the front 310 of the main frame 302, and the rear 312 of the baler 300 include a tailgate 314 configured to be actuated into a closed and open position. The baler 300 includes an intake assembly 316 at the bottom of the front 310 of the main frame 302. The intake assembly 316 can include a pickup assembly, a rotocutter, or the like. In some embodiments, a pair of front wheels 318a-b can be rotatably coupled to the intake assembly 316. Rear wheels 320 can be rotatably coupled on opposing sides of the main frame 302 near the rear 312 of the baler 300 (short of the tailgate 314).

The baler 300 includes a first bale chamber 322 near the front 310 and a second bale chamber 324 near the rear 312 of the baler 300. The bale chambers 322, 324 can be substantially independently operated to allow for continuous bale formation in each of the bale chambers 322, 324, ensuring an efficient baling process. The first bale chamber 322 is associated with a first serpentine system 326 including fixed and movable rollers that maintain tension in one or more belts to facilitate formation of a bale in the first bale chamber 322 and movement of the bale from the first bale chamber 322 into the second bale chamber 324. The second bale chamber 324 is associated with a second serpentine system 328 of fixed rollers that facilitate formation of the bale in the second bale chamber 324 and movement of the bale through the outlet 330 of the second bale chamber 324. The baler 300 includes a conveyor system 332 disposed between the first and second bale chambers 322, 324. The conveyor system 332 includes two fixed rollers 334a-b and a conveyor belt 336 stretched over the rollers 334a-b. In the view shown in FIG. 5, the rollers 334a-b rotate in a counterclockwise direction at a substantially constant speed such that when ready, the bale formed in the first baling chamber 322 can be transferred to the second bale chamber 324.

The first bale chamber 322 includes a fixed floor roller 338 near the front, bottom section of the first bale chamber 322, and fixed formation rollers 340, 342, 344 near the front of the first bale chamber 322. In some embodiments, the floor roller 338 can be disposed along a plane offset vertically upward from the conveyor system 332. One or more endless belts (not shown) can be positioned and stretched around the roller 344 to maintain the position and rotation of the bale as it forms in the first bale chamber 322. The first serpentine system 326 includes a take-up assembly 346 configured to maintain and release tension in the belt(s) of the first bale chamber 322. The take-up assembly 346 includes pivot arms 348a-b pivotably coupled on opposing sides of a fixed pivot 350, fixed rollers 350a-c coupled transversely between the side walls 304, 306 of the baler 300, and movable rollers 352a-b pivotably coupled between the pivot arms 348a-b. Hydraulic actuators 356 coupled on the outside of the sidewalls 304, 306 and operably coupled to the respective pivot arm 348a-b can be used to pivot the take-up assembly 346 clockwise or counterclockwise at the pivot 350 to maintain or release the tension in the belt such that the belt is disposed against the outer surface of the bale. The belt can zigzag between the fixed and movable rollers 350a-c, 352b-c at angles non-parallel and non-perpendicular to horizontal (see, e.g., FIG. 6A). Fixed rollers 354a-c can be transversely coupled between the sidewalls 304, 306 near the top of the baler 300, with the belt extending from the uppermost fixed roller 350a to the fixed rollers 354a-c. Although a pre-charged hydraulic actuator 356 is shown, it should be understood that a pre-charged actuator with springs, only springs, or the like, can be used to achieve a set tension in the belt(s) of the take-up assembly 346. In operation, the tension in the belt of the take-up assembly 346 can be adjusted manually by an operator, automatically from the tractor, electrically from the tractor, or the like.

The movable rollers 352a-b of the take-up assembly 346 can be gradually moved toward the stationary or fixed rollers 350a-c as the bale increases in diameter and is grown within the first bale chamber 322 due to additional force being exerted on the belt from the increasing diameter of the bale. The additional or growing force on the belt imparted by the bale results in the take-up assembly 346 moving and maintaining a substantially constant tension in the belt by releasing the stored belt length within the first serpentine system 326. Such release of the stored belt length occurs as the movable rollers 352a-b are gradually moved toward the fixed rollers 350a-c. For example, as the bale increases in diameter, the take-up assembly 346 can pivot clockwise (relative to the orientation of FIG. 5) to maintain a substantially constant tension on the growing bale. The take-up assembly 346 thereby acts as an active belt storage system that maintains a set tension in the belt by releasing some belt length to alleviate the additional force due to a growing bale. As noted herein, the take-up assembly 346 can also react when the bale carrier 358 moves in the downward or upward position.

The first serpentine system 326 includes a bale carrier 358 movably coupled relative to the sidewalls 304, 306. The bale carrier 358 includes pivot arms 360a-b and rollers 362a-c rotatably coupled between the pivot arms 360a-b. In some embodiments, only two rollers 362a-c can be implemented. The rollers 362a-c are movable relative to the sidewalls 304, 306 based on pivoting of the pivot arms 360a-b. The bale carrier 358 is coupled to linkages 370, 372 pivotably coupled to each other and the pivot arms 360a-b. The belt extends from the roller 354c to the rollers of the bale carrier 358. In the first or lowermost position shown in FIG. 5, the bale carrier 358 assembly and belt block the outlet at the rear of the first bale chamber 322 (e.g., the space between the first and second bale chambers 322, 324), preventing the bale from being transferred to the second bale chamber 324. Hydraulic actuators 368 and linkages 370, 372 (e.g., collectively referred to as tensioning actuators) mounted on opposing sides of the baler 300 can be operably coupled to the bale carrier 358 to actuate movement of the bale carrier 358 from the first or lowermost position to a second or upwardmost position near the top of the baler 300 (see, e.g., FIG. 6D). One or more motors and/or hydraulic systems operably coupled to the hydraulic cylinders discussed herein can be used to extend and retract the hydraulic actuators. When the bale has reached a predetermined diameter or density, the bale carrier 358 can be pivoted and moved to the upwardmost position, thereby exposing the outlet of the first bale chamber 322. The conveyor system 332 transfers the bale from the first bale chamber 322 to the second bale chamber 324.

The second bale chamber 324 includes a fixed floor roller 374 at or near the bottom of the baler 300. The roller 374 can be disposed along a plane offset downwardly relative to the conveyor system 332. The roller 374 maintains the rotation of the bale forming in the second bale chamber 324. The second bale chamber 324 includes a second serpentine system 328 of fixed rollers that maintain the rotation and position of the bale forming in the second bale chamber 324. The second serpentine system 328 forms a fixed shape with the rollers and/or belts, with the inner diameter or size of the second bale chamber 324 remaining substantially constant as compared to the first serpentine system 326 capable of adjusting the inner diameter or size of the first bale chamber 322 to accommodate a growing bale while maintaining a substantially constant tension or pressure with the belt. The second serpentine system 328 includes one group of fixed rollers 376a-e pivotably coupled between two curved arms 378a-b, forming a movable portion 379. Hydraulic actuators 380 mounted on the outside of the sidewalls 304, 306 can be operably coupled to the arms 378a-b to slide the rollers 376a-e along a substantially linear cutout or track 382a-b formed in the sidewalls 304, 306.

In the first or lowermost position shown in FIG. 5, the movable portion 379 blocks or closes the inlet at the front end of the second bale chamber 324 to prevent passage of a bale into the second bale chamber 324. In the second or upwardmost position, the movable portion 379 can be slid upwardly to expose the inlet of the second bale chamber 324 to allow the bale to be transferred into the second bale chamber 324 from the conveyor system 332 (see, e.g., FIG. 6C). In some embodiments, the operation of lifting the bale carrier 358 to the upwardmost position can be performed substantially simultaneously to the operation of lifting the movable portion 379 to the upwardmost position, allowing the bale to be ejected from the first bale chamber 322 onto the conveyor system 332, and from the conveyor system 332 into the second bale chamber 324.

The second serpentine system 328 includes a plurality of fixed rollers 384a-q defining the upper and rear sections of the substantially round second bale chamber 324. The fixed rollers 384a-d can be rotatably coupled between the sidewalls 304, 306 and remain stationary relative to the sidewalls 304, 306. The fixed rollers 384e-q can be rotatably coupled between the sidewalls of the tailgate 314. During opening of the tailgate 314, the fixed roller 384d can act as the pivot point for the tailgate 314, with the fixed rollers 384e-q pivoting with the tailgate 314 to open the outlet 330 of the second bale chamber 324 (see, e.g., FIG. 4). Hydraulic actuators 386 mounted to the sidewalls 304, 306 and the tailgate 314 can be used to pivot the tailgate 314 between the open and closed positions.

Figure 6A:
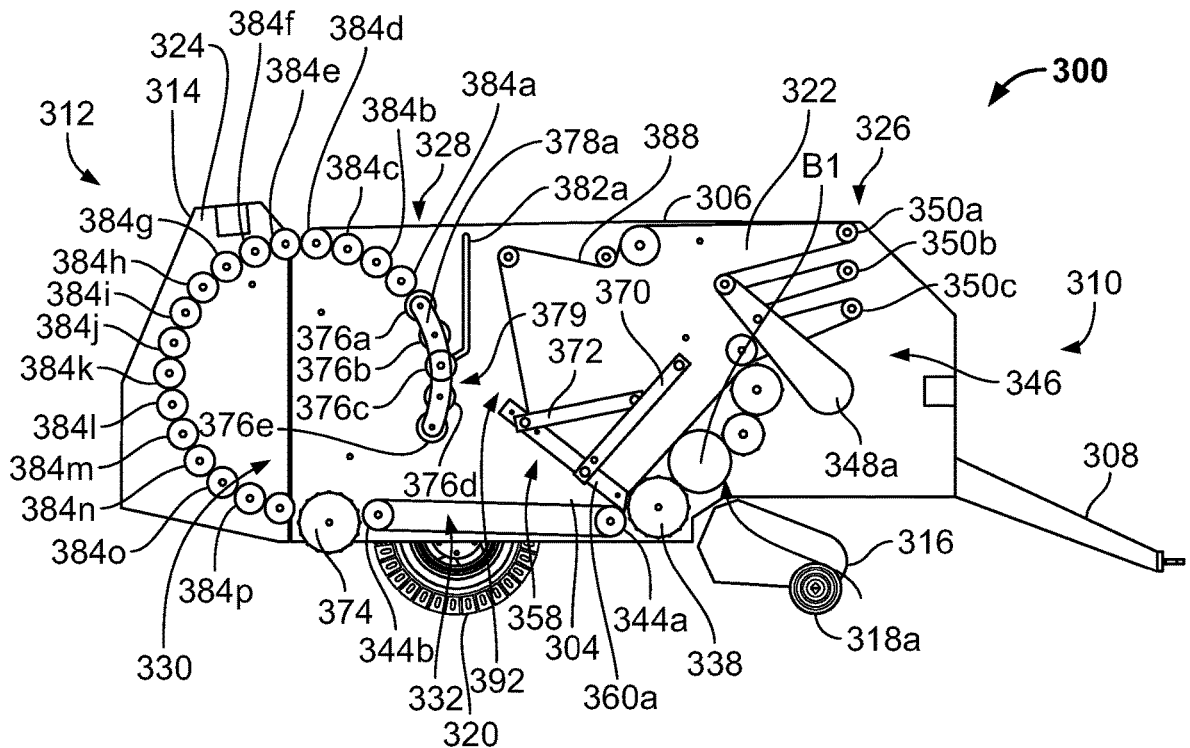
FIGS. 6A-J are cross-sectional side views of an exemplary continuous round baler of FIG. 3 during steps of the baling process.

FIGS. 6A-J are cross-sectional side views of the baler 300 during steps of the baling process. In FIG. 6A, crop is gathered into the baler 300 via the intake assembly 316. The bale carrier 358 is in the first or downwardmost position, positioning the belt 388 of the first bale chamber 322 in an orientation blocking the outlet from the first bale chamber 322. The take-up assembly 346 can be pivoted clockwise to release tension from the belt 388, allowing the belt 388 to extend linearly through the first bale chamber 322 in at least one area. The movable portion of the second serpentine system 328 remains in the lowermost position, blocking the inlet to the second bale chamber 324.

Figure 6B:
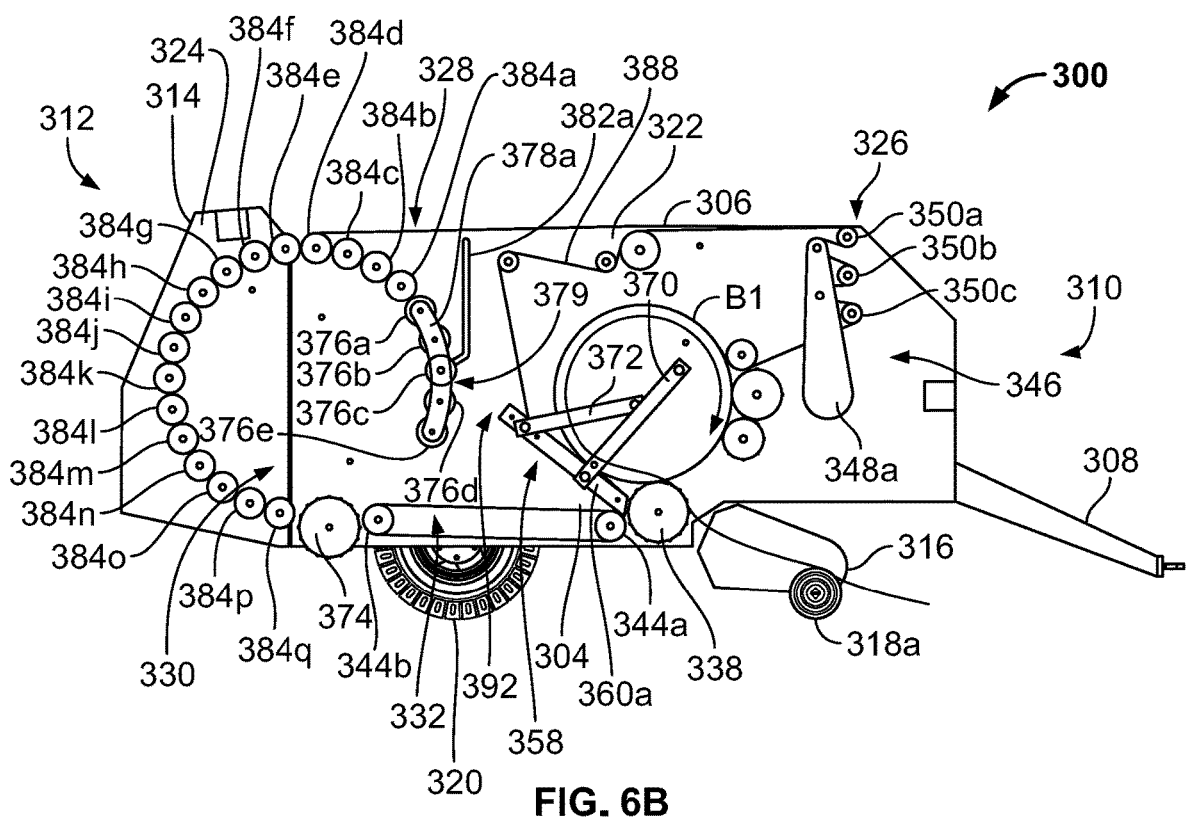

In FIG. 6B, as crop enters the first bale chamber 322, a bale B1 is formed. The take-up assembly 346 position can be adjusted to maintain tension of the belt 388 around the bale B1. For example, the take-up assembly 346 can be pivoted counterclockwise to maintain a substantially constant pressure on the bale B1 with the belt 388. As the bale B1 is formed within the first bale chamber 322, the bale carrier 358 remains in the downwardmost position and the belt 388 extends over the left and top surfaces of the bale B1, preventing the bale B1 from passing to the second bale chamber 324.

Figure 6C:
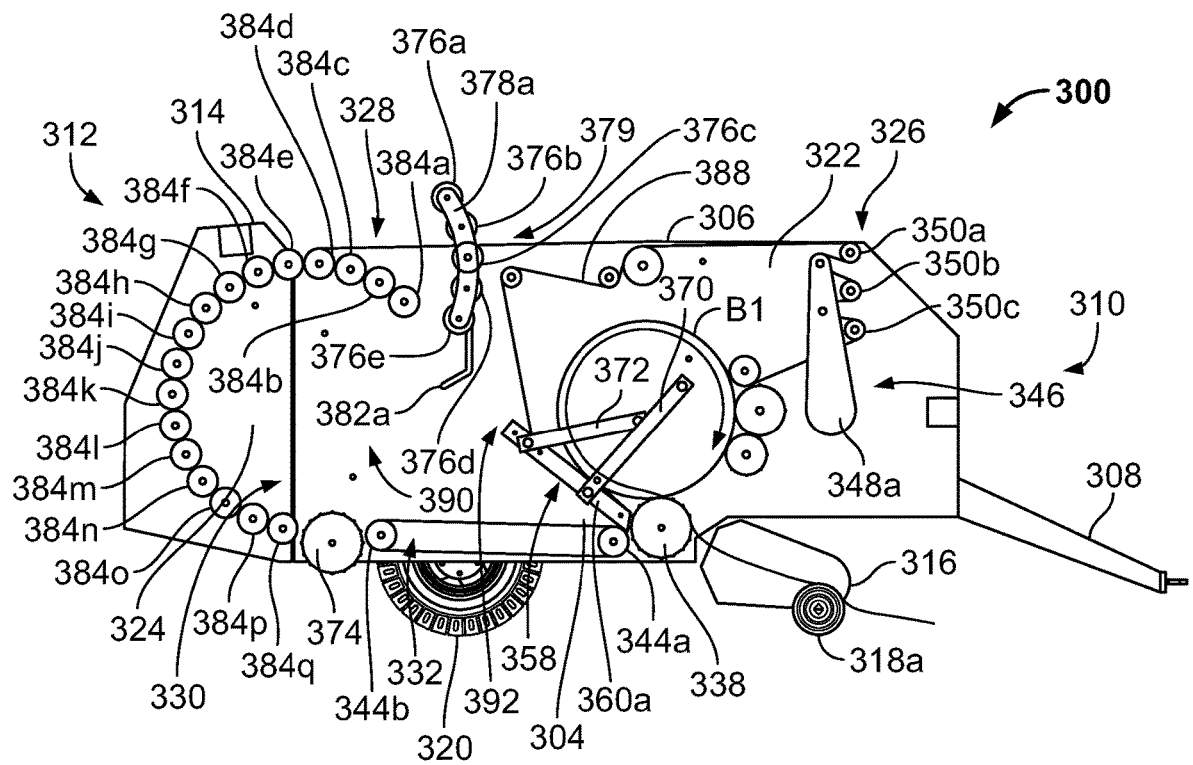

In FIG. 6C, as the bale B1 reaches a predetermined diameter (e.g., detected by one or more sensors disposed within the first bale chamber 322), the movable portion 379 of the second serpentine system 328 can be actuated to slide upward to the second or upwardmost position. Such actuation of the movable portion 379 opens or exposes the inlet 390 to the second bale chamber 324.

Figure 6D:
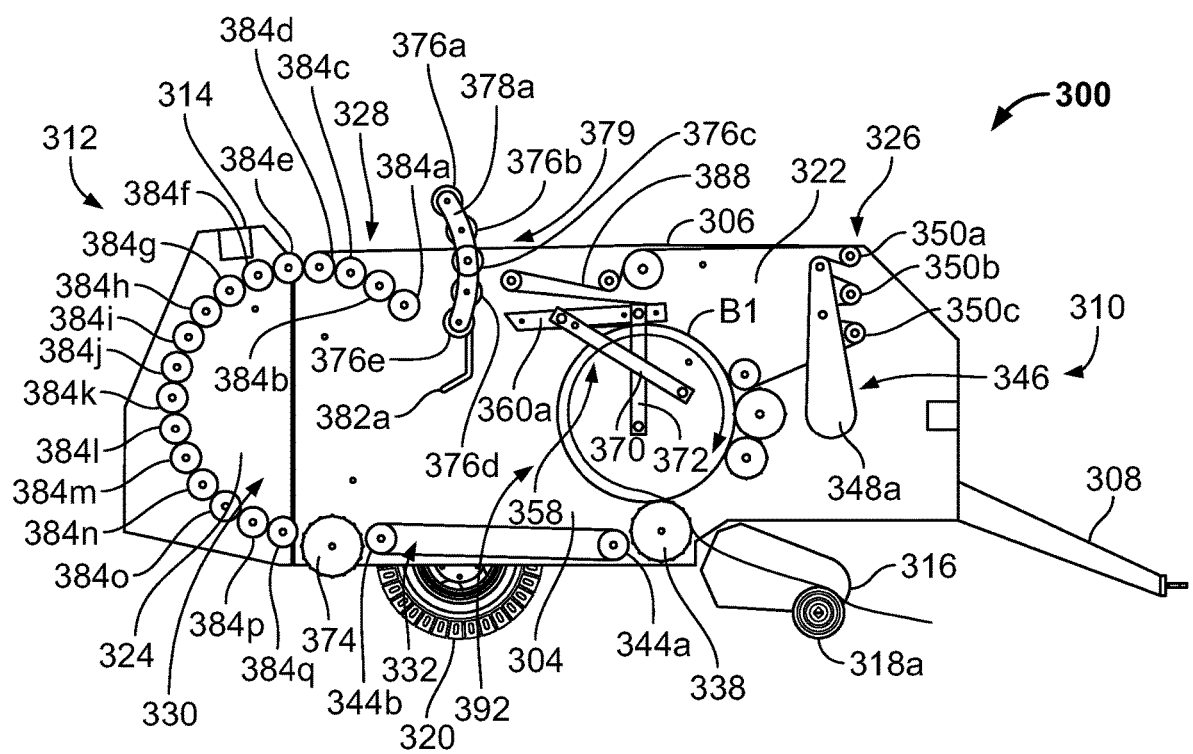

In FIG. 6D, after the movable portion 379 has been actuated into the upwardmost position, the bale carrier 358 is actuated to the second or upwardmost position. Such actuation of the bale carrier 358 opens or exposes the outlet 392 of the first bale chamber 322 by collecting the belt 388 over the top area of the bale B1. Continued rotation of the rollers of the first serpentine system 326 urges the bale B1 onto the conveyor system 332.

Figure 6E:
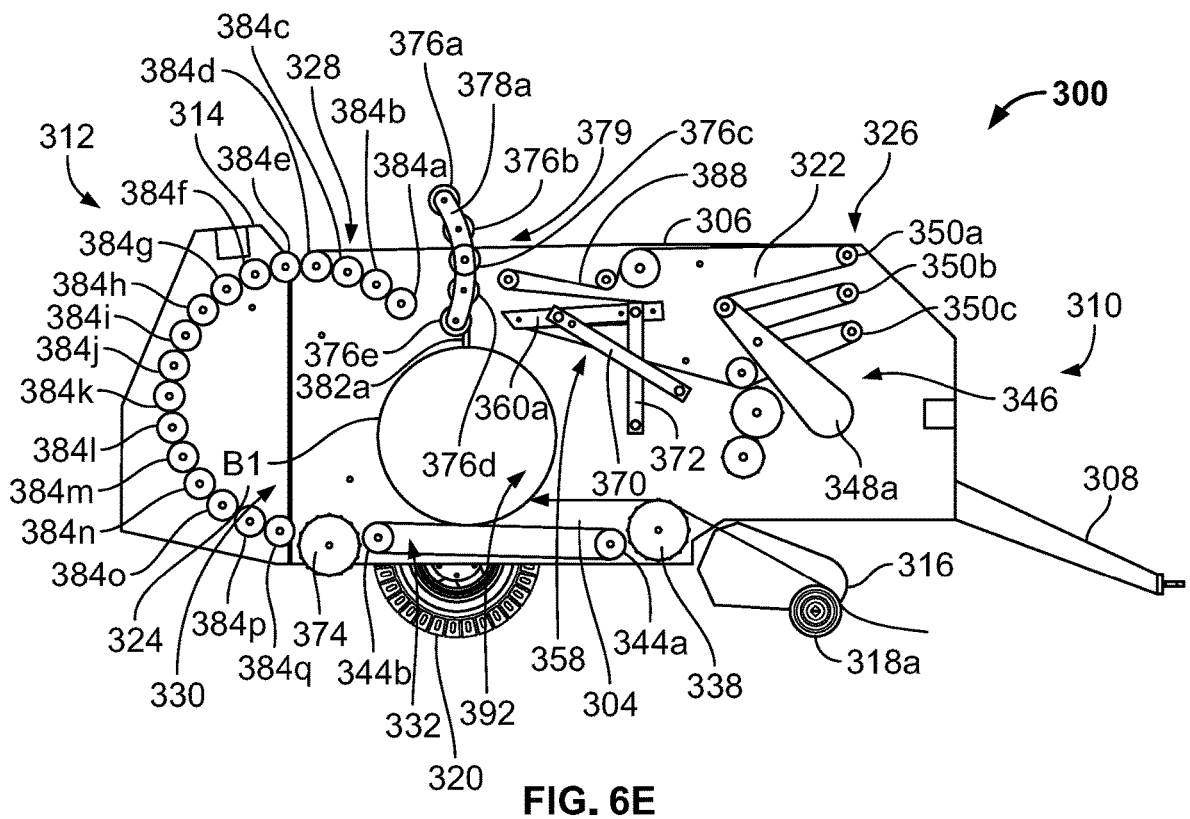

In FIG. 6E, the conveyor system 332 rotates counterclockwise to transfer the bale B1 from the first bale chamber 322 to the second bale chamber 324. The bale carrier 358 and the movable portion 379 remain in the upwardmost positions to prevent interference with the bale B1, allowing the bale B1 to enter the second bale chamber 324.

Figure 6F:
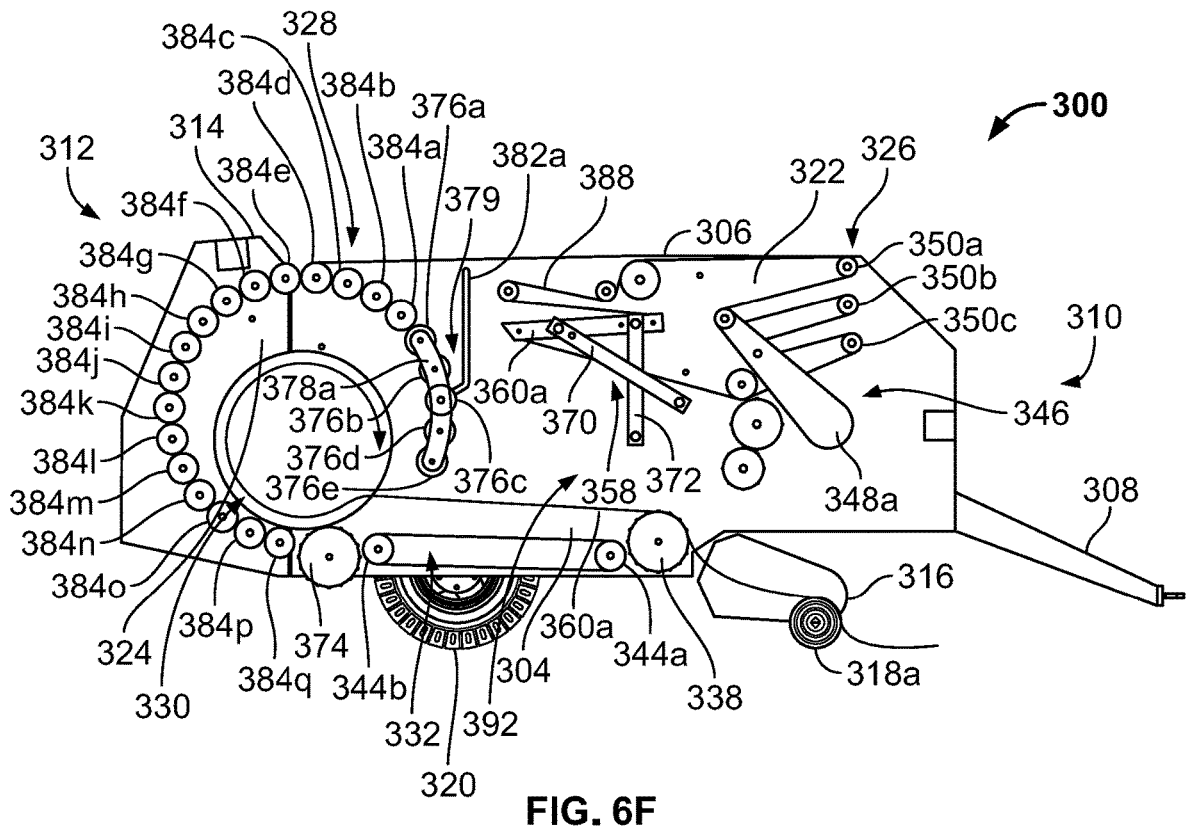

In FIG. 6F, bale B1 enters the second bale chamber 324 and rests over the floor roller 374. The movable portion 379 can be actuated into the first or lowermost position to close or obstruct the inlet 390 of the second bale chamber 324, preventing the bale B1 from moving out of the second bale chamber 324. The bale carrier 358 remains in the upwardmost position until the movable portion 379 has reached the lowermost position, and remains in the upwardmost position while the movable portion 379 is in the lowermost position.

Figure 6G:
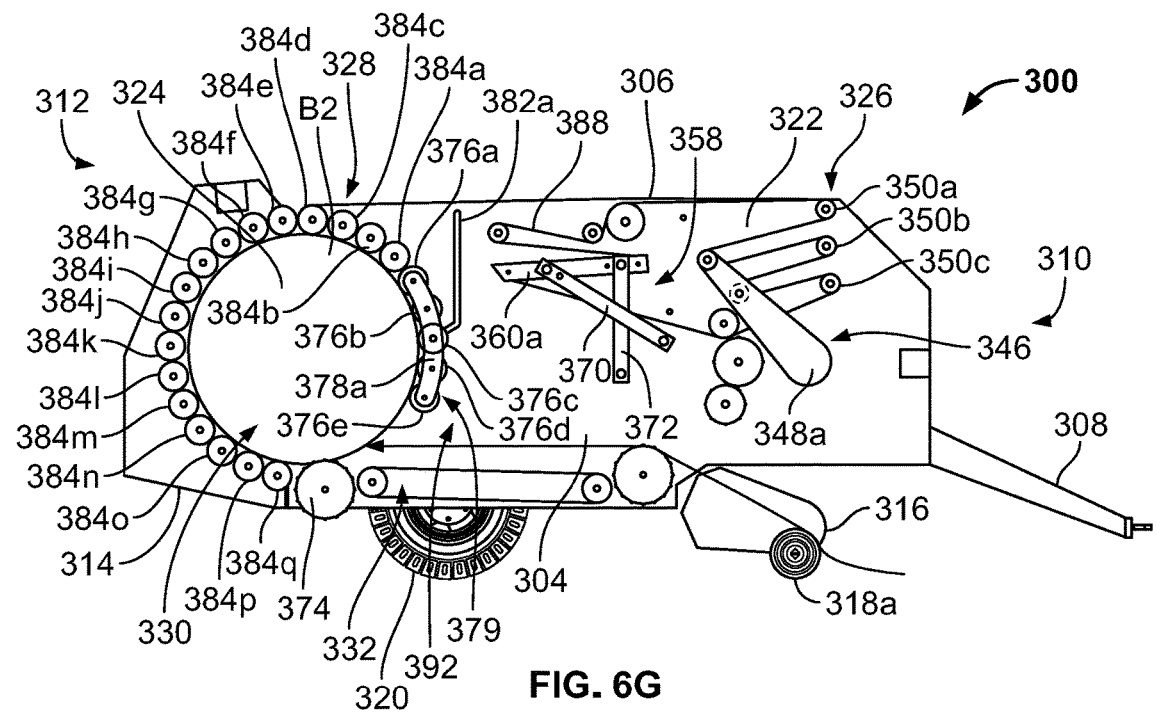

In FIG. 6G, crop is fed into the second bale chamber 324, increasing the size and diameter of the bale B2. In some embodiments, the bale carrier 358 can remain in the upwardmost position until formation of the bale B2 to the desired diameter is completed. In some embodiments, the bale carrier 358 can be actuated into the first or lowermost position, and another bale B1 can be formed in the first bale chamber 322. Such operation allows for continuous baling in both first and second bale chambers 322, 324.

Figure 6H:
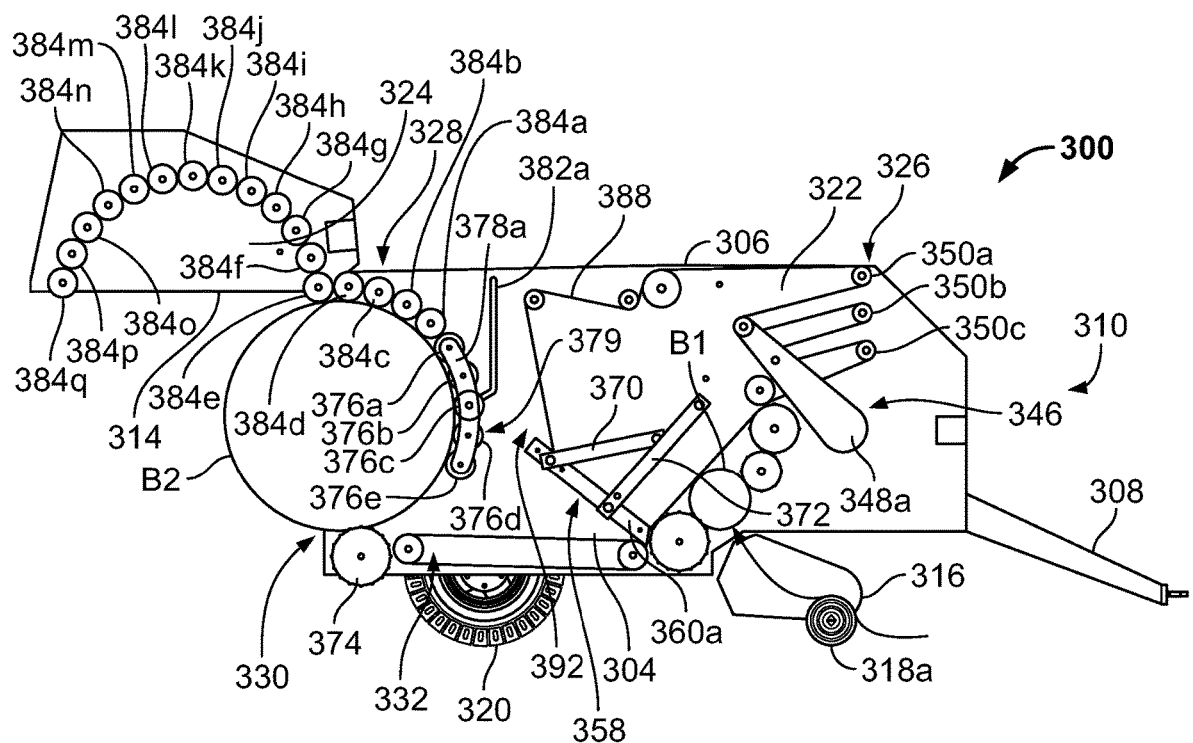

In FIG. 6H, the bale B2 has reached a predetermined diameter as detected by one or more sensors disposed within the second bale chamber 324. In some embodiments, the sensors can be optical. In some embodiments, the sensors can be pressure sensors in the fixed rollers that detect pressure from the bale B2 as the diameter reaches the inner chamber defined by the fixed rollers. The bale carrier 358 can be pivoted downward to the lowermost position in preparation for forming another bale B1. A net wrap assembly is used to wrap the bale B2 prior to ejection from the baler 300. The tailgate 314 can be pivoted clockwise to expose the outlet 330 of the second bale chamber 324.

Figure 6I:
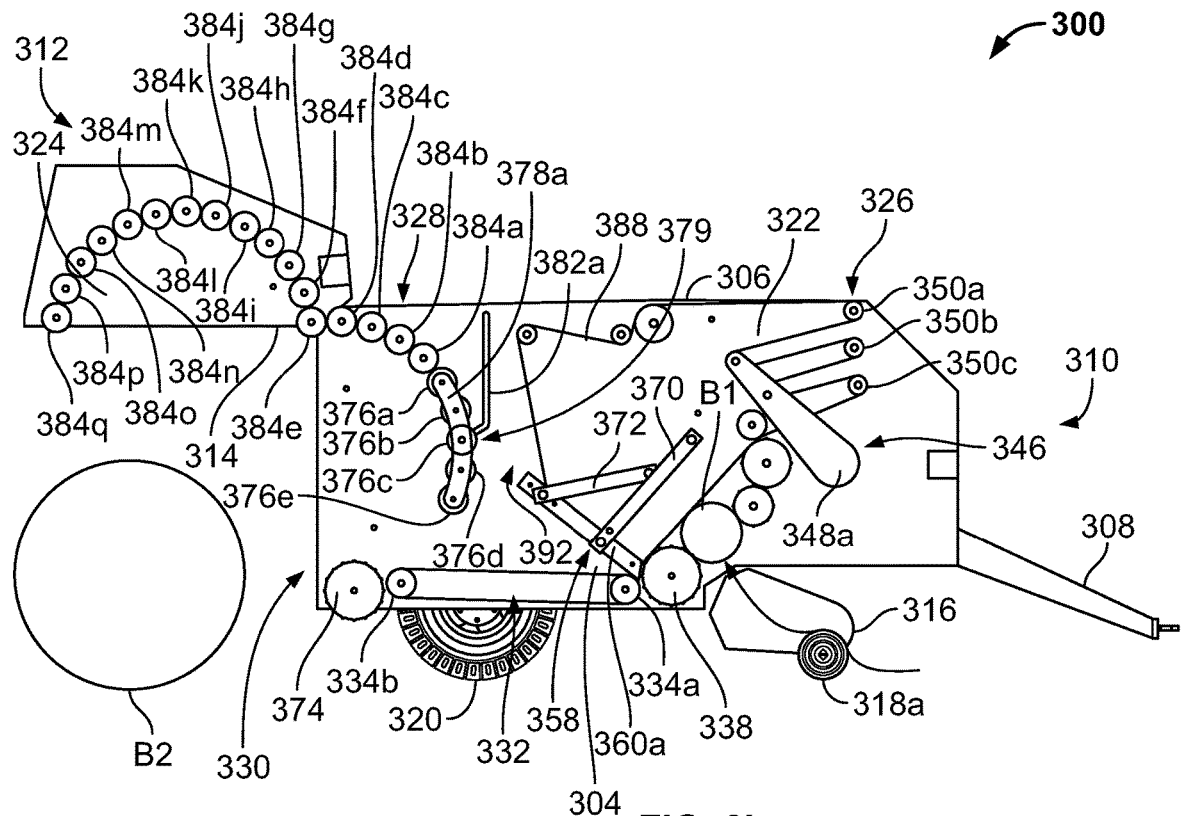
Figure 6J:
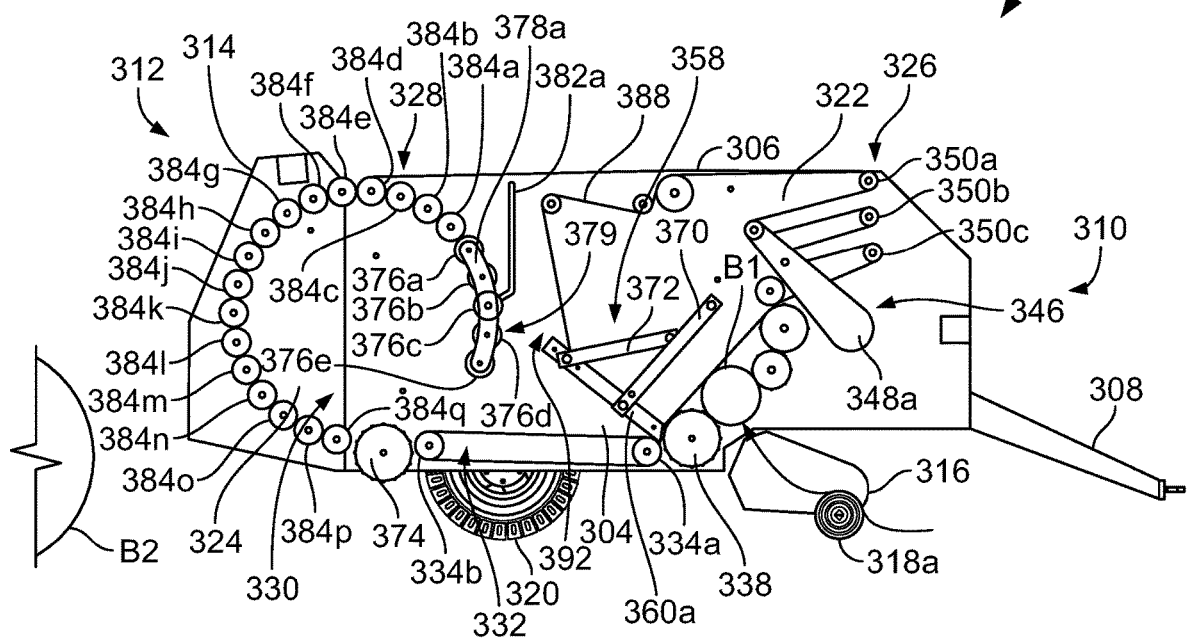
Figure 9A:
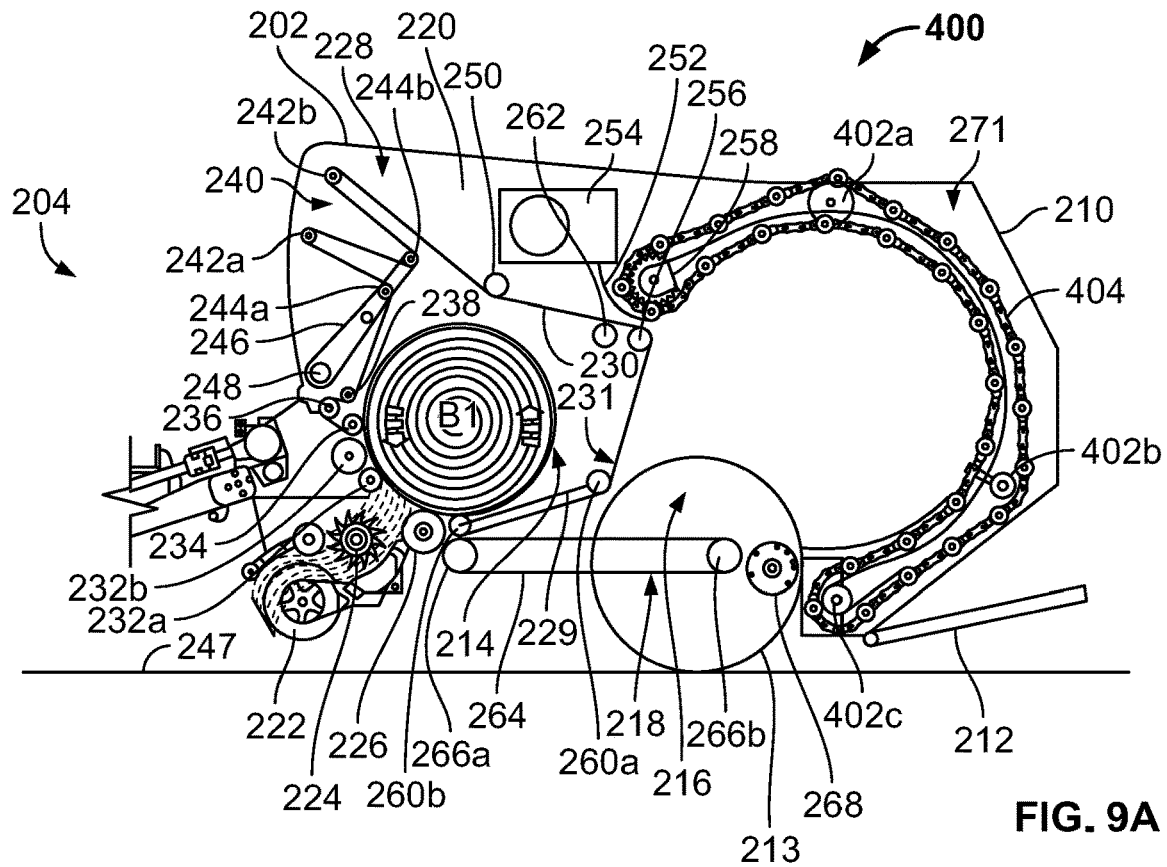
FIGS. 9A-F are cross-sectional side views of an exemplary continuous round baler of FIG. 8 during steps of the baling process.
Figure 9B:
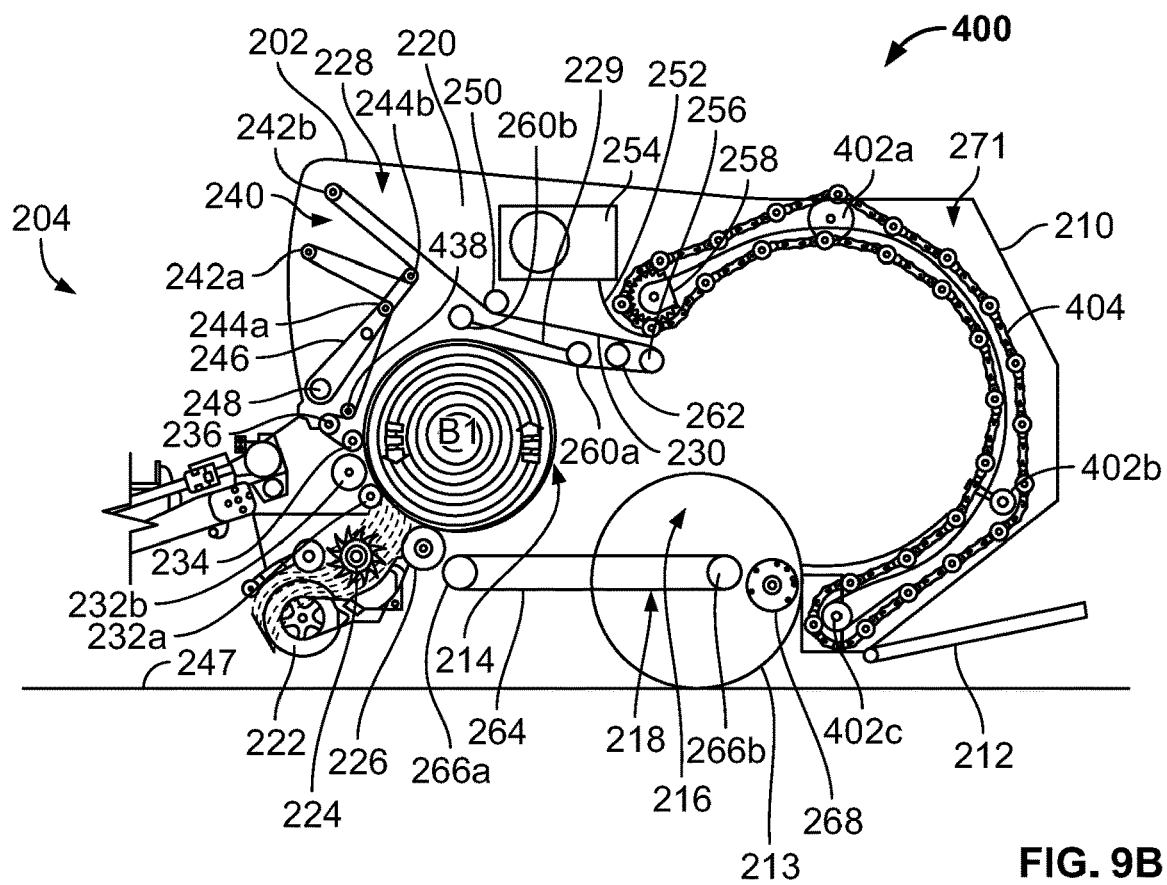
Figure 9C:
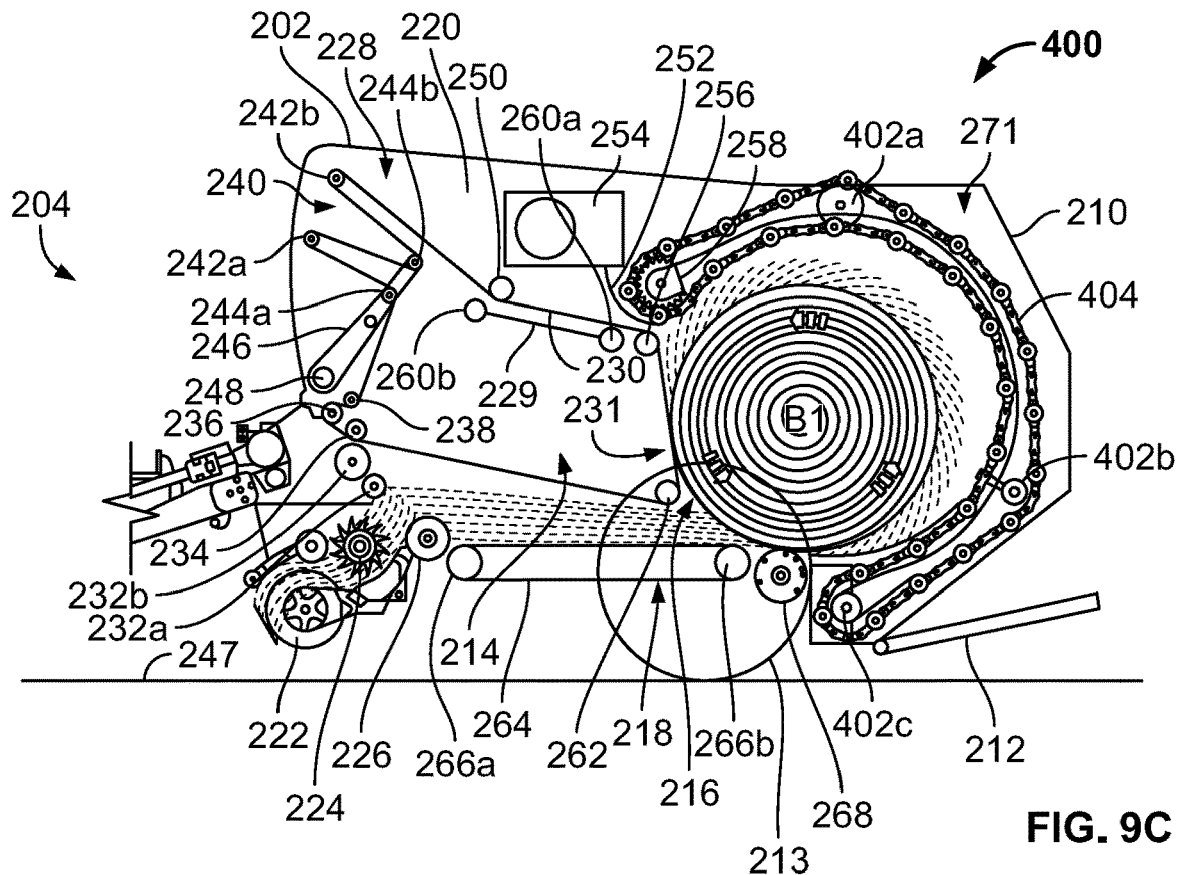
Figure 9D:
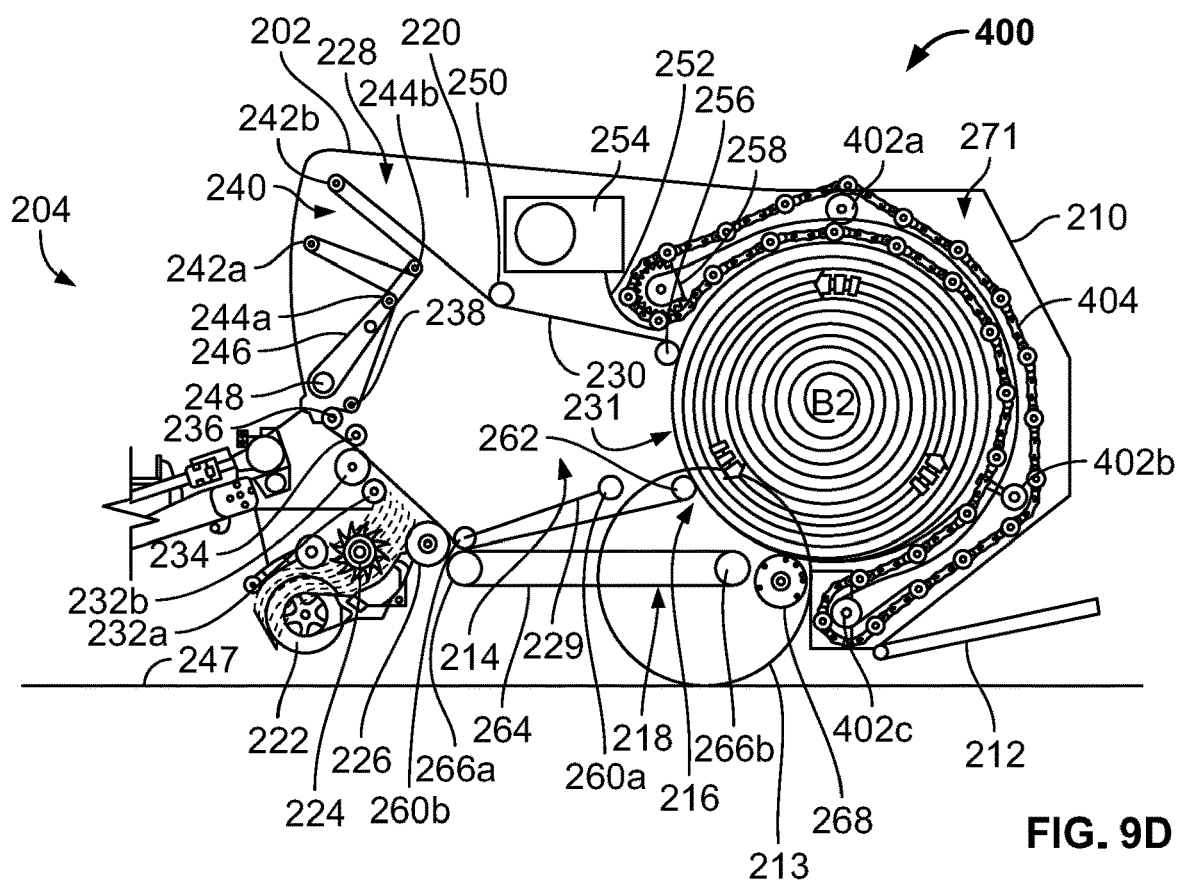
Figure 9E:
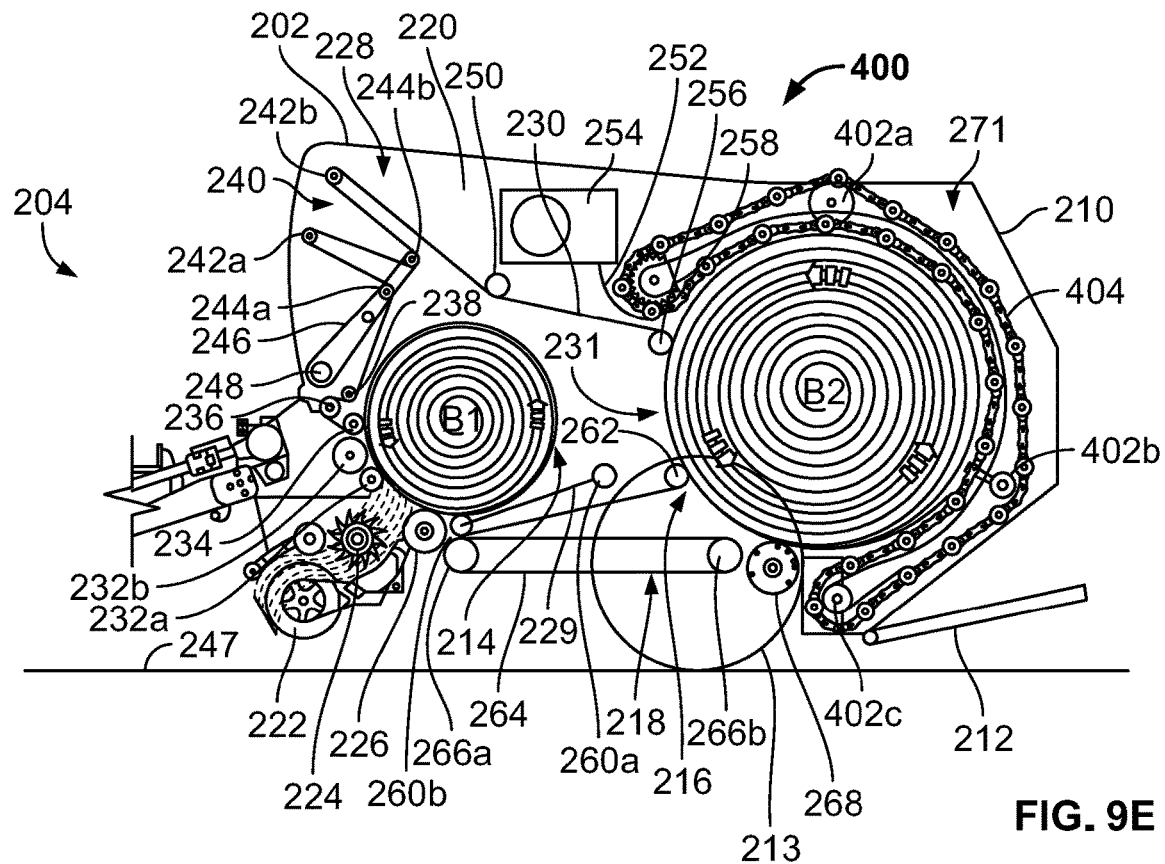
Figure 9F:
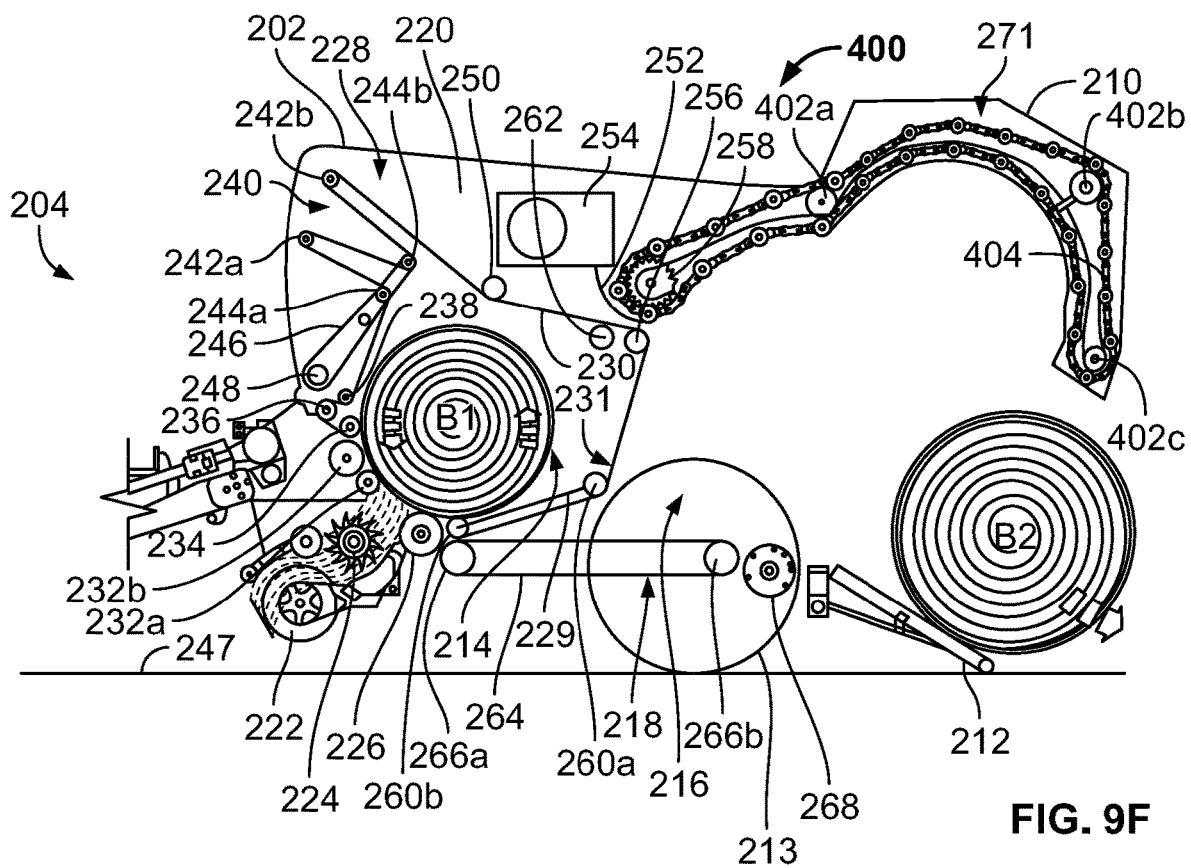

As shown in FIG. 6I, continued rotation of the rollers of the second bale chamber 324 and motion of the baler 300 forward urges the bale B2 out of the outlet 330 (see, e.g., description of FIG. 9F). In FIG. 6J, the tailgate 314 is pivoted counterclockwise to close the outlet 330 of the second bale chamber 324. In some embodiments, after the outlet 330 has been closed, the bale B1 in the first bale chamber 322 can be transferred to the second bale chamber 324 for further formation.

Figure 7A:
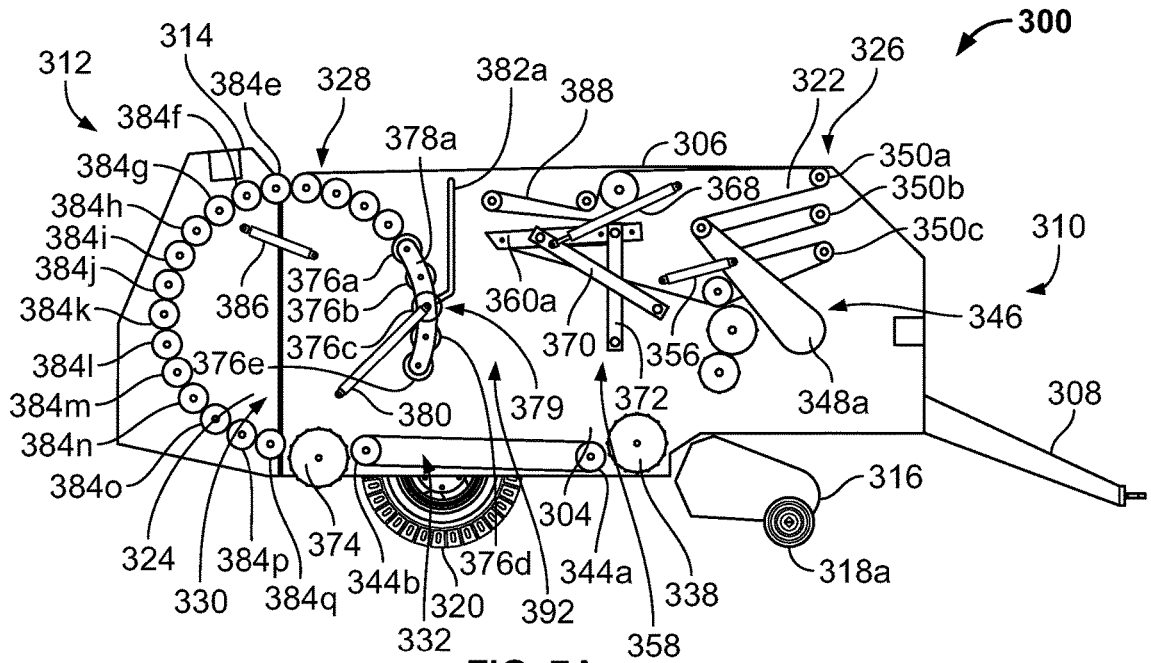
FIGS. 7A-C are cross-sectional side views of an exemplary continuous round baler of FIG. 3 during steps of the baling process including positioning of hydraulic actuators.
Figure 7B:
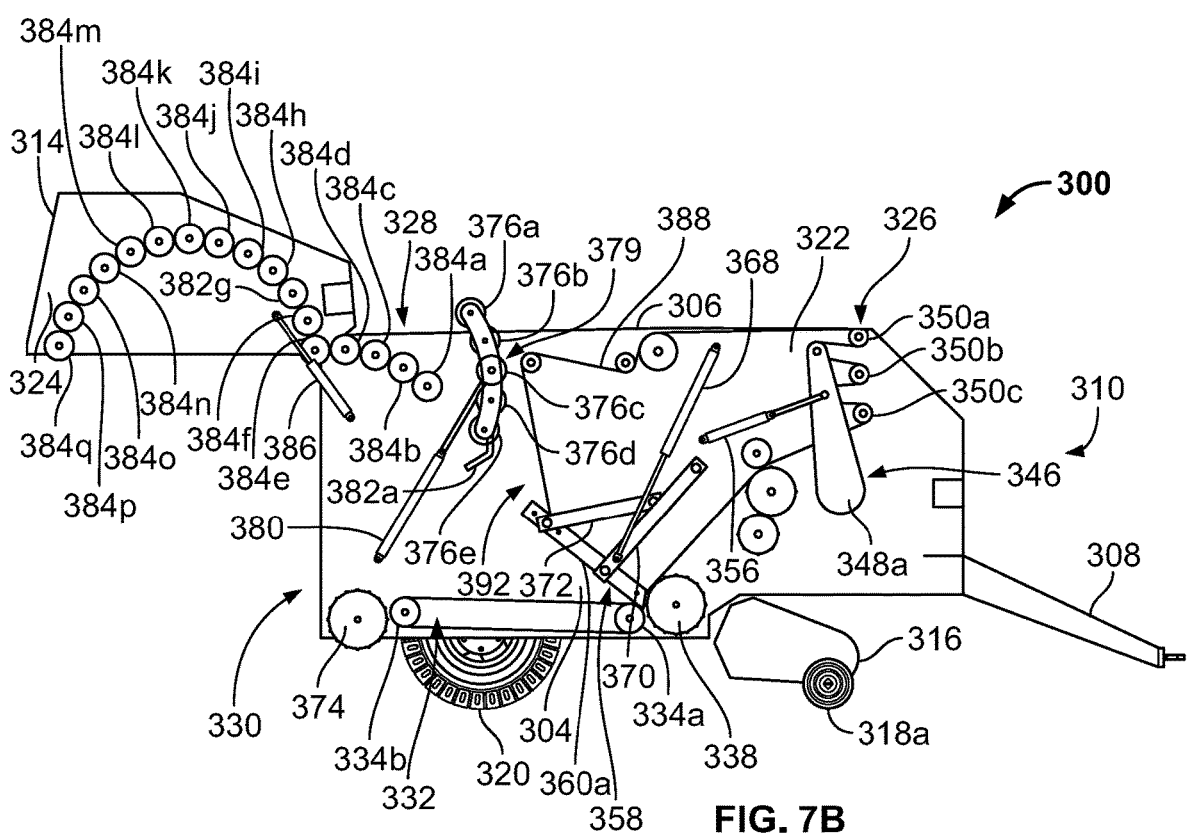
Figure 7C:
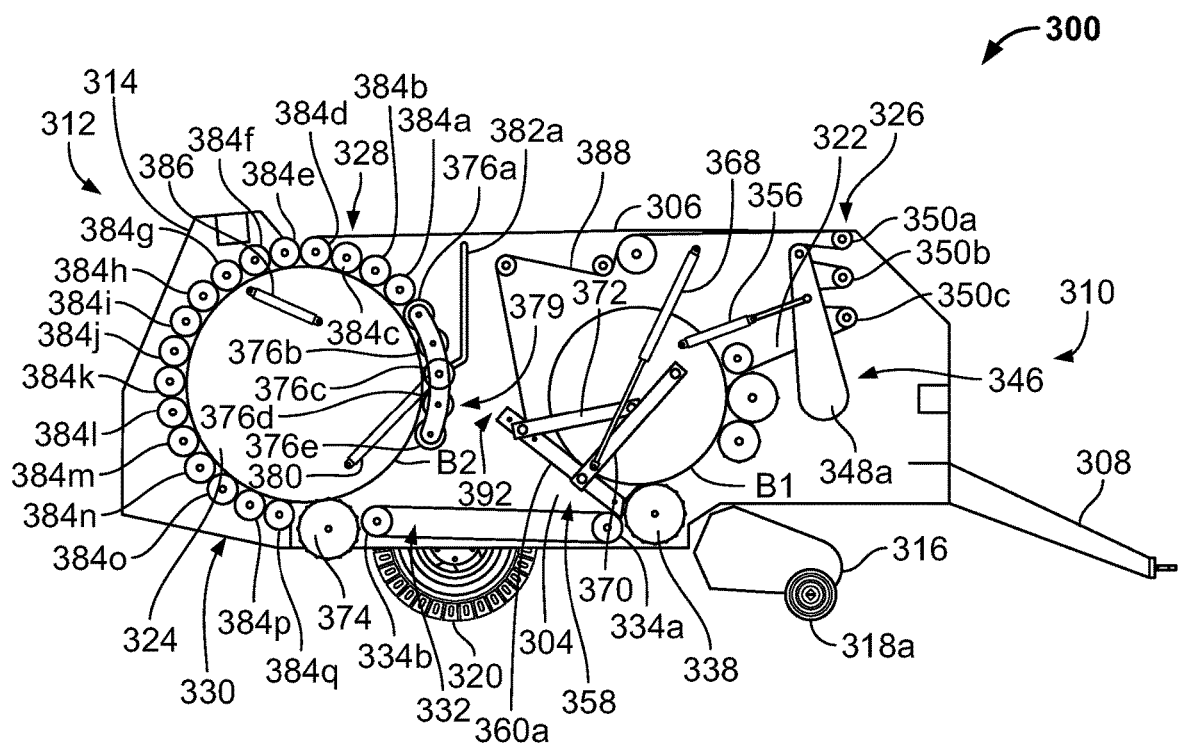

FIGS. 7A-C are cross-sectional side views of the baler 300 during steps of the baling process, with specific positioning of the hydraulic actuators. In FIG. 7A, the hydraulic actuator 356 can be retracted to rotate the take-up assembly 346 counterclockwise, providing tension in the belt 388. The hydraulic actuator 368 can be retracted to move the bale carrier 358 to the upwardmost position. The hydraulic actuator 380 is retracted to maintain the movable portion 379 in the lowermost position. The hydraulic actuator 386 is retracted to maintain the tailgate 314 in the closed position.

In FIG. 7B, the hydraulic actuator 356 is expanded or extended to rotate the take-up assembly 346 clockwise, increasing the length in the belt 388 while maintaining a substantially constant tension. The hydraulic actuator 368 is expanded or extended to move the bale carrier 358 to the downwardmost position, blocking the outlet of the first bale chamber 322. The hydraulic actuator 380 is expanded or extended to move the movable portion 379 to the upwardmost position, exposing the inlet to the second bale chamber 324. The hydraulic actuator 386 is expanded or extended to open the tailgate 314, allowing the bale to be ejected from the second bale chamber 324. Although shown in the expanded or extended positions, it should be understood that actuation of the hydraulic cylinders into the retracted or extended positions can be performed independently of each other, in a coordinated manner, simultaneously, combinations thereof, or the like.

In FIG. 7C, continuous baling is depicted in the baler 300, with a first bale B1 being formed in the first bale chamber 322 simultaneous to formation of a second bale B2 in the second bale chamber 324. Upon completion and ejection of the second bale B2 from the second bale chamber 324, the first bale B1 can be transferred to the second bale chamber 324 for completion and another bale B1 formation can be initiated in the first bale chamber 322. Two bales can therefore be formed substantially simultaneously, resulting in an efficient baling process.

Figure 8:
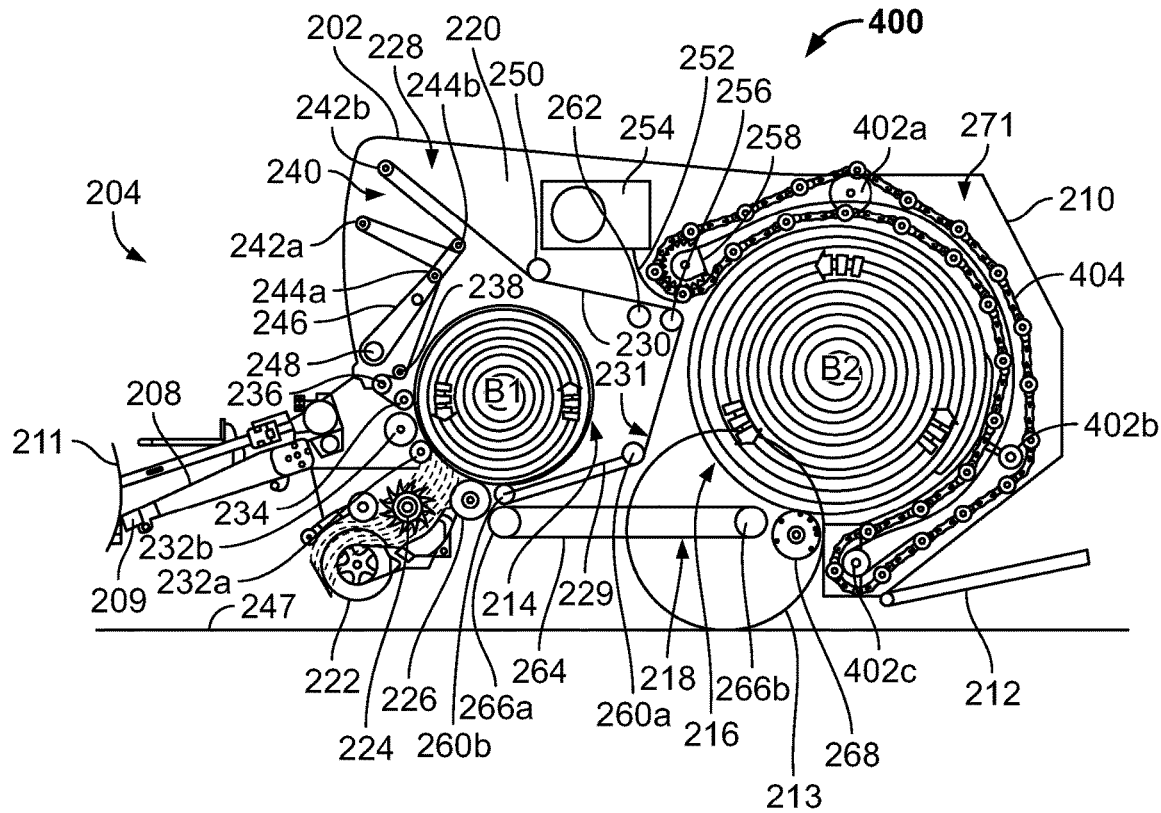
FIG. 8 is a cross-sectional side view of an exemplary continuous round baler of the present disclosure.

FIG. 8 is a cross-sectional side view of an exemplary continuous round baler 400 of the present disclosure. The baler 400 can be substantially similar in structure and function to the baler 200, except for the distinctions noted herein. Therefore, like reference numbers refer to like structures. Rather than a continuous, semi-circular shape of fixed rollers 270, the baler 400 includes three fixed rollers 402a-c that, in combination with the fixed roller 258, provide the structure surrounding the bale B2 forming in the second bale chamber 216.

The fixed roller 258 can transversely extend near the upper, front section of the second bale chamber 216, the fixed roller 402a can transversely extend near the top, central section of the second bale chamber 216, the fixed roller 402b can transversely extend near the rear of the second bale chamber 216, and the fixed roller 402c can transversely extend near the bottom, central section of the second bale chamber 216. A substantially continuous chain 404 (e.g., slats and chains) can be looped around and extended between the fixed rollers 258, 402c such that the chain 404 surrounds and is positioned against the top, rear and partially bottom of the bale B2. Although illustrating as having a chain 404, it should be understood that in some embodiments, an endless belt could be used. The roller 402b can provide tension to the chain 404, and the tailgate 210 and chain 404 can pivot about roller 402a. For example, prior to bale formation within the bale chamber 216 (e.g., an empty chamber 216), one section of the chain 404 can form the semicircular configuration shown in FIG. 8, while the opposing section of the chain 404 can extend between the rollers 258, 402c. The chain 404 and associated slats can follow a groove formed along the circumference of the bale chamber 216, thereby defining a fixed configuration. The baler 400 can include a support platform 212 extending from the bottom edge of the tailgate 210 to support the bale B2 during ejection from the baler 400.

FIGS. 9A-F are cross-sectional side views of the baler 400 during steps of the baling process. FIG. 9A shows the step of formation of the bale B1 (e.g., the bale core) in the first bale chamber 214. The bale ejector 229 (e.g., bale carrier) is in the lowermost position to prevent the bale B1 from being transferred by the conveyor system 218 until the bale B1 reaches a predetermined diameter or density.

In FIG. 9B, the bale ejector 229 is actuated into the upwardmost position to expose the outlet 231 of the first bale chamber 214. Continued rolling of the floor roller 226 urges the bale B1 onto the conveyor system 218. The conveyor system 218 rotates the conveyor belt 264 clockwise to transfer the bale B1 into the second bale chamber 216. While the bale B1 is on the conveyor belt 264, the belt 230 can be positioned over the top of the bale B1 to ensure even traction is maintained on the bale B1 by the conveyor belt 264.

In FIG. 9C, after the bale B1 has been transferred to the second bale chamber 216, the movable roller 262 is moved to a downwardmost position, and belt 230 is used to secure the bale B2 in the second bale chamber 216. The belt 230 blocks the outlet 231 of the first bale chamber 214 and simultaneously applies pressure on the bale B2 within the second bale chamber 216. Crop continues to be fed through the intake assembly, onto the conveyor system 218, and into the second bale chamber 216 to increase the size of the bale B2. In some embodiments, a portion of the gathered crop can continue to be fed into the first bale chamber 214 to simultaneously initiate formation of another bale B1.

In FIG. 9D, the bale ejector 229 is actuated into the lowermost position to place the belt 230 adjacent to the roller 266a of the conveyor system 218. Such positioning blocks the path for crop into the second bale chamber 216, and instead guides the collected crop into the first bale chamber 214 to initiate formation of another core bale B1. The net wrapping process of bale B2 can be initiated after the bale ejector 229 has been actuated into the lowermost position.

In FIG. 9E, when the bale B2 reaches a predetermine size or diameter, the net wrapping assembly 254 is activated to initiate wrapping of the bale B2 with netting 252 introduced into the second bale chamber 214 between rollers 256, 258. In some embodiments, activating of the net wrapping assembly 254 can occur based on timing relative to operation of the bale ejector 229. For example, the net wrapping assembly 254 can initiate wrapping of the bale B2 approximately two seconds after the bale ejector 229 is positioned in the lowermost position, ensuring that any crop remaining on the conveyor belt 264 has been transferred to the second bale chamber 216 and added to the bale B2. Such timed operation can reduce or avoid contamination after the bale B2 has been wrapped. During the net wrapping process, the bale B1 continues to be formed in the first bale chamber 214.

In FIG. 9F, after the net wrapping of the bale B2 has been completed, the tailgate 210 can be actuated to pivot into the open position. Continued rotation of the floor roller 268, the weight of the bale B2, and movement of the baler 400 can urge the bale B2 to be ejected out of the outlet formed by the open tailgate 210. After the bale B2 has been ejected and the tailgate 210 is actuated into the closed position, the bale B1 can be transferred to the second bale chamber 214 and the process can be repeated to continuously form bales in both bale chambers 214, 216.

Figure 10:
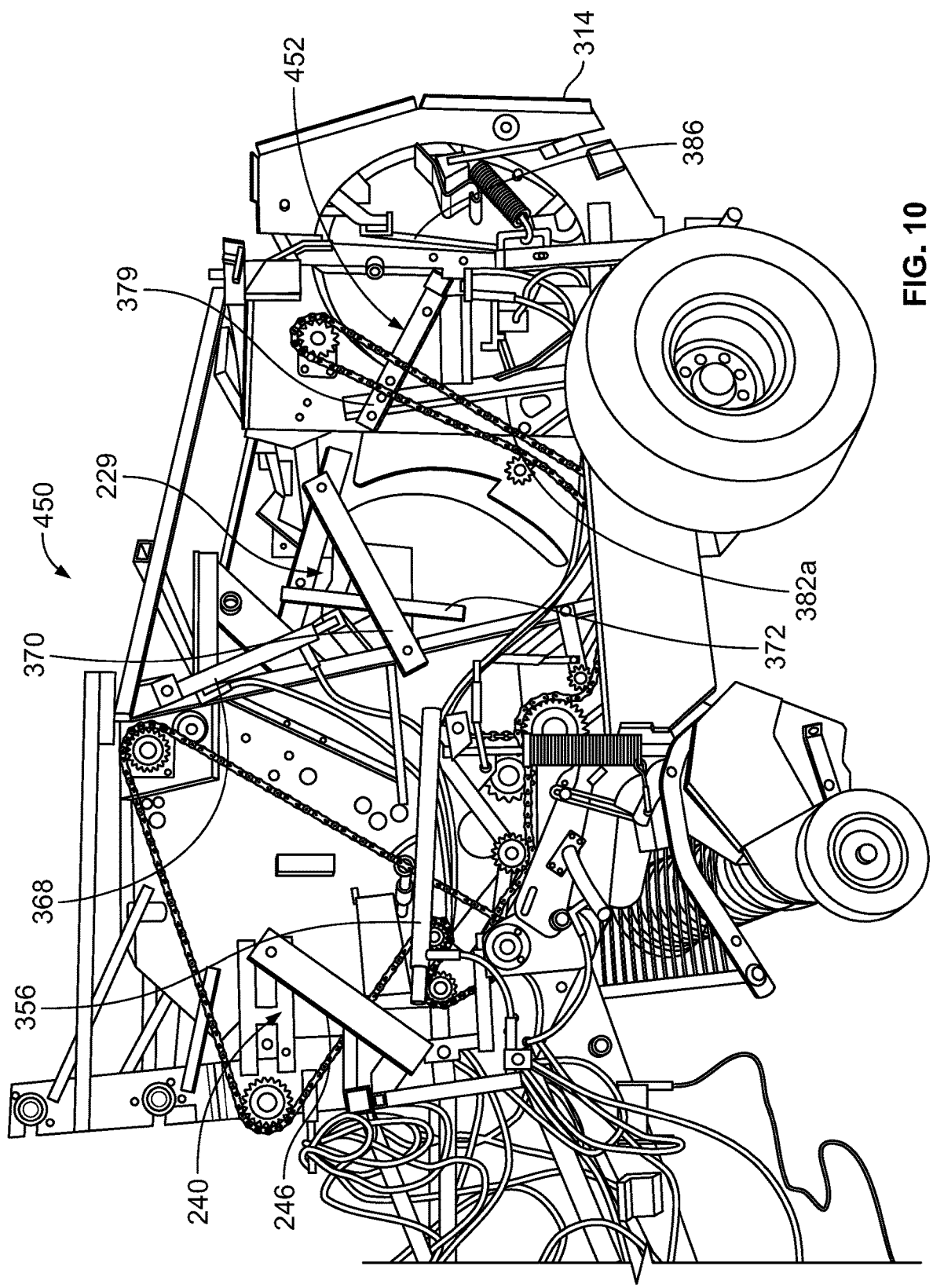
FIG. 10 is a side view of an exemplary continuous round baler of the present disclosure.

FIG. 10 is a side view of an exemplary continuous round baler 450 of the present disclosure. The baler 450 can be substantially similar in structure and function to the baler 300. Therefore, like reference numbers refer to like structures. FIG. 10 shows the actuation components disposed on the outside of the baler 450 for adjusting and controlling the position of the movable internal components of the baler 450. The arm 246 can be disposed on the outside of the baler 450, with the hydraulic actuator 356 regulating the position of the arm 246 and the take-up assembly 240. The bale ejector 229 position can be regulated by the hydraulic actuator 368 and linkages 370, 372. The movable portion 379 position can be regulated by a linkage assembly 452 and a hydraulic actuator 380 (not visible in FIG. 10). The position of the tailgate 314 can be regulated by the hydraulic actuator 386.

FIGS. 11A-H are cross-sectional, diagrammatic side views of an exemplary continuous round baler 500 of the present disclosure including a split configuration of a second bale chamber. The baler 500 can be substantially similar in structure and function to the baler 200, except for the distinctions noted here. Therefore, like reference numbers refer to like structures.

The baler 500 includes a first serpentine system 502 associated with the first bale chamber 214 defining a variable shape, and a second serpentine system 504 associated with the second bale chamber 216 defining a fixed shape. Rather than having each of the rollers 270 pivot with the tailgate 210 to eject the bale B2 from the baler 200, the baler 500 includes a split configuration of the rollers (e.g., a split second bale chamber 216). Such split configuration provides for a faster opening and closing of the tailgate due to a lighter mass, and the bottom section of the second bale chamber 216 can be used to deliver the bale B2 directly to a plastic wrapper (if present).

The first bale chamber 214 includes a stationary or fixed floor roller 226 on one side of the rotocutter 224, and fixed rollers 506a-c on the opposing, front side of the baler 500. The baler 500 includes a take-up assembly 508 disposed at the upper, front corner of the baler 500. The take-up assembly 508 includes stationary rollers 510a-d and mobile or movable rollers 512a-b through which the belt 230 passes.

The belt 230 zigzags between the rollers 510a-d, 512a-b in a direction substantially perpendicular to horizontal. The first bale chamber 214 includes two fixed rollers 514a-b disposed at the upper, central section of the first bale chamber 214, with the belt 230 passing between the rollers 514a-b. The first bale chamber 214 includes a bale carrier 516 movably disposed and capable of being actuated between a lowermost position (e.g., FIG. 11A) and an uppermost position (e.g., FIG. 11E) by a hydraulic actuator. The bale carrier 516 includes two movable rollers 518a-b, a linkage 520 connecting the rollers 518a-b, and linkages 522, 524 pivotably coupling the rollers 518a-b to the hydraulic actuator (not shown).

The second bale chamber 216 includes a fixed roller 526 at the upper, front section, and a movable roller 528 coupled to a pivotable linkage 530. The roller 528 can be moved between a lowermost position (e.g., FIG. 11A) and an uppermost position (e.g., FIG. 11C) to close or open the inlet to the second bale chamber 216. The second bale chamber 216 includes a first group of fixed rollers 532a-h that define a semi-circular shape of the upper and rear sections of the second bale chamber 216. The second bale chamber 216 includes a second group of fixed rollers 534a-c that define a curved shape of the bottom section of the second bale chamber 216. The first group of fixed rollers 532a-h is capable of being pivoted upward with the tailgate to eject the bale B2 from the baler 500, while the bottom group of fixed rollers 534a-c remains in the same position and acts as a guide for the bale B2 to exit the baler 500.

Figure 11A:
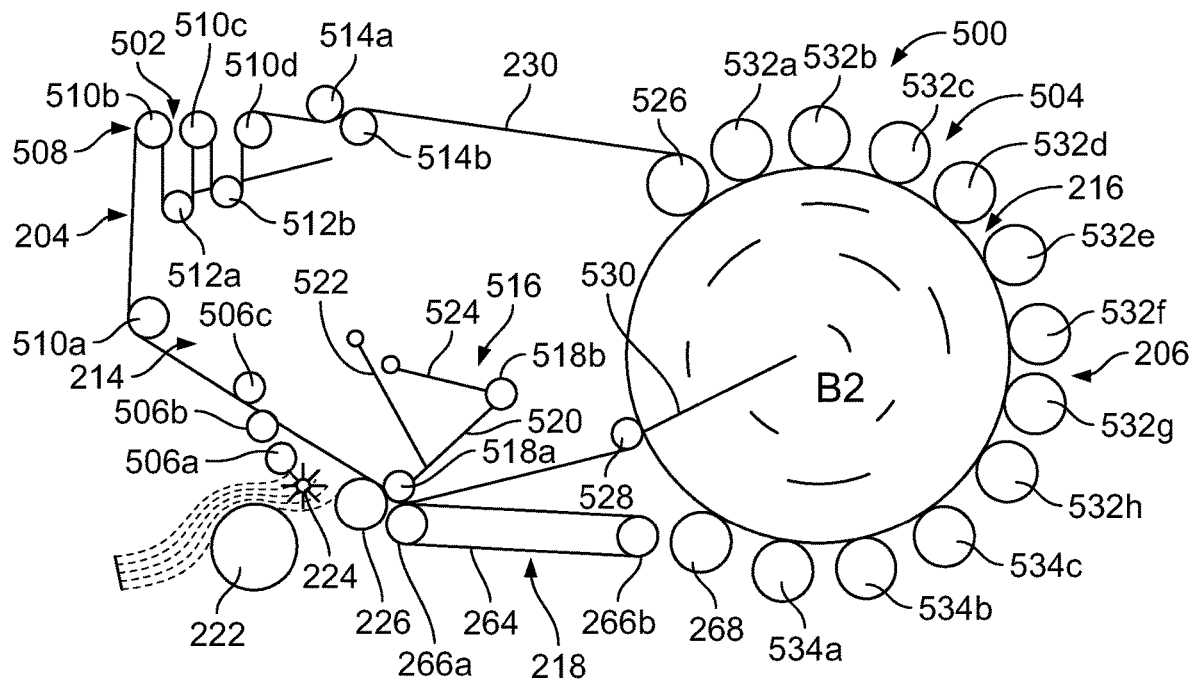
Figure 11B:
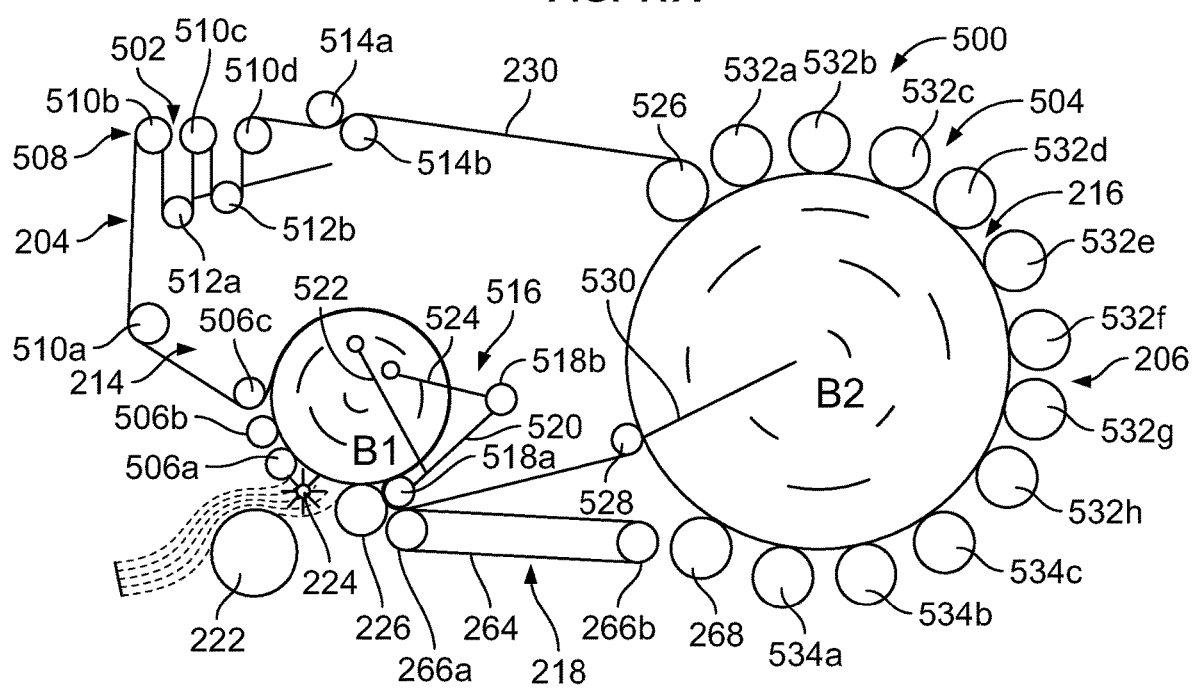
Figure 11C:
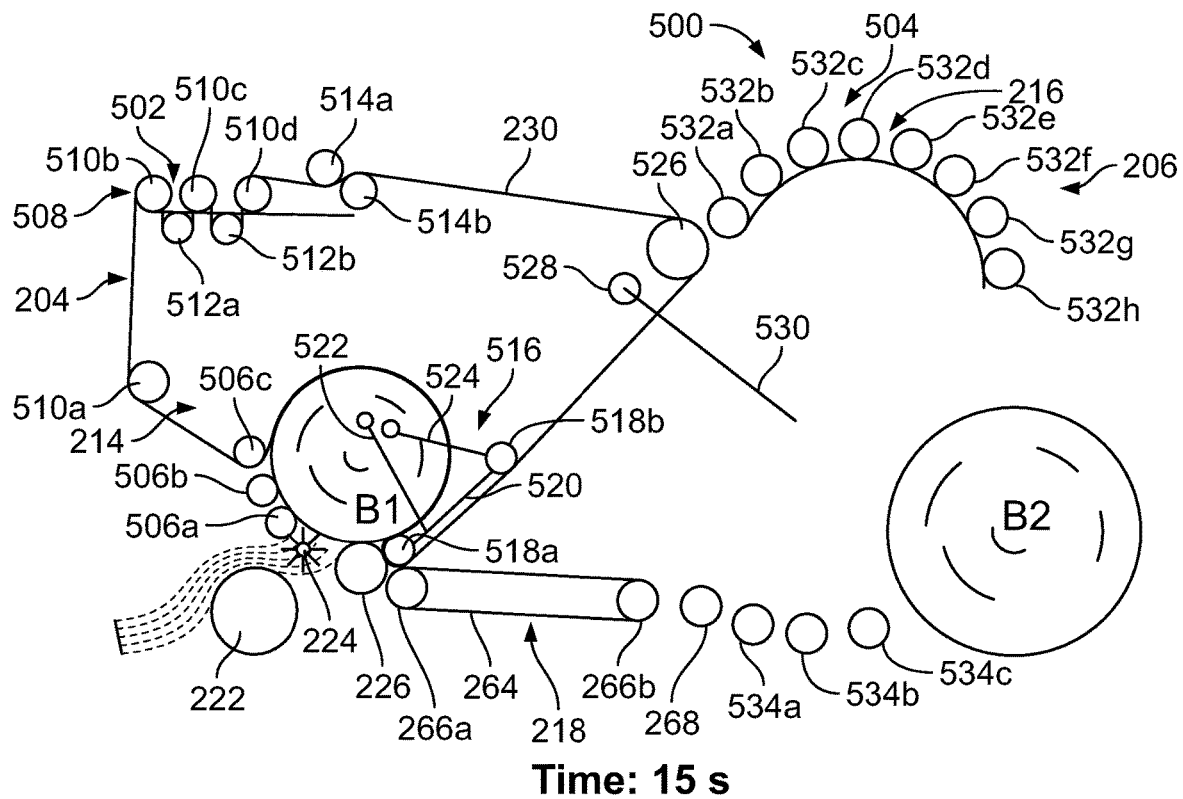

For example, FIG. 11A shows the bale B2 formed in the second bale chamber 216, and FIG. 11B shows the bale B2 formed in the first bale chamber 214 simultaneously to formation of the bale B2 in the second bale chamber 216. After the bale B2 has reached a predetermined size, the movable roller 528 can be actuated to the uppermost position to reduce the pressure from the belt 230 on the bale B2. The first group of fixed rollers 532a-h can be pivoted upward with the tailgate to expose the outlet of the baler 500, allowing for ejection of the bale B2 based on motion of the baler 500 and continued rotation of the fixed roller 268.

Figure 11D:
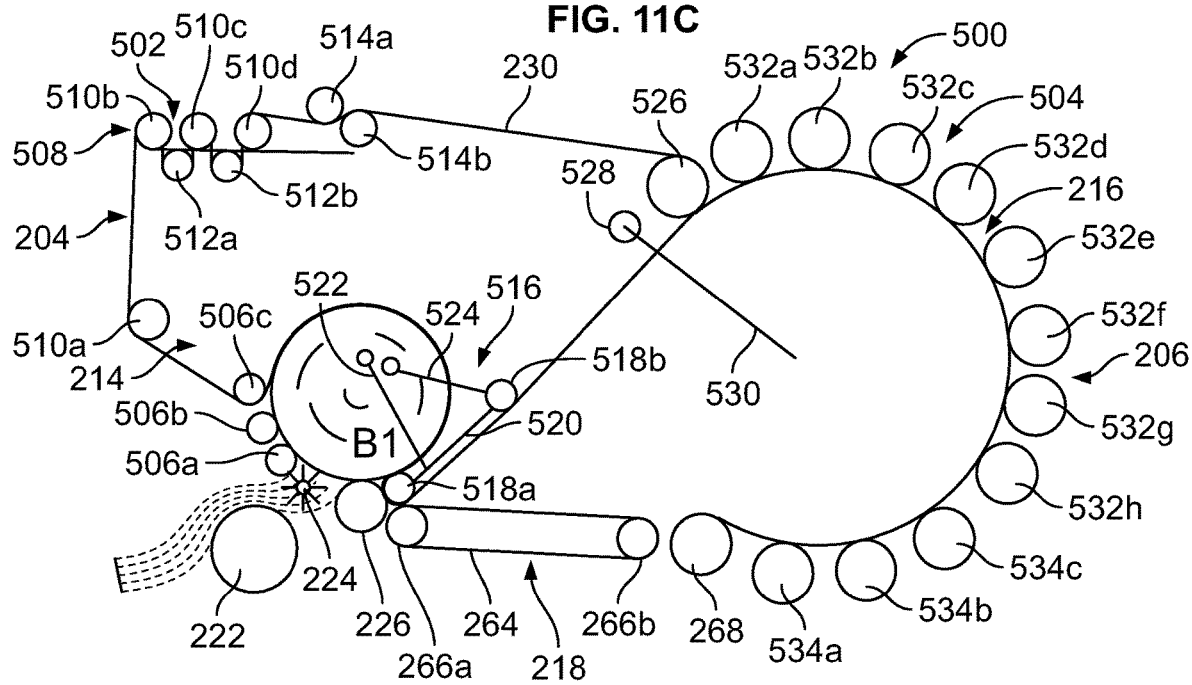
Figure 11E:
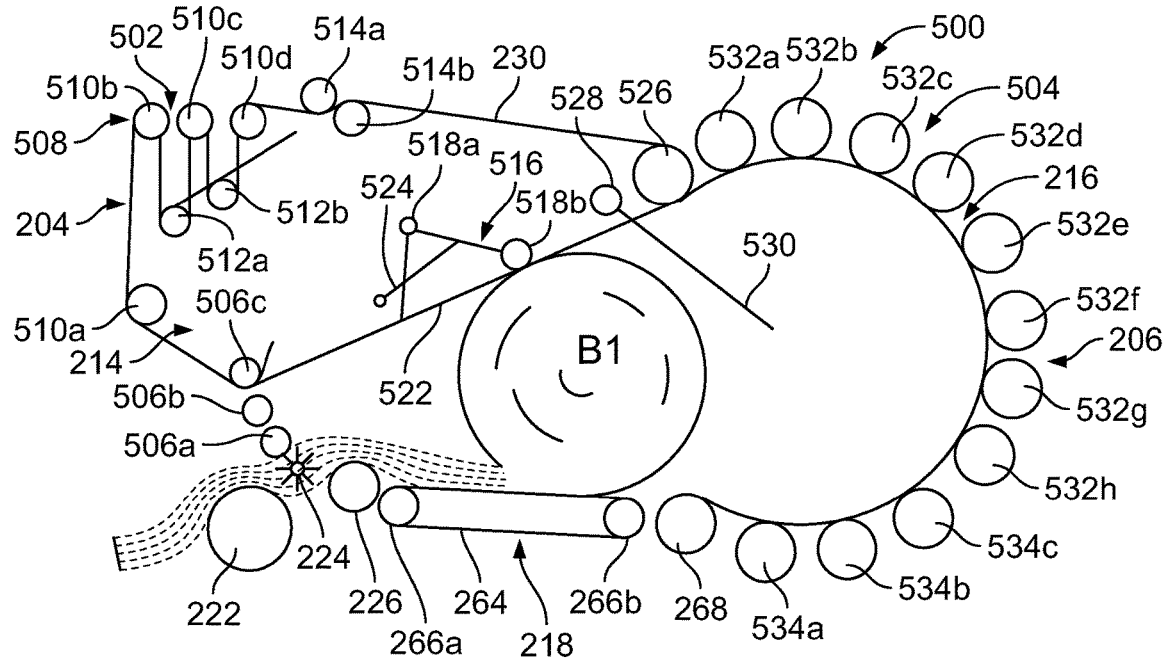
Figure 11F:
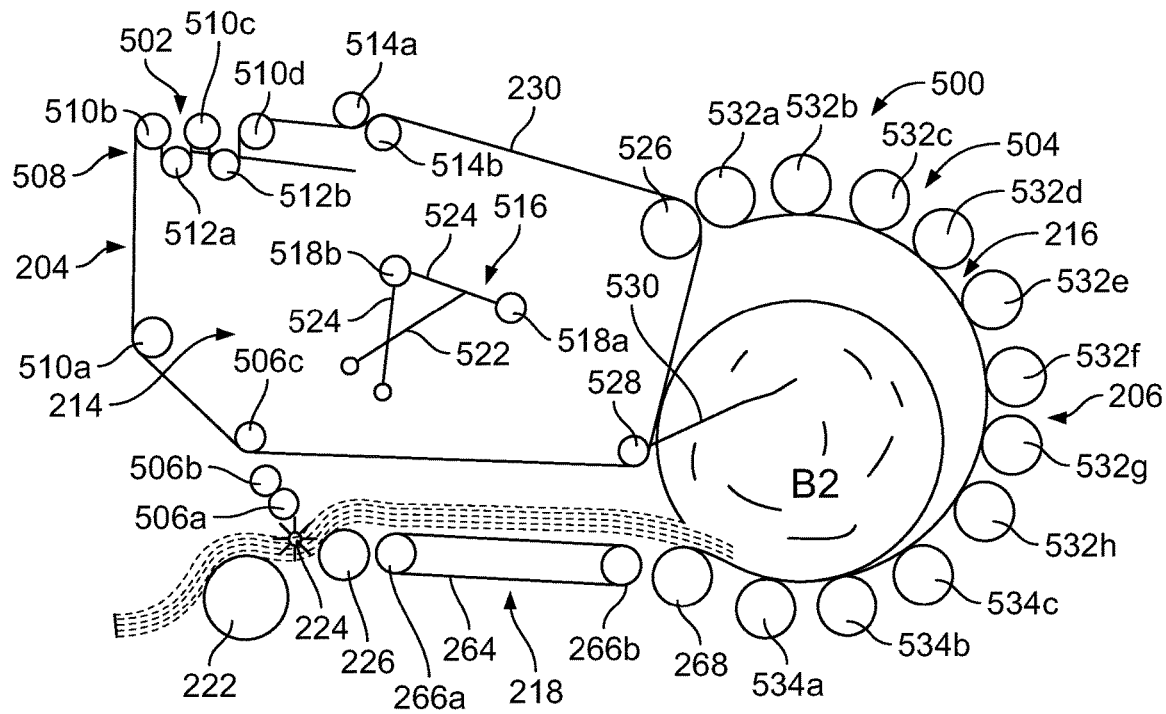

In FIGS. 11D-F, the tailgate can be closed and the bale carrier 516 can be actuated into the uppermost position to expose the outlet of the first bale chamber 214. Actuation of the bale carrier 516 into the uppermost position allows the bale B1 to be transferred by the conveyor system 218 into the second bale chamber 216. After the bale B1 has been transferred to the second bale chamber 216, the movable roller 528 can be actuated into the lowermost position to position the belt 230 around the front surface of the bale B2. Crop is introduced into the second bale chamber 216 via the conveyor system 218 to continue growing of the bale B2.

In FIGS. 11G-H, after sufficient crop has been introduced into the second bale chamber 216, the bale carrier 516 can be actuated into the lowermost position to prevent crop from entering the conveyor system 518, and instead directs crop into the first bale chamber 214 to initiate formation of the bale B1. Continuous bale formation in both first and second bale chambers 214, 216 can thereby be performed, with the split second bale chamber 214 providing for faster and more efficient opening and closing of the tailgate.

Figure 12:
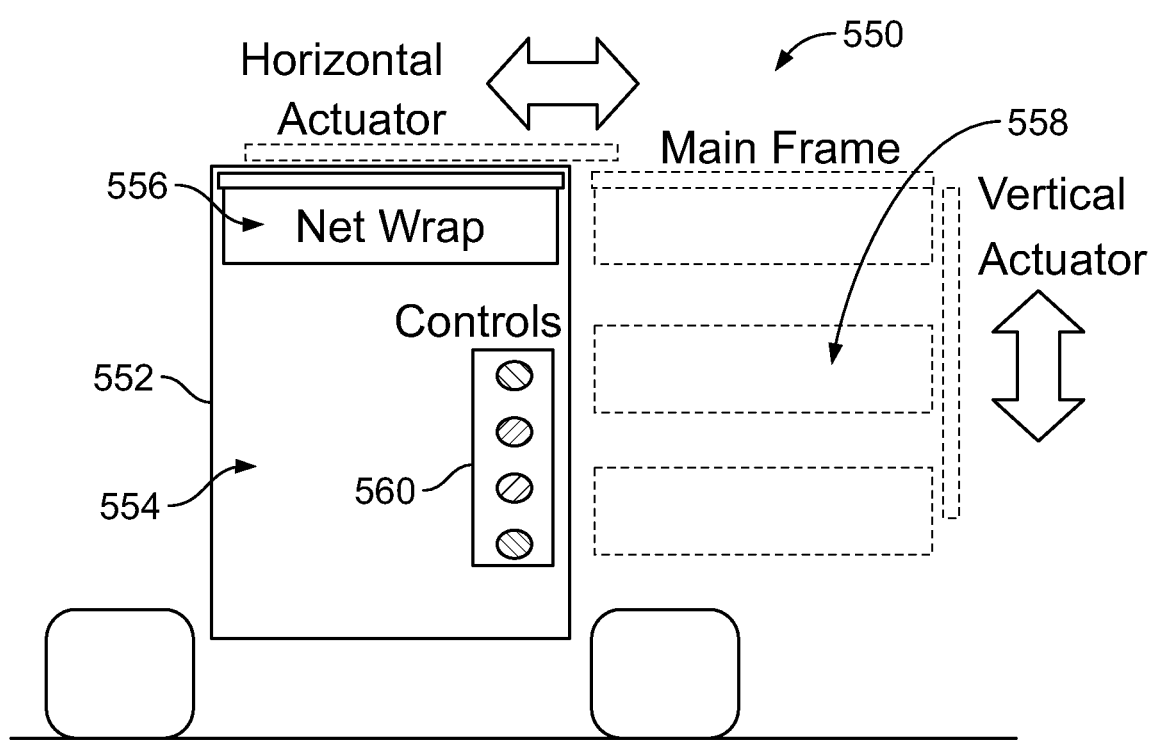
FIG. 12 is a diagrammatic representation of a baler of the present disclosure including a net wrapping system.

FIG. 12 is a diagrammatic representation of a baler 550 of the present disclosure including a net wrapping system. It should be understood that any type of net wrapping system can be incorporated into the balers discussed herein, such as the net wrapping system disclosed in U.S. Ser. No. 14/316,121, which is incorporated herein by reference in its entirety. The baler includes a movable compartment 556, a frame 552, and the second bale chamber 554. The moveable compartment 556 has at least a first operable position in the interior of the baler 550 and a plurality of operable positions 558 on the exterior of the baler 550. A controller 560 is operably connected the baler 550 and the moveable compartment 556. In some embodiments, the controller 560 is able to control the position of the compartment 556 in at least a first operable position in the interior of the baler 550 and in a plurality of operable positions on the exterior of the baler 550. In some embodiments, the controller 560 provides feedback as to the position of the compartment 556. In some embodiments, the controller 560 provides feedback as to the amount of wrapping material remaining in the compartment 556. In some embodiments, the controller 560 is located on the frame 552. In some embodiments, the controller 560 is located on the side of the baler 550. In some embodiments, the controller 560 can be manually activated. In some embodiments, the controller 560 can be operated from the cab or operational center of the baler 550 (or tractor associated with the baler 550). In some embodiments, the controller 560 is operably connected to a sensor that prevents the movement of the net wrapping mechanism while the baler 550 is actively operating. In some embodiments, the controller 560 can be communicatively connected to one or a plurality of sensors disposed within the bale chambers, the sensors indicating the size, density, and/or diameter of the respective bales, and/or the conditions within the bale chambers.

FIGS. 13A-L are cross-sectional side views of a baler 600 during steps of the baling process. The baler 600 can be substantially similar in structure and function to the baler 300, except for the distinctions noted herein. Like reference numbers are used to refer to like structures.

Figure 13A:
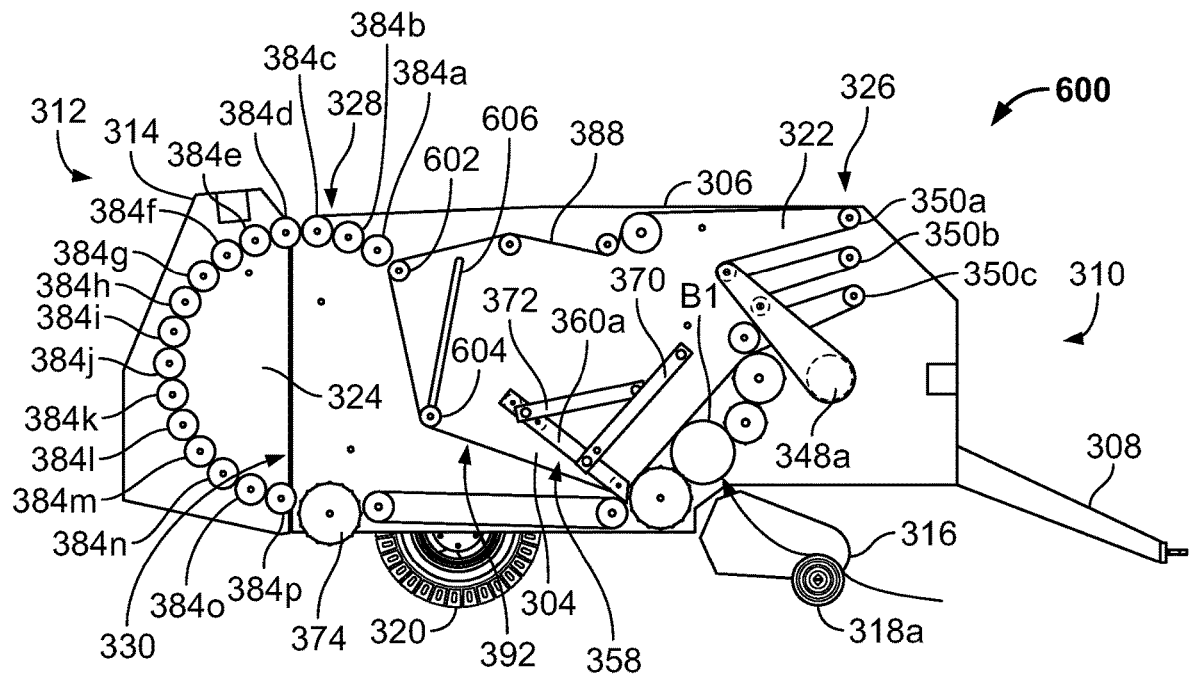
FIGS. 13A-L are cross-sectional side views of an exemplary continuous round baler of the present disclosure during steps of the baling process.
Figure 13B:
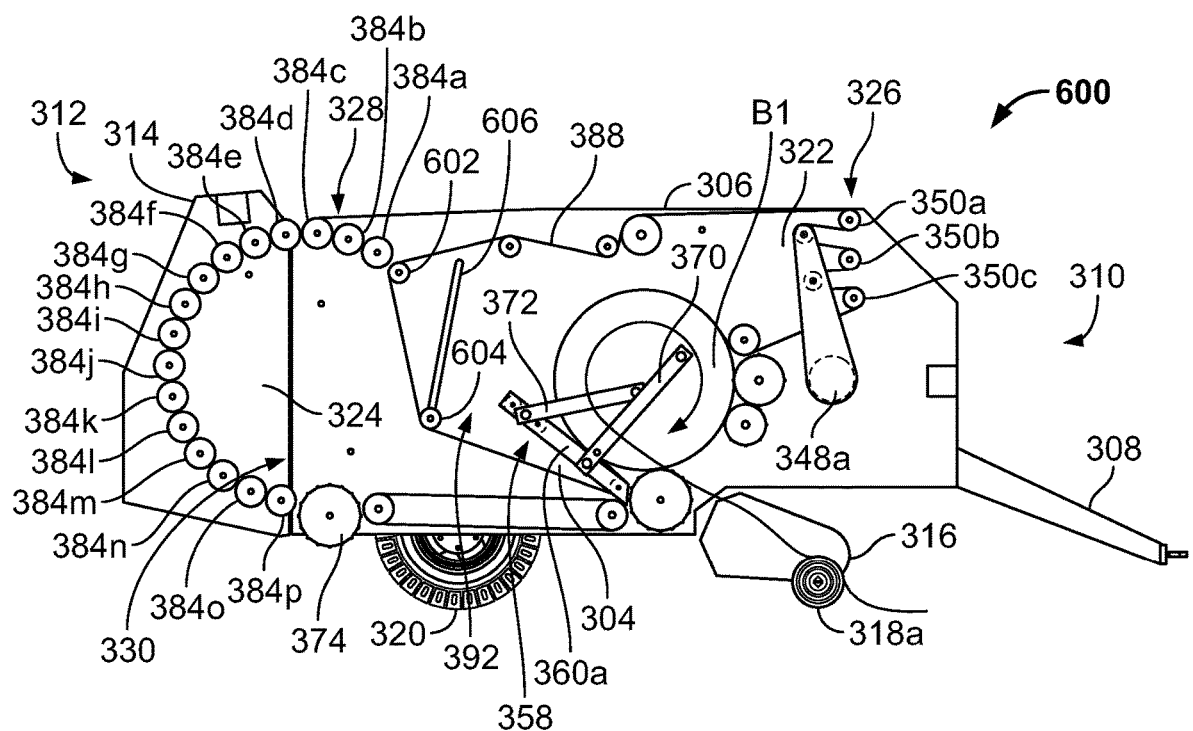
Figure 13C:
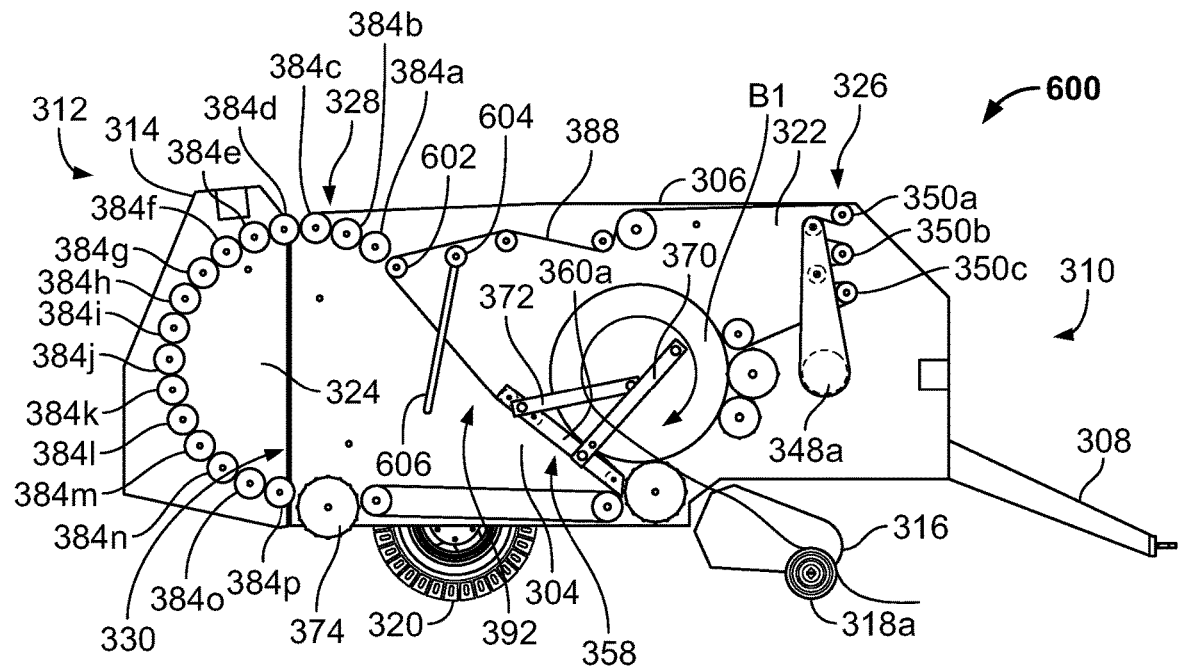

Rather than including a group of rollers 376a-e as part of a movable component 379 and forming the frontmost section of the second bale chamber 324, the baler 600 includes a fixed roller 602 at the upper, front section of the second bale chamber 324 and a movable roller 604 positionable between a lowermost position (e.g., FIG. 13A) and an uppermost position (e.g., FIG. 13C). The roller 604 can be actuated to slide along a cutout or track 606. In some embodiments, a hydraulic cylinder disposed on the outside of the baler 600 can be used to slide the roller 604 along the track 606. In the lowermost position, the roller 604 maintains tension in the belt 388 to close the inlet to the second bale chamber 324. In the uppermost position, the roller 604 releases tension in the belt 388, thereby opening the inlet to the second bale chamber 324 and allowing the bale B1 to be transferred to the second bale chamber 324 via the conveyor system 332. In operation, rather than implementing the movable portion 379 of the baler 200, the tensioning and loosening of the belt 388 with the movable roller 604 opens and closes the inlet to the second bale chamber 324.

In FIG. 13A, crop is gathered into the baler 600 via the intake assembly 316. The bale carrier 358 is in the first or downwardmost position, and the movable roller 604 in the downwardmost position, positioning the belt 388 of the first bale chamber 322 in an orientation blocking the outlet from the first bale chamber 322 (and blocking the inlet to the second bale chamber 324). The take-up assembly 346 can be pivoted counterclockwise to allow the belt 388 to extend linearly through the first bale chamber 322 in at least one area, while maintaining a substantially constant tension in the belt 388.

In FIG. 13B, as crop enters the first bale chamber 322, a bale B1 is formed. The take-up assembly 346 position can be adjusted to maintain tension of the belt 388 around the bale B1. For example, the take-up assembly 346 can be pivoted clockwise to maintain a substantially constant pressure on the bale B1 with the belt 388 as bale B1 grows. As the bale B1 is formed within the first bale chamber 322, the bale carrier 358 remains in the downwardmost position and the belt 388 extends over the left and top surfaces of the bale B1, preventing the bale B1 from passing to the second bale chamber 324. The movable roller 604 remains in the downwardmost position to maintain tension in the belt 388 and close the inlet to the second bale chamber 324.

In FIG. 13C, as the bale B1 reaches a predetermined diameter (e.g., detected by one or more sensors disposed within the first bale chamber 322), the roller 604 of the second serpentine system 328 can be actuated to slide upward to the second or upwardmost position. Such actuation of the roller 604 releases tension in the belt 388.

Figure 13D:
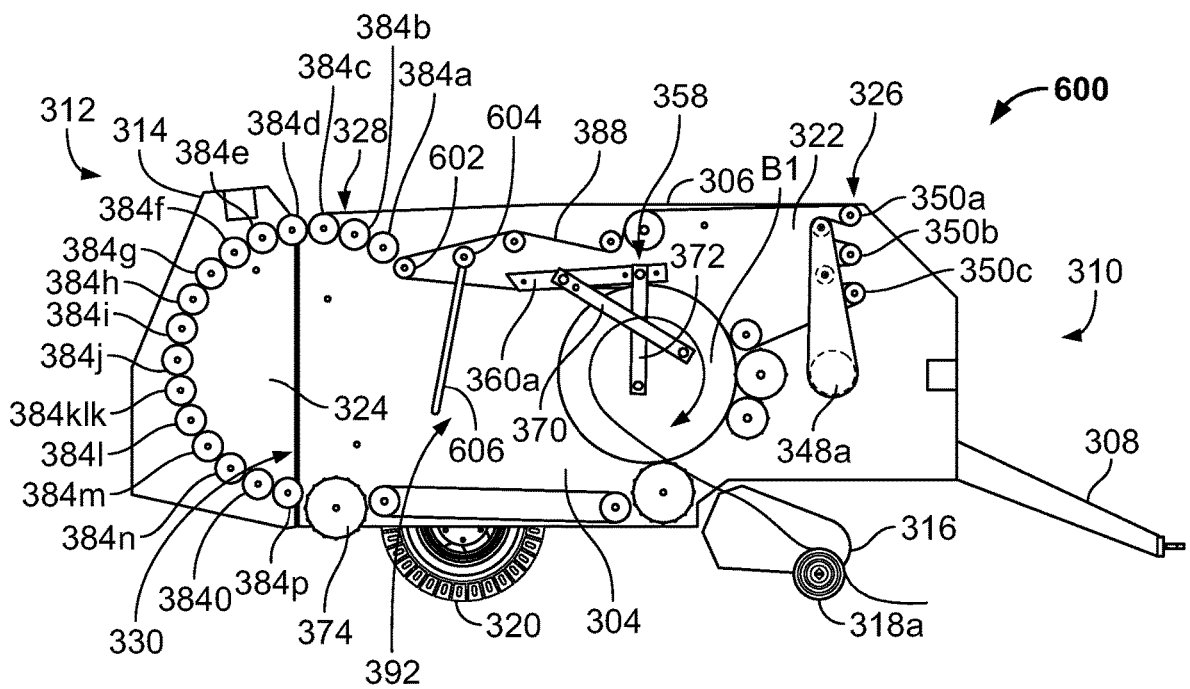

In FIG. 13D, after the roller 604 has been actuated into the upwardmost position, the bale carrier 358 is actuated to the second or upwardmost position. Such actuation of the bale carrier 358 opens or exposes the outlet 392 of the first bale chamber 322 (and the inlet to the second bale chamber 324) by collecting the belt 388 over the top area of the bale B1. Continued rotation of the rollers of the first serpentine system 326 urges the bale B1 onto the conveyor system 332.

Figure 13E:
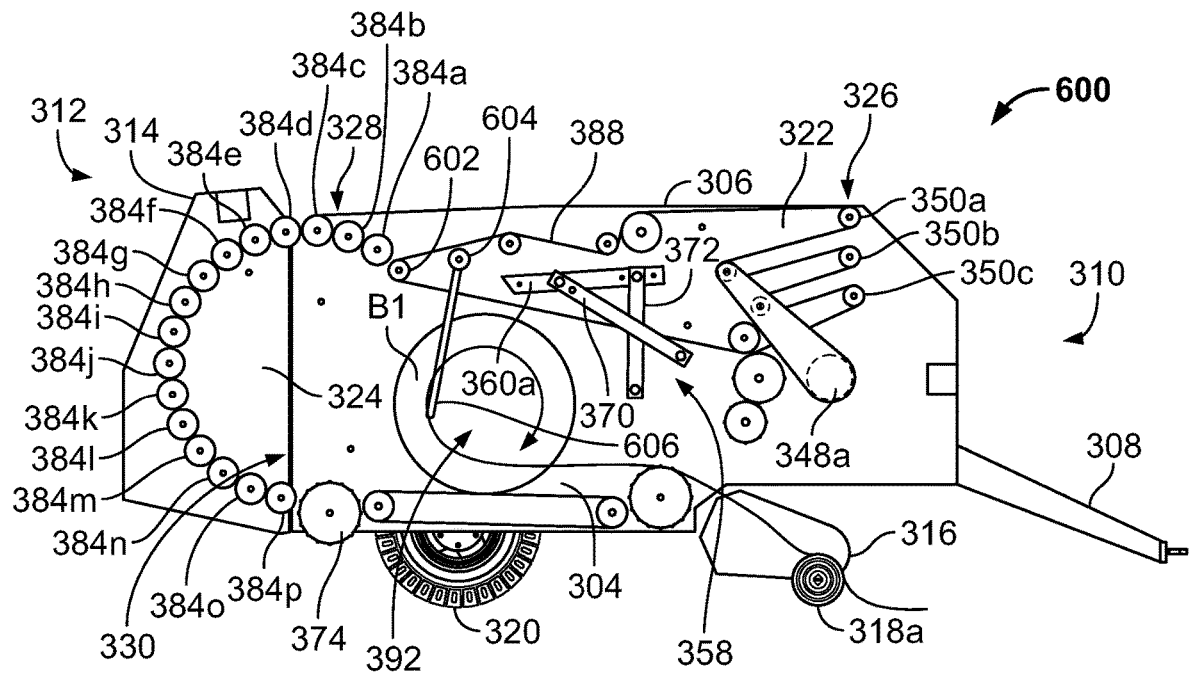
Figure 13F:
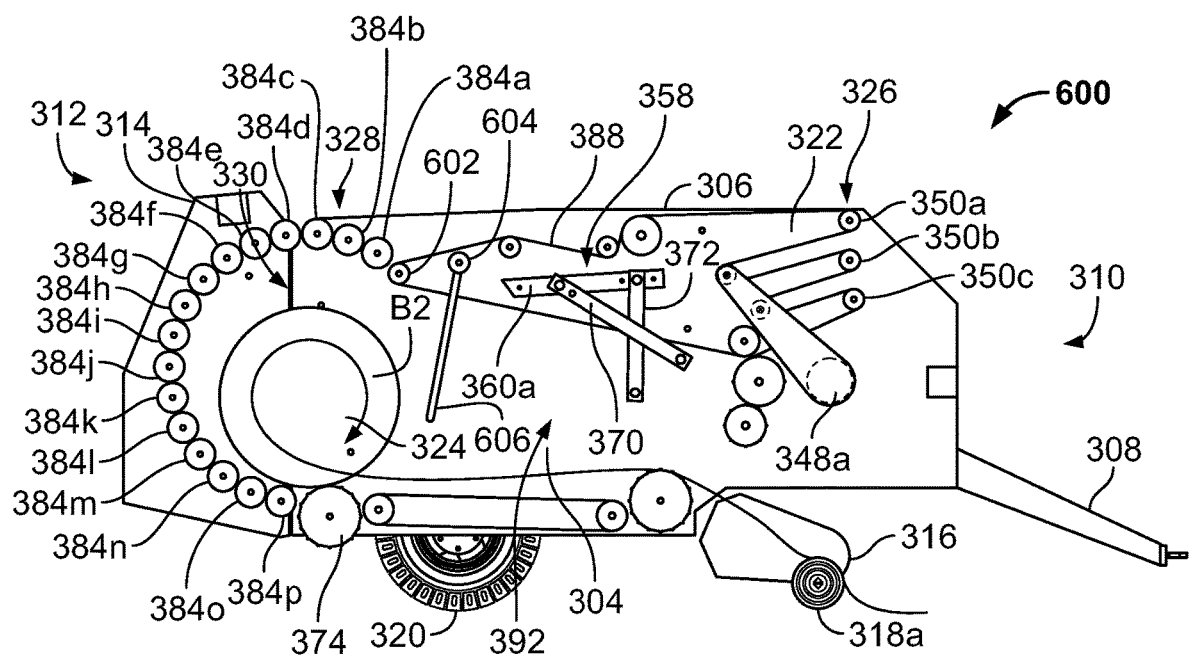

In FIGS. 13E-F, the conveyor system 332 rotates counterclockwise to transfer the bale B1 from the first bale chamber 322 to the second bale chamber 324. The bale carrier 358 and the roller 604 remain in the upwardmost positions to prevent interference with the bale B1, allowing the bale B1 to enter the second bale chamber 324.

Figure 13G:
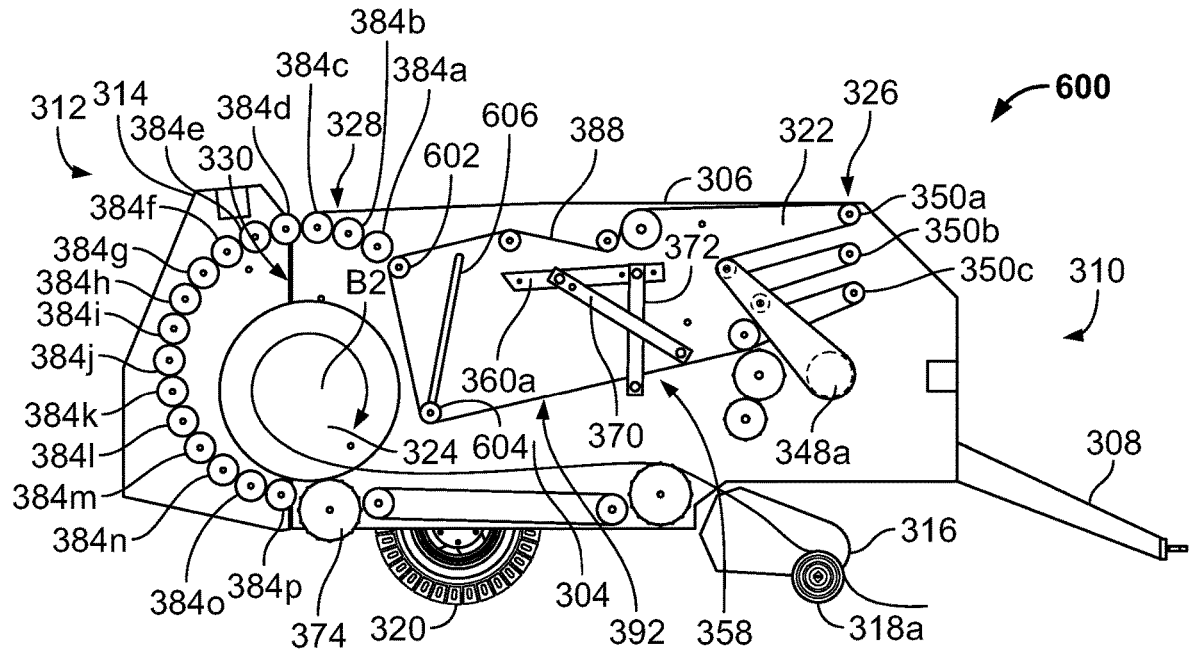

In FIG. 13G, bale B1 enters the second bale chamber 324 and rests over the floor roller 374. The roller 604 can be actuated into the first or lowermost position to close or obstruct the inlet 390 of the second bale chamber 324, preventing the bale B1 from moving out of the second bale chamber 324. The bale carrier 358 remains in the upwardmost position until the roller 604 has reached the lowermost position, and remains in the upwardmost position while the roller 604 is in the lowermost position.

Figure 13H:
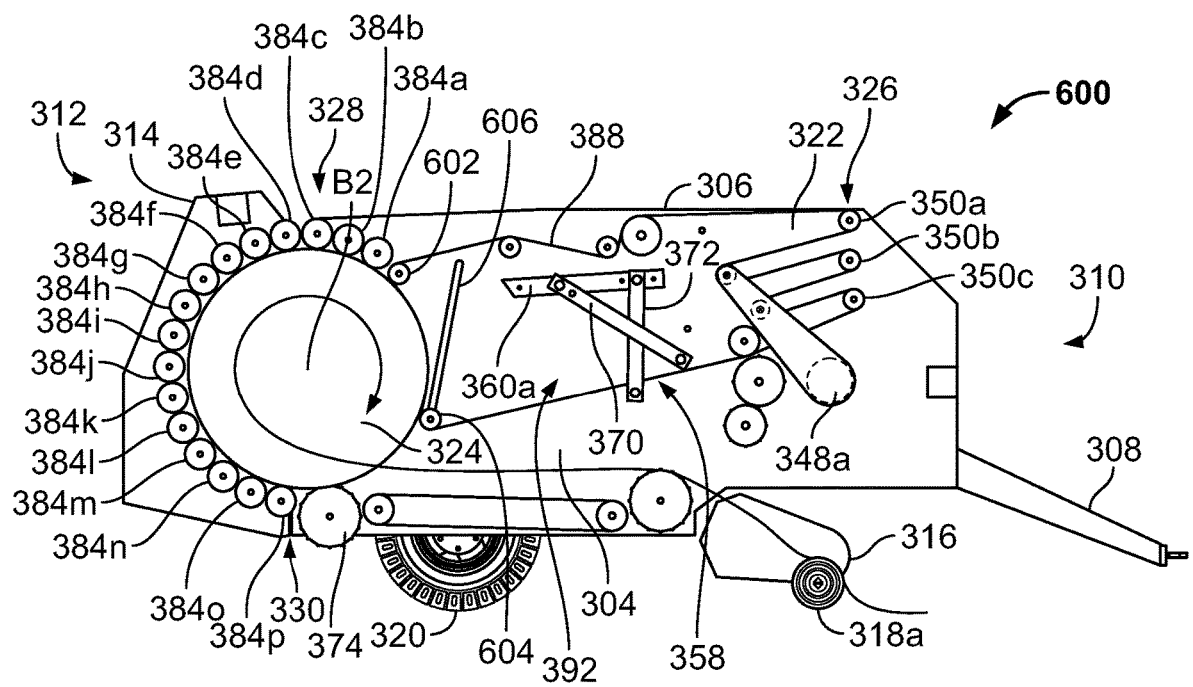

In FIG. 13H, crop is fed into the second bale chamber 324, increasing the size and diameter of the bale B2. In some embodiments, the bale carrier 358 can remain in the upwardmost position until formation of the bale B2 to the desired diameter is completed. In some embodiments, the bale carrier 358 can be actuated into the first or lowermost position, and another bale B1 can be formed in the first bale chamber 322. Such operation allows for continuous baling in both first and second bale chambers 322, 324.

Figure 13I:
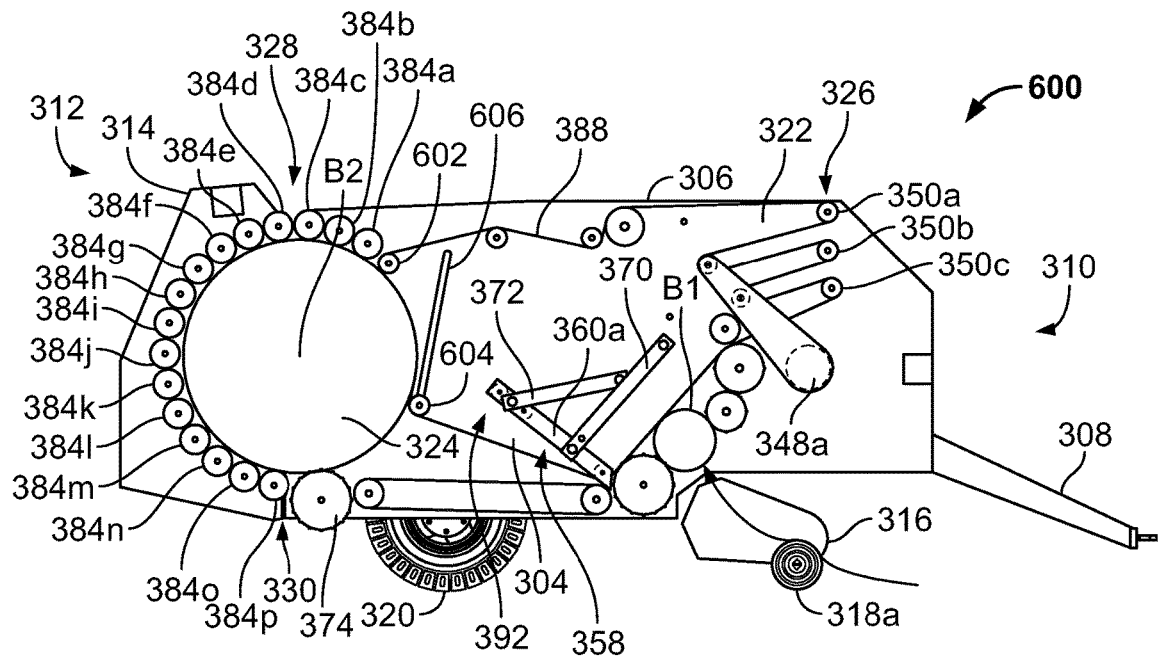
Figure 13J:
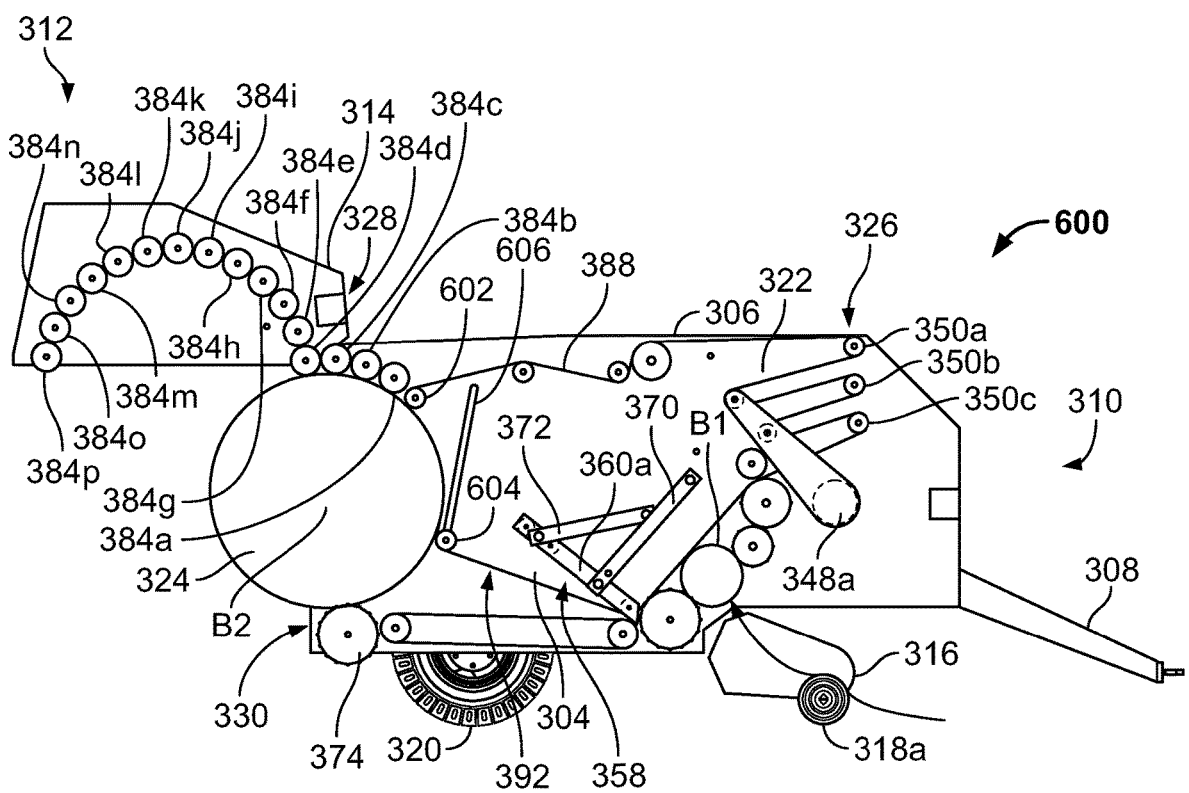

In FIG. 13I, after the bale B2 has reached a predetermined diameter as detected by one or more sensors disposed within the second bale chamber 324, the bale carrier 358 can be pivoted downward to the lowermost position in preparation for forming another bale B1. A net wrap assembly can be used to wrap the bale B2 prior to ejection from the baler 300. In FIG. 13J, the tailgate 314 can be pivoted clockwise to expose the outlet 330 of the second bale chamber 324 in preparation for ejecting the bale B2.

Figure 13K:
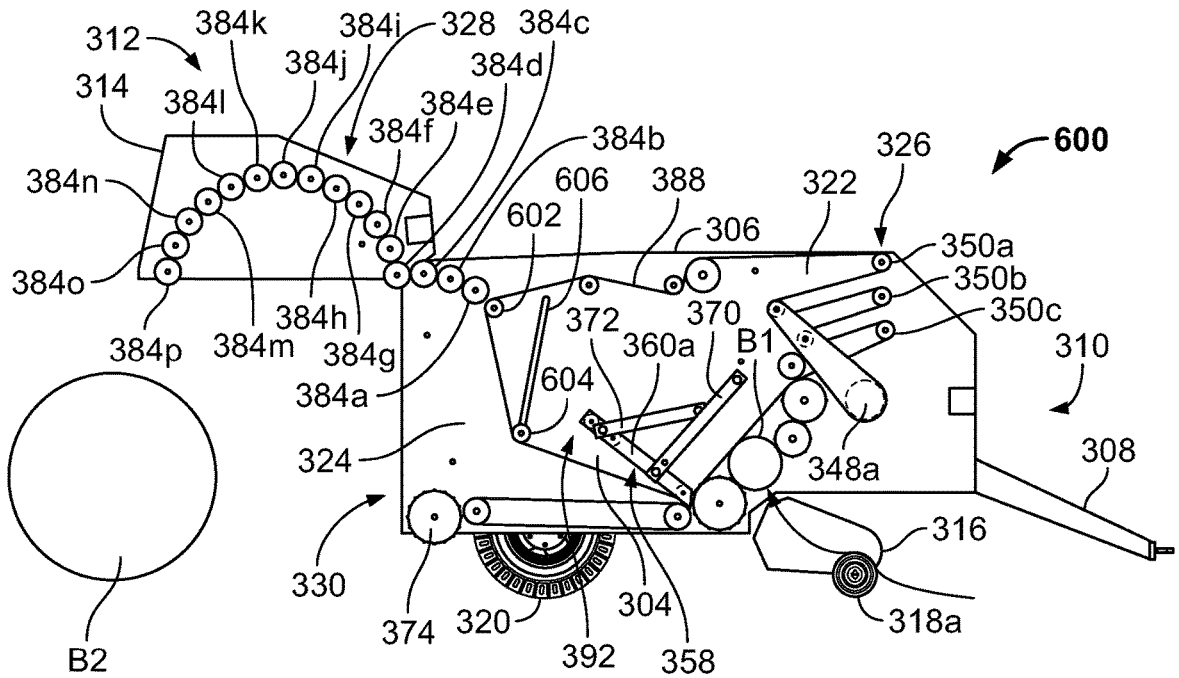
Figure 13L:
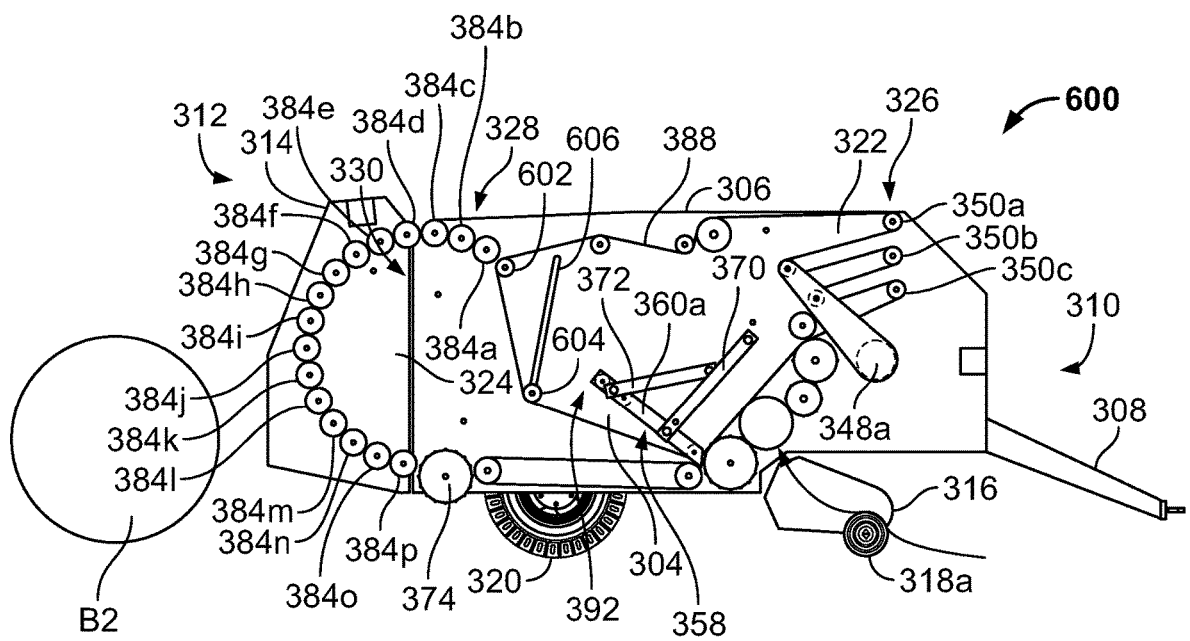

As shown in FIGS. 13K-L, continued rotation of the rollers of the second bale chamber 324 and motion of the baler 300 forward (as described relative to FIG. 9F) urges the bale B2 out of the outlet 330. After the bale B2 has been ejected out of the outlet 330, the tailgate 314 can be pivoted counterclockwise to close the outlet 330. In some embodiments, after the outlet 330 has been closed, the bale B1 in the first bale chamber 322 can be transferred to the second bale chamber 324 for further formation.

Figure 14A:
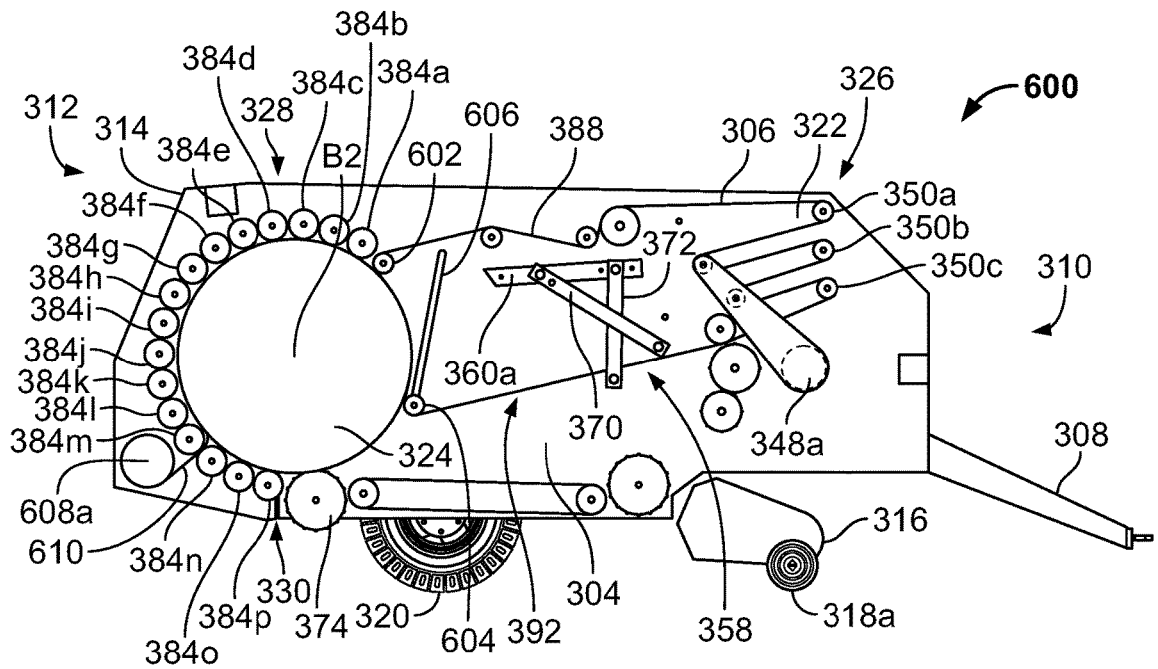
FIGS. 14A-C are cross-sectional side views of an exemplary continuous round baler of the present disclosure including varying positions of a net wrap assembly.
Figure 14B:
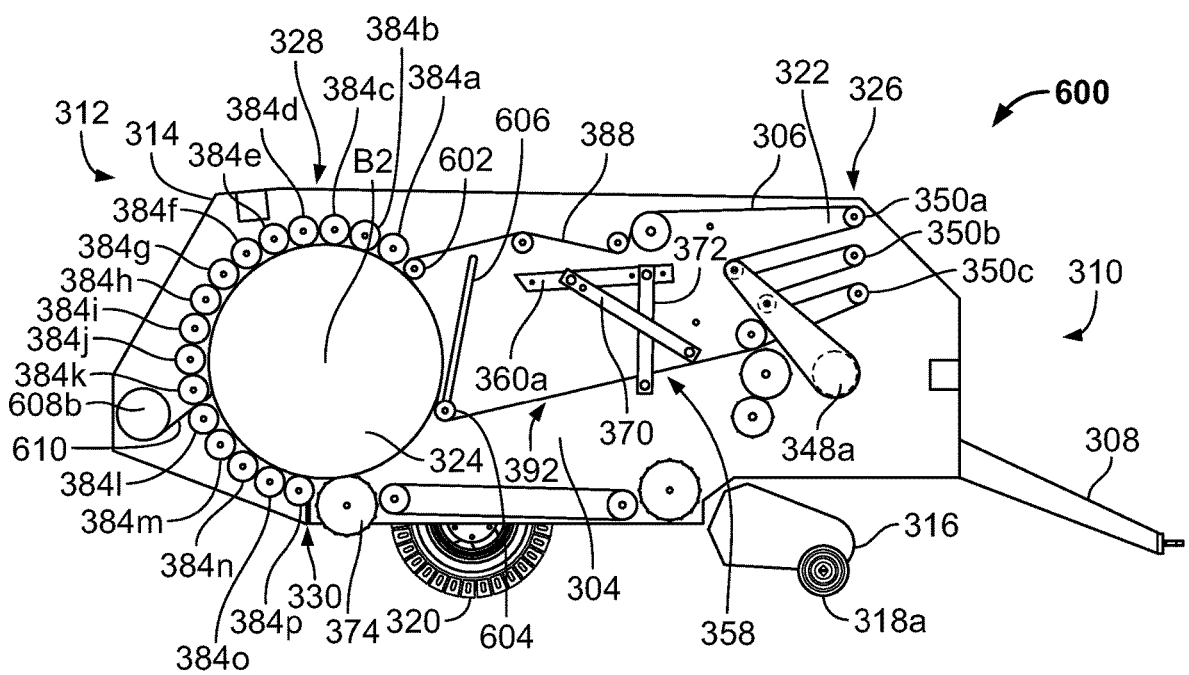
Figure 14C:
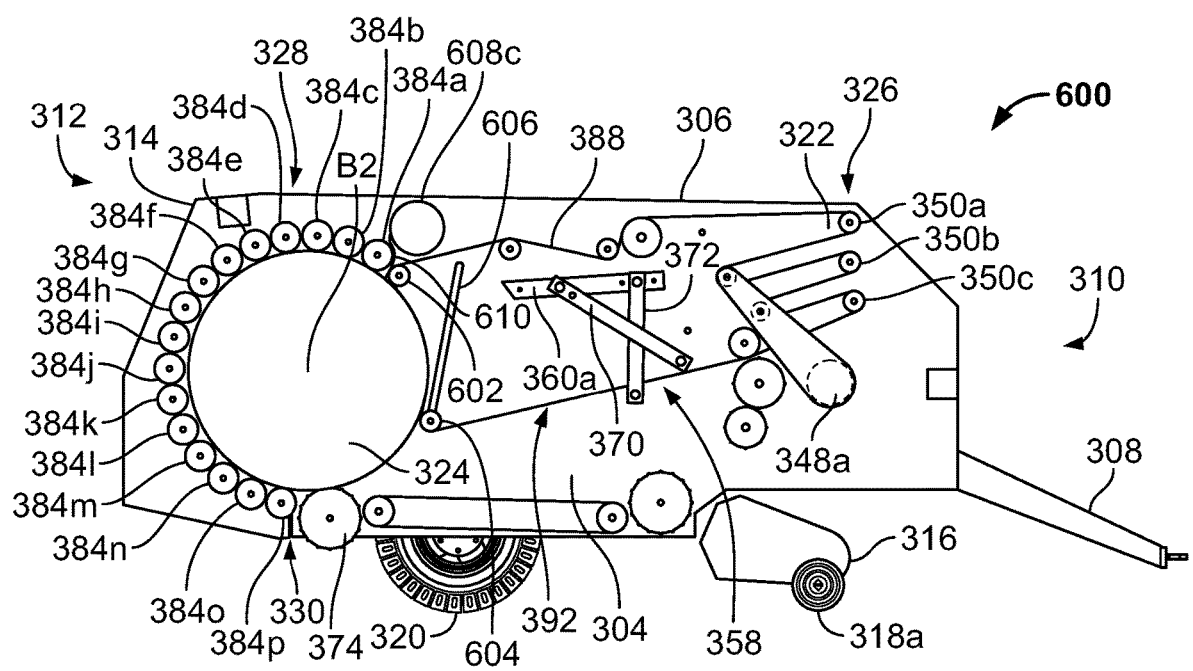

FIGS. 14A-C are cross-sectional side views of the baler 600 including varying positions of a net wrap assembly. In some embodiments, as shown in FIG. 14A, the net wrap assembly 608a can be disposed at the rear, bottom section of the tailgate 314. In such embodiments, the net 610 can be introduced into the second bale chamber 324 between the rollers 384m-n, and moves with the tailgate 314 during pivoting of the tailgate 314 to eject the bale B2. In some embodiments, as shown in FIG. 14B, the net wrap assembly 608b can be disposed at the rear, substantially central section of the tailgate 314. In such embodiments, the net 610 can be introduced into the second bale chamber 324 between the rollers 384k-l, and moves with the tailgate 314 during pivoting of the tailgate 314 to eject the bale B2. In some embodiments, as shown in FIG. 14C, the net wrap assembly 608c can be disposed at the top of the second bale chamber 314 adjacent to and above the roller 384a. In such embodiments, the net 610 can be introduced into the second bale chamber 324 between the rollers 384a, 602, and remains in the same position during pivoting of the tailgate 314 to eject the bale B2 (e.g., the net wrap assembly 608c does not pivot with the tailgate 314).

Figure 15:
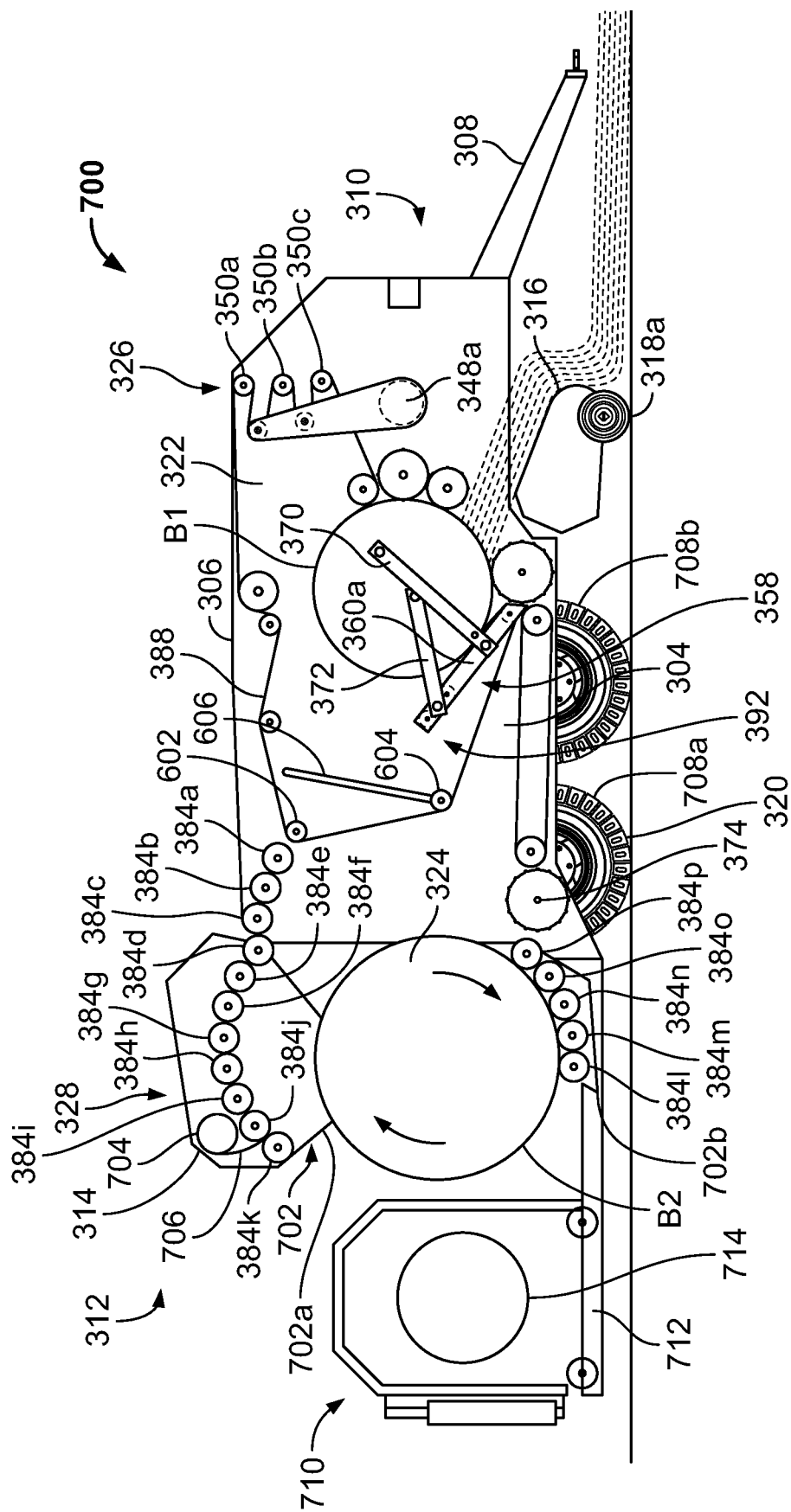
FIG. 15 is a cross-sectional side view of an exemplary continuous round baler of the present disclosure including a two section tailgate and a plastic wrapper.

FIG. 15 is a cross-sectional side view of a baler 700 of the present disclosure including a two section tailgate and a plastic wrapper. The baler 700 can be substantially similar in structure and function to the baler 600, except for the distinctions noted herein. Like reference numbers are used to refer to like structures.

Rather than having a single-piece, pivoting tailgate, the baler 700 can include a two-piece, scissor tailgate 702 having first and second tailgate sections 702a-b (e.g., top and bottom sections). Upon reaching the predetermined diameter of the bale B2, the first tailgate section 702a can pivot upwardly (e.g., clockwise) about roller 384d to expose the top section of the outlet of the second bale chamber, while the second tailgate section 702b pivots downwardly (e.g., counterclockwise) about roller 384p to expose the bottom section of the outlet of the second bale chamber. The curved structure of the second tailgate section 702b (in combination with continued movement of the baler 700) can urge the bale B2 to eject from the baler 700. The baler 700 can include a net wrapping assembly 704 operably disposed on the first tailgate section 702a, with netting 706 introduced into the second bale chamber between rollers 384j-k. In some embodiments, the netting 706 can be introduced between the endmost rollers of the first and second tailgate sections 702a-b (e.g., rollers 384k-l). The net wrapping assembly 704 can therefore pivot with the first tailgate section 702a during ejection of the bale B2. In some embodiments, the baler 700 can include two wheels 708a-b (tandem wheels) on each side of the baler 700 rather than a single wheel to accommodate load distribution during formation and transfer of both bales B1, B2. In some embodiments, a plastic wrapper assembly 710 can be operably coupled to the rear of the baler 700 via, e.g., a platform 712, and operates to wrap the ejected bale B2 with plastic wrap from a roll 714 of plastic wrap prior to release of the bale B2 onto the field.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure.

The invention claimed is:

1. A crop harvesting system, comprising:
a first bale chamber and a second bale chamber operably coupled by a conveyor system;
wherein the first bale chamber is positioned at a front of the baler and the second bale chamber is positioned at a rear of the baler, wherein each of the first and second bale chambers comprise a first sidewall and a second sidewall, an entry point at the front of the first and second bale chambers, an outlet at a rear of the first and second bale chambers, and at least one floor roller positioned at a bottom of each of the bale chambers transverse to the first and second sidewalls;
wherein the conveyor system is positioned between the first and second bale chambers;
wherein the first bale chamber comprises a variable shape, defined by a first serpentine system comprising at least one belt in operable contact with at least one movable roller to facilitate movement of a bale in the first bale chamber, and out of the first bale chamber and into the second bale chamber; and
wherein the second bale chamber comprises a plurality of stationary rollers,
wherein the second chamber further comprises a gate roller in contact with the at least one belt, wherein in a first operable condition, the gate roller is positioned in a lower position closing the entry point at the front of the second bale chamber, and wherein in a second operable condition, the gate roller is positioned in an upper position exposing the entry point at the front of the second bale chamber; and
wherein the first serpentine system comprises a bale carrier positioned forward of the gate roller, wherein in the first operable condition, the bale carrier is positioned in a lower position closing the outlet at the rear of the first bale chamber, and wherein in the second operable condition, the bale carrier is positioned in an upper position exposing the outlet at the rear of the first bale chamber.

2. The crop harvesting system of claim 1, wherein the plurality of stationary rollers are coupled to a tailgate and configured to pivot with the tailgate in an open position of the tailgate.

3. The crop harvesting system of claim 1, wherein the plurality of stationary roller comprises a first group of stationary rollers coupled to a tailgate and configured to pivot with the tailgate in an open position of the tailgate, and a second group of stationary rollers coupled to a main frame and configured to remain stationary during pivoting of the tailgate.

4. The crop harvesting system of claim 1, further comprising a take-up assembly comprising a plurality of stationary rollers and a plurality of movable rollers, the at least one endless belt of the first serpentine system extending between the plurality of stationary and movable rollers of the take-up assembly at non-parallel and non-perpendicular angles relative to horizontal.

5. The crop harvesting system of claim 1, wherein the gate roller is configured to slide along a track formed in at least one of the sidewalls between the upper and lower positions.

6. The crop harvesting system of claim 5, wherein the plurality of stationary rollers of the second bale chamber define a substantially continuous, semi-circular configuration at the rear of the second bale chamber.

7. The crop harvesting system of claim 5, wherein the second bale chamber further comprises a chain or belt extending over the plurality of stationary rollers to define a substantially continuous, semi-circular configuration at the rear of the second bale chamber.

8. The crop harvesting system of claim 1, wherein as the bale is formed within the first bale chamber, the bale carrier remains in the lower position and the at least one belt extends over the bale, preventing movement to the second chamber and the gate roller remains in the lower position tensioning the at least one belt.

9. The crop harvesting system of claim 8, wherein the gate roller is configured to slide along a track between the upper and lower positions.

10. A continuous round baler, comprising:
a main frame;
a pickup assembly disposed near a forward end of the main frame; and
a first bale chamber positioned rearward of the pickup assembly;
a second bale chamber operably coupled by a conveyor system to the first bale chamber;
an entry point at the front of the first and second bale chambers, an outlet at a rear of the first and second bale chambers, and at least one floor roller positioned at a bottom of each of the bale chambers;
wherein the conveyor system is positioned between the first and second bale chambers;
wherein the first bale chamber comprises a variable shape, defined by a serpentine system comprising at least one belt in operable contact with at least one roller to facilitate movement of the bale in the first bale chamber, and out of the first bale chamber and into the second bale chamber; and
wherein the second bale chamber comprises a fixed shape, comprising a plurality of stationary rollers and a gate roller in contact with the at least one belt, wherein in a first operable condition, the gate roller is positioned in a lower position closing the entry point at the front of the second bale chamber, and wherein in a second operable condition, the gate roller is positioned in an upper position exposing the entry point at the front of the second bale chamber; and
wherein the first serpentine system comprises a moveable portion toward the rear of the first outlet of the first bale chamber such that, in the first operable condition, the at least one belt and a plurality of rollers positioned toward the rear of the first bale chamber are positioned in a lower position sufficiently preventing movement of crop material from the first bale chamber to the second bale chamber; and, in the second operable position, the at least one belt and the plurality of rollers positioned toward the rear of the first bale chamber are positioned in an upper position to accommodate movement of a full formed bale in the first chamber to exit through the outlet of the first bale chamber.

11. The continuous round baler of claim 10, wherein the conveyor system is positioned between the first and second bale chambers at a downward angle from a front of the baler to a rear of the baler.

12. The continuous round baler of claim 10, wherein the conveyor system comprises at least two rollers and a conveyor belt positioned over the at least two rollers wherein rotation of the at least two rollers causes the conveyor belt to move harvested crop from the first bale chamber to the second bale chamber.

13. The continuous round baler of claim 10, wherein the at least one belt and plurality of rollers are integrated into a bale carrier.

14. The continuous round baler of claim 10, wherein the first serpentine system comprises at least one take-up assembly positioned in the front of the baler comprising an arm capable of radial movement around a stationary pivot point and at least two movable rolls operably attached to the arm and the at least one belt, wherein, in the first operable condition, the arm is positioned in a rearmost position thereby decreasing the length in the at least one belt and, in the second operable condition, the arm is positioned in a frontmost position thereby increasing the length in the at least one belt and moving the at least one belt and the at least two moveable rolls from a lower position in the rear of the first bale chamber to an upper position thereby accommodating the movement of crop material from the first to the second bale chamber.

15. The continuous round baler of claim 10, further comprising a first sensor positioned in the first bale chamber and a second sensor positioned in the second bale chamber, wherein the first and second sensors are in operable communication with a controller system and configured to detect at least one of a diameter or density of a bale.

16. The continuous round baler of claim 10, further comprising a rotocutter and a crop harvesting assembly forward of the inlet to first bale chamber.

17. The continuous round baler of claim 10, further comprising a motor and at least one tensioning actuator operatively coupled to a bale carrier for facilitating upward or downward movement of the at least one bale carrier.

18. The continuous round baler of claim 10, further comprising a net wrapping mechanism for wrapping completed bales in the second bale chamber wherein the net wrapping mechanism is optionally movable to avoid contact with or obstruction of the bale within the second bale chamber.

19. The continuous round baler of claim 10, wherein the conveyor system comprises at least four rollers around which at least one conveyor belts rotate, wherein the rollers exact tension on the conveyor belt and convey crop between the first and the second bale chambers.

20. A crop harvesting system, comprising:
a first bale chamber and a second bale chamber operably coupled by a conveyor system;
wherein the first bale chamber is positioned forward of the second bale chamber, wherein each of the first and second bale chambers comprise an entry point at the front of the first and second bale chambers, an outlet at a rear of the first and second bale chambers,
wherein the first bale chamber comprises a variable shape, at least partially defined by a first serpentine system comprising at least one belt in operable contact with at least one or a plurality of movable roller to facilitate movement of a bale in the first bale chamber; and wherein the second bale chamber comprises a fixed shape, defined by a plurality of stationary rollers and a gate roller in contact with the at least one belt, wherein in a first operable condition, the gate roller is positioned in a lower position closing the entry point at the front of the second bale chamber, and wherein in a second operable condition, the gate roller is positioned in an upper position exposing the entry point at the front of the second bale chamber; and
wherein the first serpentine system comprises a bale carrier positioned forward of the gate roller, wherein in the first operable condition, the bale carrier is positioned in a lower position closing the outlet at the rear of the first bale chamber, and wherein in the second operable condition, the bale carrier is positioned in an upper position exposing the outlet at the rear of the first bale chamber.

21. The crop harvesting system of claim 1, wherein as the bale reaches a predetermined diameter in the first bale chamber, the gate roller is actuated to slide upward to the upper position and releases tension in the at least one belt, and the bale carrier is actuated to the upper position of the bale carrier increasing the opening of the outlet of the first bale chamber and the inlet to the second bale chamber by retracting a portion of the at least one belt from contact with the bale.

22. The crop harvesting system of claim 1, wherein the gate roller moves rearwardly as it moves from the upper position to the lower position.

* * * * *